(12) United States Patent
Suzuki et al.

(10) Patent No.: US 8,239,320 B2
(45) Date of Patent: Aug. 7, 2012

(54) ELECTRONIC MONEY APPARATUS AND AN ELECTRONIC CIRCUIT

(75) Inventors: Satoru Suzuki, Kanagawa (JP); Yasuji Yui, Kanagawa (JP)

(73) Assignee: Sony Corporation, Tokyo (JP)

( * ) Notice: Subject to any disclaimer, the term of this patent is extended or adjusted under 35 U.S.C. 154(b) by 552 days.

(21) Appl. No.: 11/390,376

(22) Filed: Mar. 28, 2006

(65) Prior Publication Data

US 2006/0167796 A1    Jul. 27, 2006

Related U.S. Application Data

(62) Division of application No. 09/815,422, filed on Mar. 22, 2001, now abandoned.

(30) Foreign Application Priority Data

Mar. 24, 2000 (JP) ................................. 2000-085453
Nov. 21, 2000 (JP) ................................. 2000-354953

(51) Int. Cl.
    *G06Q 40/00* (2012.01)
(52) U.S. Cl. .......................................... 705/39; 705/41
(58) Field of Classification Search ............... 705/39–41, 705/65; 718/102, 104; 709/201, 203, 223, 709/224
    See application file for complete search history.

(56) References Cited

U.S. PATENT DOCUMENTS

| | | | |
|---|---|---|---|
| 3,559,175 A * | 1/1971 | Schatz | 235/380 |
| 3,729,617 A | 4/1973 | Stone | |
| 4,001,550 A * | 1/1977 | Schatz | 235/379 |
| 4,585,904 A * | 4/1986 | Mincone et al. | 379/114.01 |
| 5,058,009 A | 10/1991 | Yoshino et al. | |
| 5,231,568 A | 7/1993 | Cohen | |
| 5,511,114 A | 4/1996 | Stimson | |
| 5,592,376 A | 1/1997 | Hodroff | |
| 5,721,768 A | 2/1998 | Stimson et al. | |
| 5,749,075 A | 5/1998 | Toader et al. | |
| 5,752,238 A | 5/1998 | Dedrick | |
| 5,753,899 A * | 5/1998 | Gomm et al. | 235/381 |
| 5,819,092 A * | 10/1998 | Ferguson et al. | 717/113 |
| 5,825,863 A | 10/1998 | Walker | |
| 5,952,639 A | 9/1999 | Ohki | |
| 5,953,705 A | 9/1999 | Oneda | |

(Continued)

FOREIGN PATENT DOCUMENTS

JP    4-060789    2/1992

(Continued)

OTHER PUBLICATIONS

Office Action mailed Jan. 24, 2008 in counterpart U.S. Appl. No. 09/815,422.

(Continued)

*Primary Examiner* — Mary Cheung
*Assistant Examiner* — Daniel L Greene
(74) *Attorney, Agent, or Firm* — Finnegan, Henderson, Farabow, Garrett, & Dunner, L.L.P.

(57) ABSTRACT

An apparatus of the invention comprises an operation inputting element for designating one of a plurality of functions; a function executing element for executing the function designated by the operating inputting element; a measuring element for measuring the time during which each of the functions has been executed by the function executing element; and a chargeable amount computing element for computing a chargeable amount based on the execution time measured by the measuring element regarding each of the functions.

4 Claims, 47 Drawing Sheets

U.S. PATENT DOCUMENTS

| | | | |
|---|---|---|---|
| 5,956,697 A * | 9/1999 | Usui | 705/32 |
| 6,018,726 A | 1/2000 | Tsumura | |
| 6,021,189 A | 2/2000 | Vu | |
| 6,097,377 A | 8/2000 | Yeo | |
| 6,198,915 B1 * | 3/2001 | McGregor et al. | 455/406 |
| 6,199,046 B1 | 3/2001 | Heinzle et al. | |
| 6,347,136 B1 * | 2/2002 | Horan | 379/142.01 |
| 6,370,517 B2 | 4/2002 | Yanagihara et al. | |
| 6,418,202 B1 | 7/2002 | Caldwell et al. | |
| 6,418,467 B1 | 7/2002 | Schweitzer et al. | |
| 6,424,706 B1 | 7/2002 | Katz et al. | |
| 6,526,390 B1 * | 2/2003 | Wang et al. | 705/39 |
| 6,611,819 B1 | 8/2003 | Oneda | |
| 6,885,857 B1 * | 4/2005 | Hanson | 455/406 |
| 6,944,595 B1 | 9/2005 | Graser et al. | |
| 6,959,288 B1 * | 10/2005 | Medina et al. | 705/51 |
| 6,999,944 B1 * | 2/2006 | Cook | 705/44 |
| 7,025,255 B1 * | 4/2006 | Drummond et al. | 235/379 |
| 7,142,846 B1 | 11/2006 | Henderson | |
| 2001/0038033 A1 | 11/2001 | Habib | |

FOREIGN PATENT DOCUMENTS

| | | |
|---|---|---|
| JP | 4-360215 | 12/1992 |
| JP | 7-105447 | 4/1995 |
| JP | 8-195834 | 7/1996 |
| JP | 8-242317 | 9/1996 |
| JP | 9-098232 | 4/1997 |
| JP | 9-319575 | 12/1997 |
| JP | 9-319875 | 12/1997 |
| JP | 10-078867 | 3/1998 |
| JP | 10-326119 | 12/1998 |
| JP | 11-212785 | 8/1999 |
| JP | 2000-030099 | 1/2000 |
| JP | 2000-500889 | 1/2000 |
| KR | 2001057717 A | 7/2001 |

OTHER PUBLICATIONS

Office Action mailed Mar. 10, 2008 in counterpart U.S. Appl. No. 11/390,207.

Office Action mailed Mar. 17, 2008 in counterpart U.S. Appl. No. 11/390,375.

Office Action mailed Mar. 18, 2008 in counterpart U.S. Appl. No. 11/390,453.

Office Action mailed Mar. 25, 2008 in counterpart U.S. Appl. No. 11/390,208.

Office Action mailed Apr. 4, 2008 in counterpart U.S. Appl. No. 11/390,454.

Office Action mailed Apr. 29, 2008 in counterpart U.S. Appl. No. 11/390,383.

Communication issued by Japanese Patent Office on Sep. 14, 2009 in corresponding application JP 2000-354953, 3 pages.

Communication issued by Japanese Patent Office on Dec. 1, 2009 in corresponding application JP 2000-354953, 2 pages.

* cited by examiner

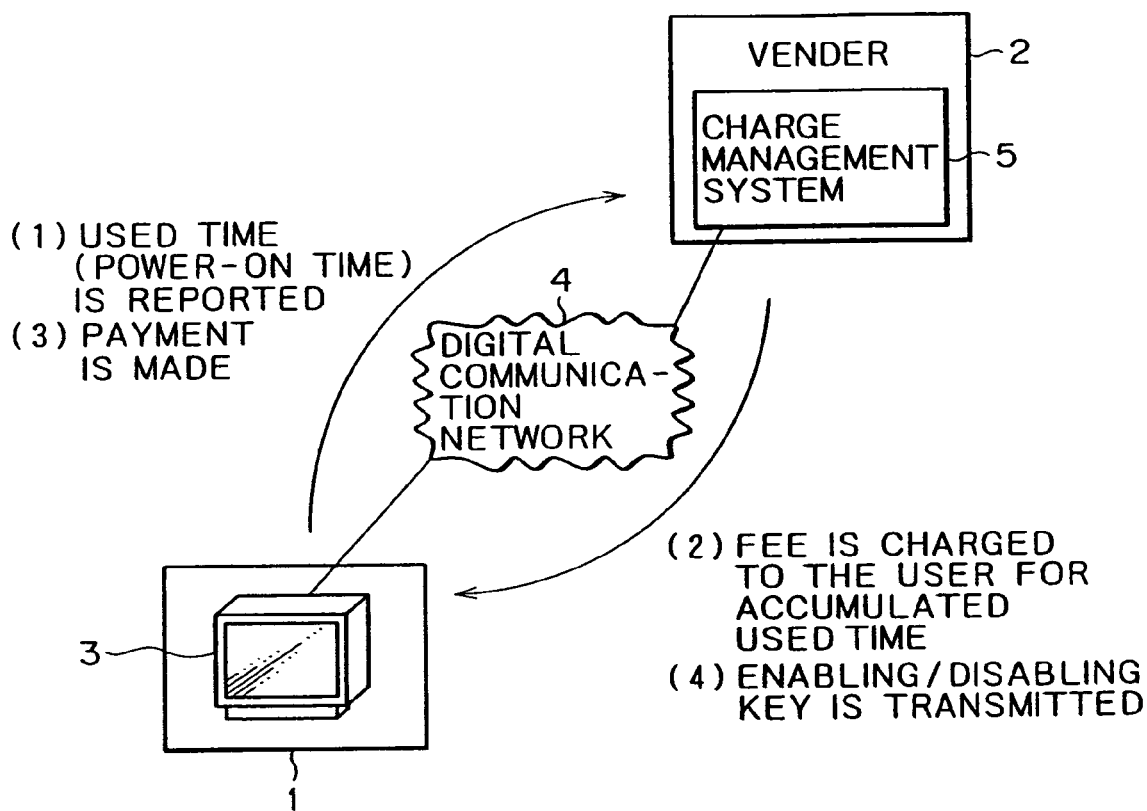
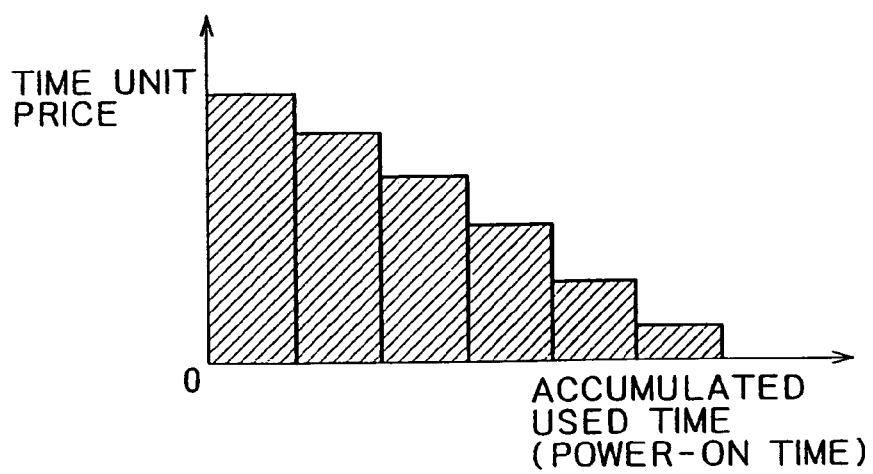

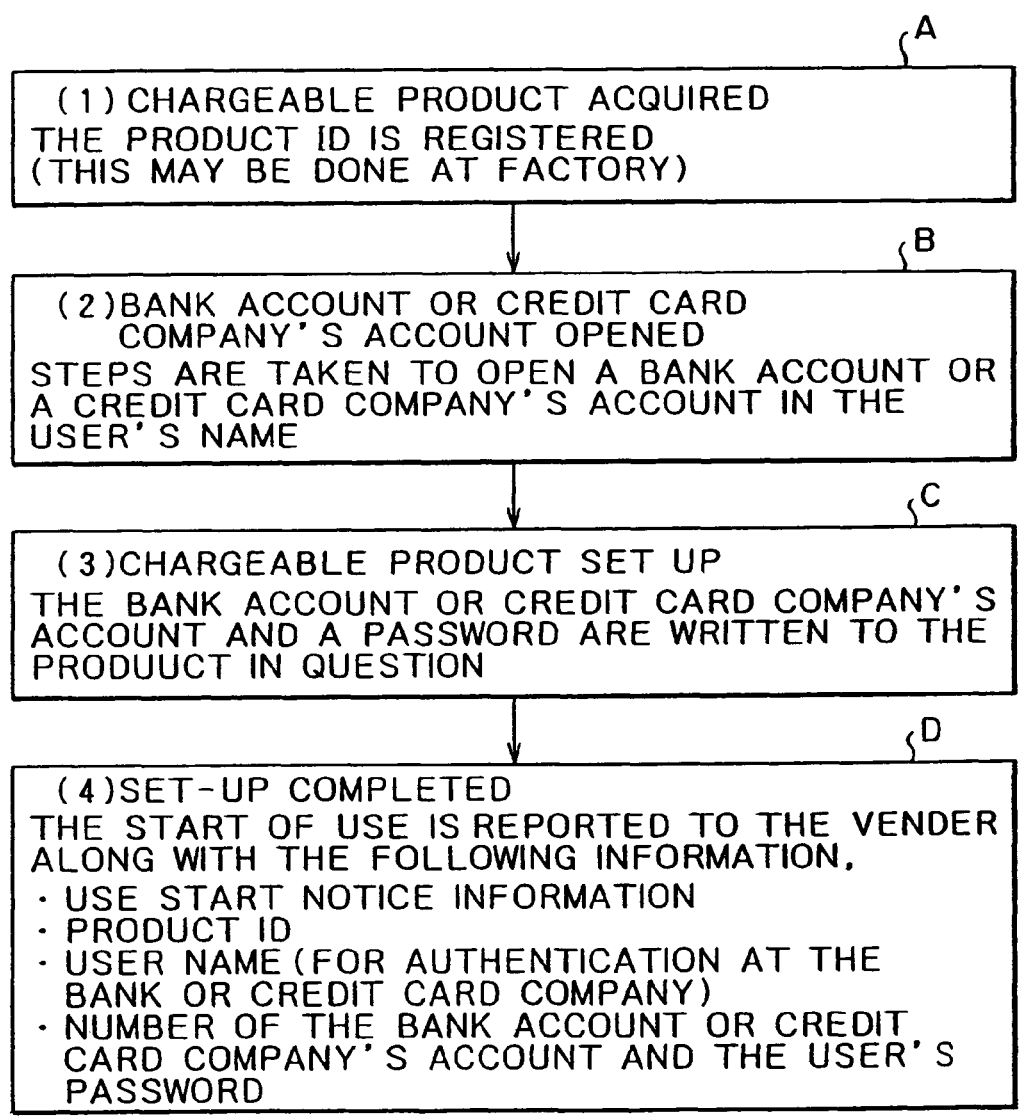

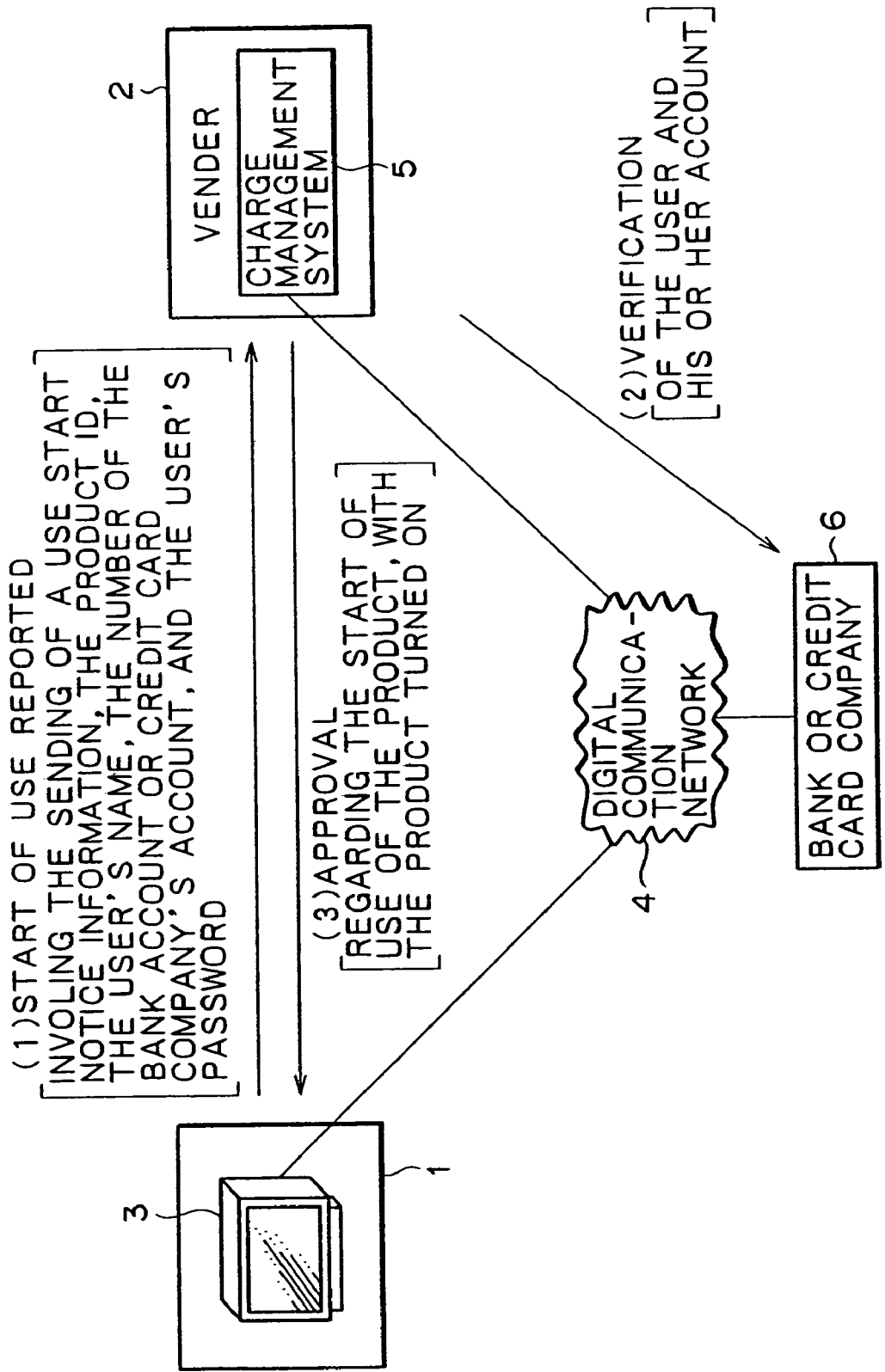

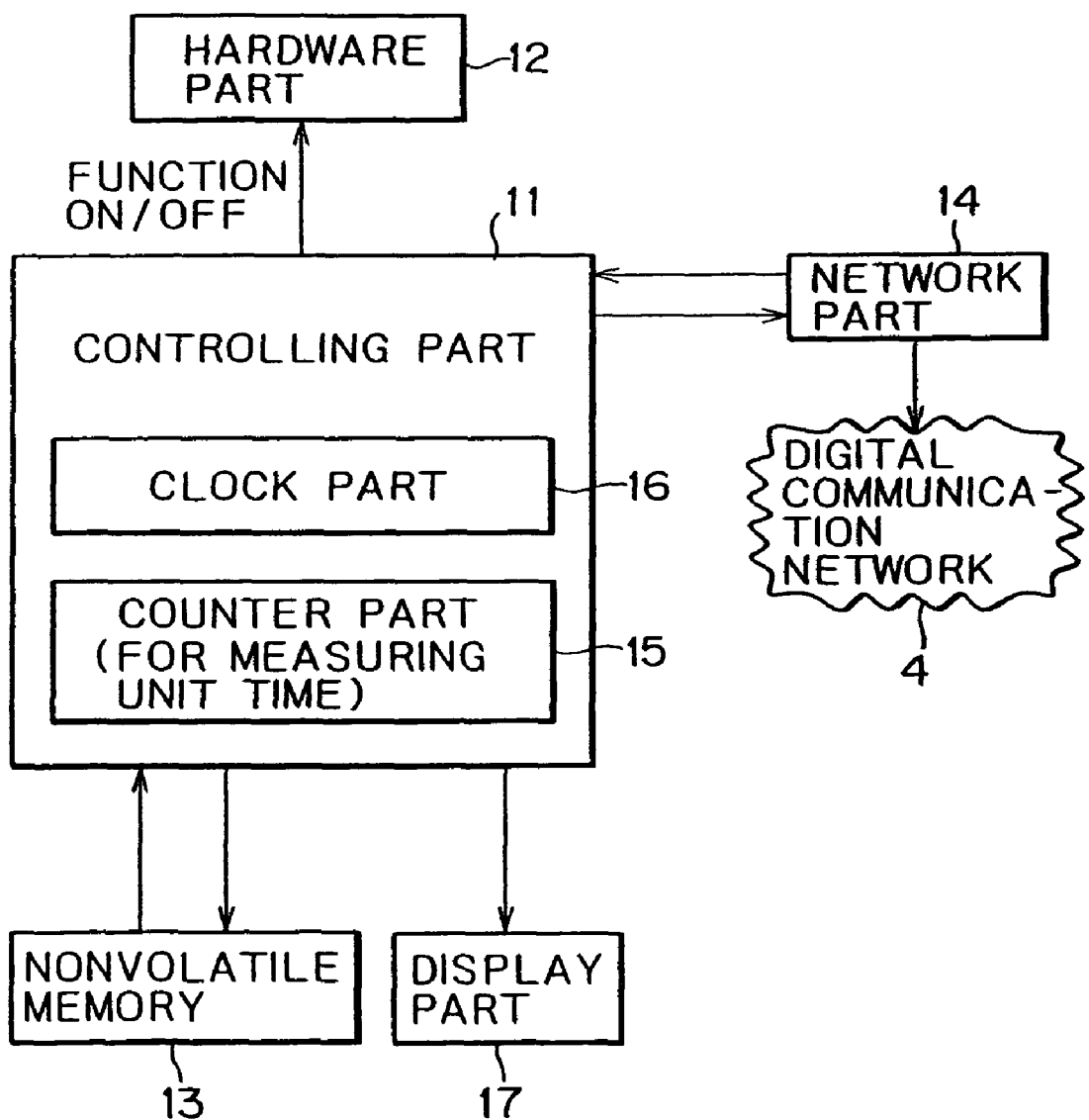

F I G. 6
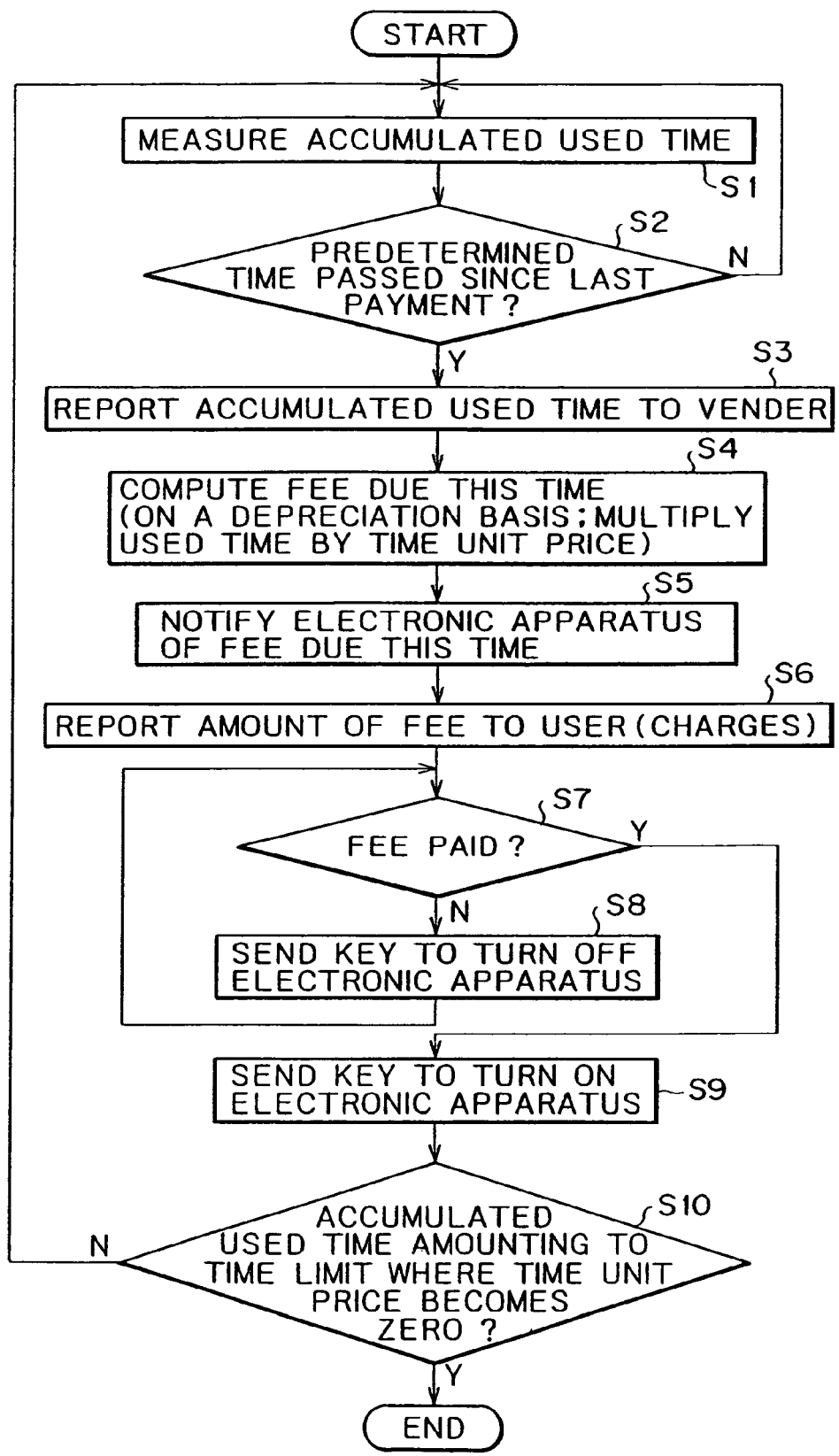

F I G. 18
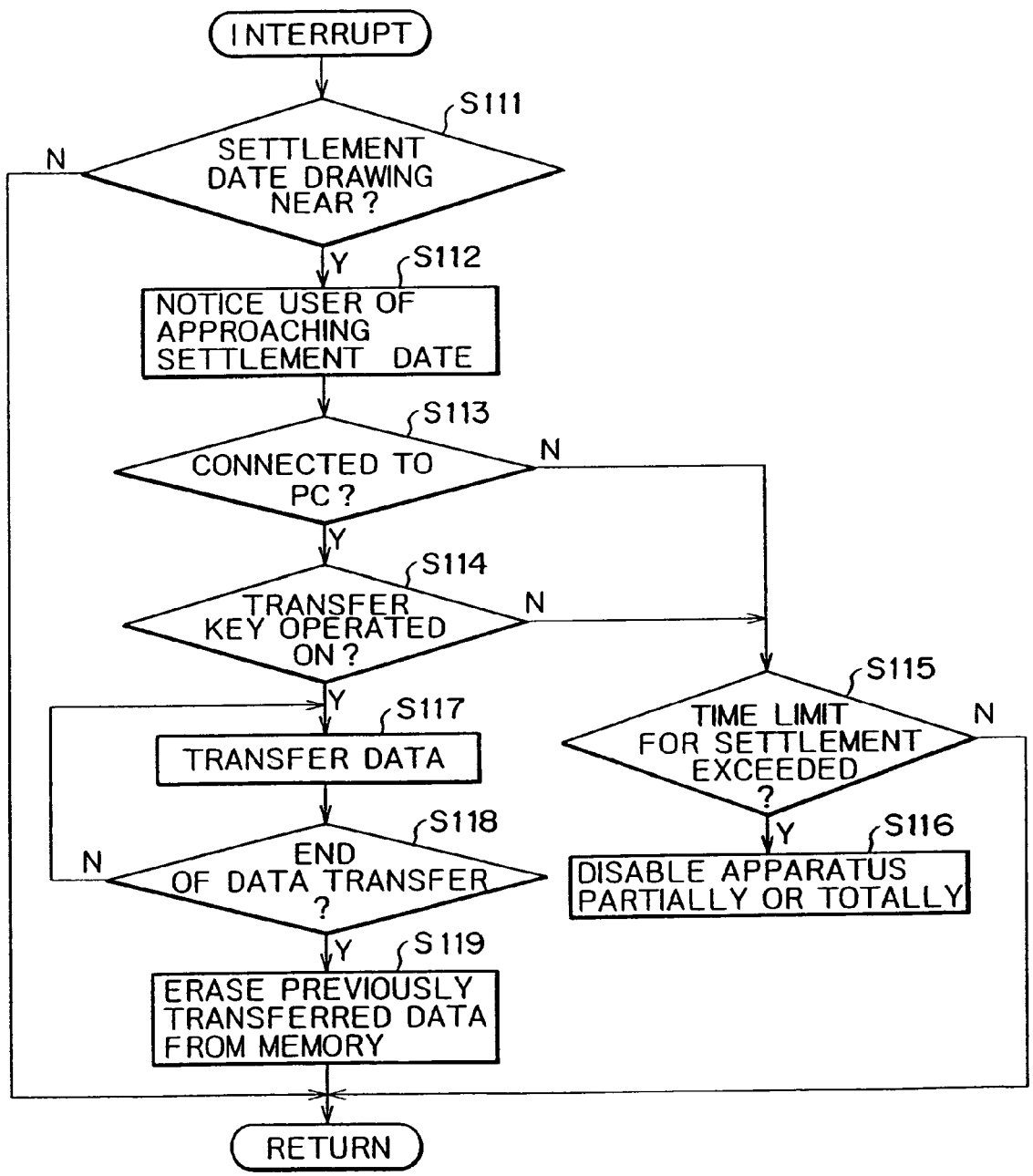

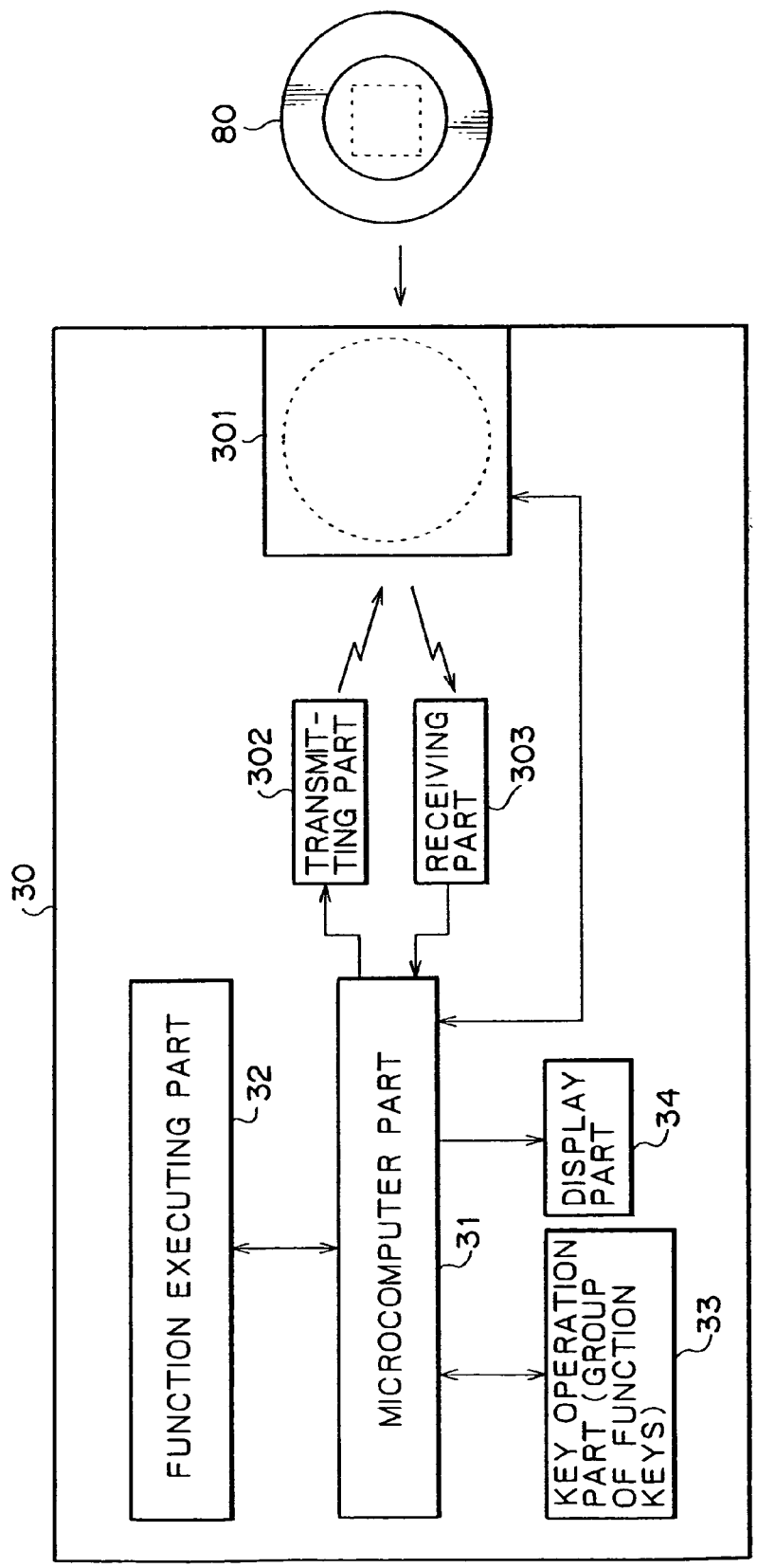

F I G. 49
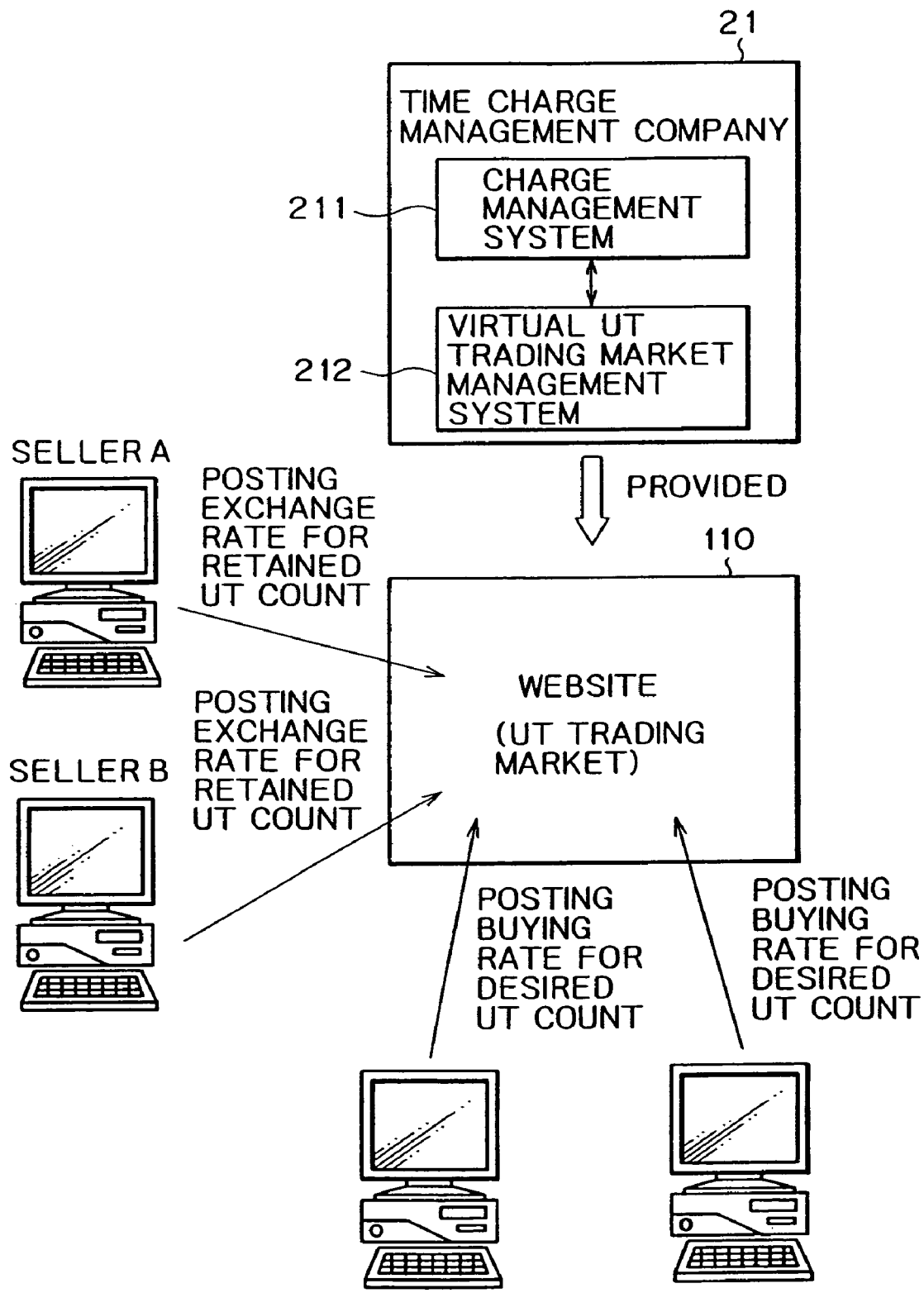

ELECTRONIC MONEY APPARATUS AND AN ELECTRONIC CIRCUIT

This is a divisional of application Ser. No. 09/815,422, filed Mar. 22, 2001, now abandoned the contents of which are incorporated herein by reference. Application Ser. No. 09/815,422claims priority to Application No. 2000-085453 filed on Mar. 24, 2000 in Japan, and Application No. 2000-354953 filed on Nov. 21, 2000 in Japan.

BACKGROUND OF THE INVENTION

The present invention relates to a charging system and a charging method whereby apparatuses are not sold outright but are instead charged for the period of time in which they have been actually used, as well as an electronic apparatus for use with such a system and a method, a charge processing device, a storage medium, and a prepaid card.

It has been customary for users to purchase products and acquire their ownership before use. The users thus generally pay the price of each product itself.

The traditional way of purchase signifies that people pay the price of a given product whether or not they actually use it. In other words, the buyers must also pay for the period of time in which their product is not used for the simple reason that they own it. Basically, products are worth their price only when utilized. If a product has been purchased but not used for some reason, that obviously means the buyer has wasted money on the product.

Today's so-called high-tech products such as computers become obsolete in a very short cycle. Often new products appear on the market before their predecessors have been fully exploited. Users who bought earlier models tend to feel shortchanged at seeing new and better products prematurely superseding their possessions.

Those who wish to keep up with the latest and most sophisticated products need to pay in full for each novel item that comes along. This can be a considerable financial burden on the high-tech novelty hunters.

SUMMARY OF THE INVENTION

The present invention has been made in view of the above circumstances and provides a system and a method whereby products are charged not for their ownership but for the time period in which they have been actually used.

In carrying out the invention and according to one aspect thereof, there is provided an apparatus including: an operation inputting element for designating one of a plurality of functions; a function executing element for executing the function designated by the operating inputting element; a measuring element for measuring the time in which each of the functions is executed by the function executing element; and a chargeable amount computing element for computing a chargeable amount based on the execution time measured by the measuring element regarding each of the functions.

The inventive electronic apparatus permits computing of the chargeable amount based on the time in which each selected function has been executed. This makes it possible to establish a scheme for charging the apparatus not for its value as a whole but for the amount commensurate with the way it has been used.

The user of the apparatus thus pays solely according to how long the apparatus has been utilized. The same scheme applies to any new product, alleviating the user's grumbling about having to pay for ever-newer products appearing all the time to replace their prematurely outmoded predecessors.

In on preferred structure according to the invention, the chargeable amount computing element may compute the chargeable amount based on the execution time for each of the functions and through weighting on a function-by-function basis.

The apparatus of the invention may forestall the measuring of time if it is powered but not actually used. A suitable charging process may be implemented depending on which of different functions with different utility values has been used. Illustratively, the playback function, rewind function, fast forward function, and recording function may each be charged in an appropriately weighted manner when used in practice.

In another preferred structure according to the invention, the apparatus may further include: a storing element for storing a usable time of the apparatus; and a settling element for subtracting a time representing the chargeable amount computed by the chargeable amount computing element, from the usable time stored in the storing element.

With this preferred structure, the user is allowed to user to decide on a desired period of time and to store that period as a usable time in the storing element. The storing of the usable time into the storing element may be effected in consideration of a payment. The apparatus of this structure causes the usable time to be decremented by the time over which the apparatus has been actually used, allowing the user to employ the apparatus until the usable time is fully exhausted.

According to another aspect of the invention, there is provided an electronic apparatus including: an input detecting element for detecting a text input; and a controller for checking the input text detected by the input detecting element and setting the electronic apparatus for a time charge mode depending on a result of the check.

The electronic apparatus of the above structure may be set by a text input either for a conventional sell-off model or for a time-charged model. There is no need to distinguish the two different models of the same apparatus during fabrication.

According to a further aspect of the invention, there is provided an electronic apparatus including: an operation inputting element for designating at least an operating state and a non-operating state; a used time measuring element for measuring duration of the operating state as a used time; a cumulative time measuring element for measuring an accumulated used time resulting from the measuring by the used time measuring element; and a chargeable time computing element for computing a chargeable time by weighting the used time measured by the used time measuring element in accordance with a weighting factor reflecting the accumulated used time measured by the cumulative time measuring element.

The electronic apparatus of the above structure permits a charging practice that takes depreciation of the apparatus into consideration. More specifically, charges are weighted in accordance with the used time representative of product depreciation, i.e., the charging rate may be reduced over time. Many products used as fixed assets by corporations are conventionally bought by payment in full. In that case, depreciation expenses necessarily deviate chronologically from the actual spending of money on the product. By contrast, the inventive electronic apparatus allows its depreciation expenses to be spread substantially in time with the actual payment.

According to an even further aspect of the invention, there is provided an electronic apparatus including: an operation inputting element for designating at least an operating state and a non-operating state; a used time measuring element for measuring duration of the operating state as a used time; a chargeable time computing element for computing a chargeable time based on the used time measured by the used time measuring element; a memory for storing usable time information about the electronic apparatus; a settling element for subtracting the chargeable time computed by the chargeable time computing element from the usable time stored in the memory; and a reading element for reading the usable time information from the memory to notify a user thereof.

With this structure, the memory continuously retains the usable time information about the apparatus in question. The usable time information can be retrieved by the reading element.

When the usable time information is retrieved from the electronic apparatus for conversion into a utility value, it is possible to market the apparatus as a secondhand product offering its remaining utility value, whereby a secondhand product market is created.

As outlined above, the user is charged for and pays up the exact amount of product time used according to the invention. The scheme clarifies the value of a given product from the user's point of view. Because the chargeable rate is varied from function to function regarding the product, it is possible to build a reasonable charging system that satisfies the user's sense of fairness. The user, if desired, may replace the currently used product with a new model every time such a model comes along.

The inventive scheme replaces the traditional concept of transferring a product's ownership and lifetime use to a customer for a consideration, with a new concept of charging the user for the exact amount of product usage time. With people's obsession of product ownership discarded, it becomes easier for used products to be recovered and recycled, whereby a truly recycle-oriented society can be realized in time.

Other objects, features and advantages of the invention will become more apparent upon a reading of the following description and appended drawings.

BRIEF DESCRIPTION OF THE DRAWINGS

FIG. 1 is a schematic view outlining a charging system practiced as a first embodiment of this invention;

FIG. 2 is a graphic representation explaining a key aspect of the first embodiment;

FIG. 3 is a schematic illustration explaining more about the first embodiment;

FIG. 4 is a schematic illustration explaining more about the first embodiment;

FIG. 5 is a block diagram sketching a typical structure of an electronic apparatus practiced as the first embodiment;

FIG. 6 is a flowchart of steps constituting charge processing performed by the first embodiment;

FIG. 18 is a flowchart of further steps constituting the data transfer process for settlement performed by the charging system of the second embodiment;

FIG. 40 is a block diagram of an electronic apparatus practiced as the ninth embodiment;

FIG. 49 is a conceptual view explaining a virtual trading market on which virtual currency UT is traded in conjunction with the ninth embodiment;

DESCRIPTION OF THE PREFERRED EMBODIMENTS

Figure 7:
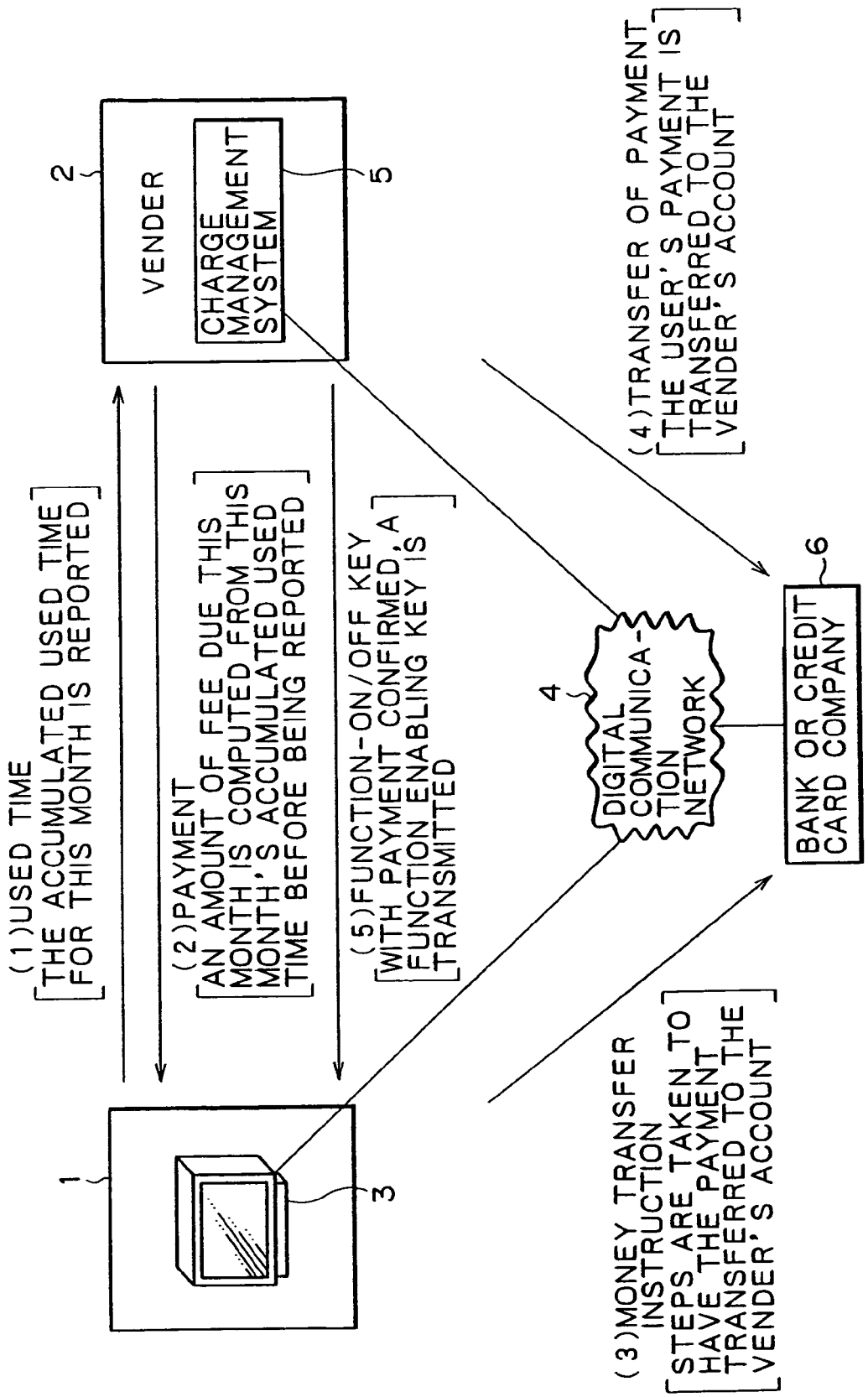
FIG. 7 is an explanatory view illustrating how charge processing is performed by the first embodiment.

Preferred embodiments of this invention will now be described in the form of a charging system and an electronic apparatus, among others, with reference to the accompanying drawings.

First Embodiment

The first embodiment of this invention is implemented as an electronic apparatus to be charged and paid for an accumulated time period of actual use. The first embodiment adopts a depreciation scheme that requires the user to pay the most per unit time when the product in question is brand-new, to pay less per unit time as the used time accumulates, and to stop paying when the accumulated used time has reached a predetermined time, i.e., when the accumulated payments have reached a predetermined amount.

The electronic apparatus to be charged is any product that incorporates a microcomputer and is connectable to a digital communication network such as the Internet. Such products include personal computers and Internet television sets.

FIG. 1 is a schematic view outlining a used time charging system practiced as the first embodiment of this invention. With this embodiment, a user 1 concludes a use contract with a vender 2 regarding an electronic apparatus 3 offered by the vender 2. When in use, the electronic apparatus 3 is connected to a digital communication network 4 such as the Internet. A charge management system 5 of the vender 2 is also connected to the digital communication network 4.

Under the use contract different from a sales contract, the user 1 does not pay upon receipt of the product. Instead, the user 1 pays for the length of time in which the electronic apparatus 3 has been used. The first embodiment allows the user 1 to make payments for used time on a depreciation basis.

Under the contract, the user 1 agrees with the vender 2 on how to settle used time-based charges. Whereas there are a variety of ways to settle charges, a typical case is explained below which involves resorting to a bank or a credit card company.

The electronic apparatus 3 to be charged is designed to measure the time in which it has been actually used and to store the accumulated used time into a built-in memory or an external memory, as will be described later. In this example, as long as the electronic apparatus 3 is turned on, it is considered to be in a chargeable operating state. The used time, when measured, is incremented illustratively by the minute.

When furnished with the chargeable electronic apparatus 3 from the vender 2, the user 1 transmits in a report the accumulated used time from the memory of the apparatus to the vender 2 over the digital communication network 4. The reporting is done at predetermined intervals (e.g., every month) or in response to a settlement date notice from the vender 2.

Given the accumulated used time reported, the charge management system 5 of the vender 2 measures as a chargeable time the period of use between the preceding settlement date and the current settlement date. By use of the accumulated used time received, the charge management system 5 determines a time unit price, i.e., price to be paid per unit time, for the current charge computation.

FIG. 2 is an explanatory view graphically showing a relationship between accumulated used time and time unit price. As indicated, the longer the accumulated used time, the lower the time unit price. When the accumulated used time reaches a certain time, i.e., when the paid amount reaches a certain level, the time unit price becomes zero.

The charge management system 5 of the vender 2 stores the time-price relationship table of FIG. 2 inside. Given the accumulated used time, the system 5 references the table to determine a time unit price to be used for the current charging. A fee to be charged to the user is computed by having the chargeable time due on the settlement date multiplied by the time unit price determined above.

The user 1 pays the fee by settling the charge in a predetermined manner. At the vender 2, the charge management system 5 verifies the payment of the fee. If the charge is not settled by the settlement date, the charge management system 5 transmits to the electronic apparatus 3 a key that disables functions of the apparatus. Upon receipt of the disabling key, the electronic apparatus 3 has its functions turned off partially or as a whole.

If the charge management system 5 has later confirmed the payment of the fee by the user 1, the system 5 sends to the electronic apparatus 3 a key that enables the functions of the apparatus. Given the enabling key, the electronic device 3 resumes its functionality to permit use by the user 1.

FIG. 3 is an explanatory view showing a flow of steps from acquisition of the electronic apparatus 3 as the first embodiment to the start of its use by resorting to a bank or a credit card company. FIG. 4 is an explanatory view depicting typical transactions among the user 1 upon start of use of the electronic apparatus 3, the vender 2, and the bank or credit card company 6.

As shown in FIG. 3, the user 1 acquires the electronic apparatus 3 as a chargeable product from the vender 2. At this point, a product identifier (product ID) is written to a memory of the electronic apparatus 3. The product ID may be written to the memory either during fabrication of the apparatus or when the apparatus is handed over to a user (i.e., at the time of sales). The charge management system 5 of the vender 2 retains the product ID in conjunction with a user identifier (user ID) as user management information (in step A of FIG. 3).

If the user has no bank account or credit card company's account, then a bank account or a credit card company's account is opened (in step B). The established bank account or credit card company's account is written along with a password to the memory of the electronic apparatus to be charged (in step C).

As indicated in "(1) Start of Use Reported" in FIG. 4, the user 1 reports the start of use of the electronic apparatus 3 to the charge management system 5 of the vender 2 (in step D). The information reported at this point includes use start notice information, the product ID, the user's name, the bank account number or credit card number (representing a credit card company's account), and a password.

When the electronic apparatus 3 has thus been set up and the charge management system 5 notified thereof, the system 5 verifies the user and his or her account at the bank or credit card company 6 by employing the user's name and the bank account number or the credit card number included in the reported information, as shown in "(2) Verification" in FIG. 4.

After verifying the user and his or her account, the charge management system 5 transmits in token of use start approval an enabling key that allows the electronic apparatus 3 to turn on its functions, as indicated in "(3) Approval" in FIG. 4. The key enables the electronic apparatus 3 to function for use by the user 1.

FIG. 5 is a block diagram sketching a typical structure of the electronic apparatus 3 as the first embodiment. The electronic apparatus 3 includes a controlling part 11 for controlling the apparatus as a whole, a hardware part 12 for executing functional operations of the apparatus, a nonvolatile memory 13, and a network part 14 for connection with the digital communication network 4.

The controlling part 11, although not shown, comprises firmware for controlling the electronic apparatus 3, charging system controlling software, and function-on/off controlling software. The controlling part 11 includes a counter part 15 that measures time units in which charges are made. Also included in the controlling part 11 is a clock part 16 that manages settlement dates illustratively at monthly intervals.

The function-on/off controlling software of the controlling part 11 turns on and off the hardware part 12 based on a function-on/off key acquired from the charge management system 5 through the network part 14.

As mentioned above, the nonvolatile memory 13 contains not only the product ID, the bank account number or credit card number and the password, but also an accumulated time period of actual operation of the apparatus as measured by the charging system controlling software of the controlling part 11.

The counter part 15 in the controlling part 11 measures a time period in which the electronic apparatus 3 has been turned on. When the measured time has amounted to a unit time, a unit time elapse output signal such as a carry signal is output.

Given the unit time elapse output signal from the counter part 15, the charging system controlling software in the controlling part 11 reads the accumulated used time from the nonvolatile memory 13 and increments the retrieved time by "1." The incremented used time is written back to the nonvolatile memory 13. This allows the nonvolatile memory 13 to get its accumulated used time content continuously updated.

Given time information from the clock part 16, the charging system controlling software of the controlling part 11 determines whether a settlement date has come due. When the settlement date is judged to have arrived, the charging system controlling software reads from the nonvolatile memory 13 such data as accumulated used time information, the product ID and account number and sends the retrieved data to the charge management system 5 through the network part 14 over the digital communication network 4.

In response to the transmission of the accumulated used time and other information regarding the settlement date, the charge management system 5 returns charges for the currently accumulated used time. The controlling part 11 in the electronic apparatus 3 causes a display part 17 such as an LCD (liquid crystal display) to display the charged fee for the user 1 to take notice. At this point, the settlement date reported from the charge management system 5 is also shown on the screen of the display part 17.

If the user 1 fails to pay past the settlement date, the charge management system 5 sends a disabling key causing the electronic apparatus 3 to turn off its functions. Upon receipt of the key, the controlling part 11 disables the electronic apparatus 3 by turning off the hardware part 12. If the user 1 pays up the fee for the currently accumulated used time, the charge management system 5 transmits an enabling key that allows the electronic apparatus 3 to turn on its functions. Given the key, the controlling part 11 enables the electronic apparatus 3 by turning on the hardware part 12.

FIG. 6 is a flowchart of typical charging steps performed by the first embodiment. FIG. 7 is an explanatory view illustrating how payments are made when a bank or a credit card company is involved.

As shown in FIG. 6, the controlling part 11 continuously measures the accumulated used time of the electronic apparatus 3 as a chargeable product in the manner described above (step S1). The controlling part 11 of the electronic apparatus 3, using the clock part 16, checks whether a predetermined period of time has elapsed since the last settlement, i.e., whether another settlement date has arrived (step S2). If the settlement date is judged to have arrived, the controlling part 11 reports at least the product ID and accumulated used time information to the charge management system 5 of the vender 2 over the digital communication network 4 (in step S3; "(1) Used Time" in FIG. 7).

Upon receipt of the product ID and user management information (user ID), the charge management system 5 identifies the user 1. The system 5 computes a chargeable used time by obtaining the difference between the last-settled accumulated used time and the accumulated used time reported this time. In addition, the charge management system 5 acquires a time unit price for use in the current charge computation by referring to the time-unit price relationship table in FIG. 2 and on the basis of the currently accumulated used time.

The fee corresponding to the currently accumulated used time is computed (in step S4) by the charge management system 5 using the following formula:

$$\text{fee due this time} = \text{chargeable used time} \times \text{time unit price}$$

Through the digital communication network 4, the charge management system. 5 notifies the electronic apparatus 3 of the computed amount of the fee for the currently accumulated used time (in step S5; "(2) Payment" in FIG. 7).

Upon receipt of the amount of the fee due this time, the electronic apparatus 3 displays the received information on the screen to notify the user 1 thereof. The user 1 is thus charged for the currently accumulated used time (in step S6).

On receiving the charges, the user 1 takes steps to have the appropriate payment transferred from his bank account or credit card company's account to the account of the vender 2 ("(3) Money Transfer Instruction," "(4) Transfer of Payment" in FIG. 7). Alternatively, the transfer of the payment may be carried out automatically between the bank accounts involved.

The charge management system 5 checks to see if the fee due this time is paid up (in step S7). If no payment is judged to be made, the charge management system 5 transmits over the digital communication network 4 a key for turning off the functions of the electronic apparatus 3 (in step S8).

If the charge management system 5 later ascertains that the payment has been made (in step S7), it transmits over the digital communication network 4 a key that allows the electronic apparatus to turn on its functions (in step S9).

The charge management system 5 checks to see if the accumulated used time of the electronic apparatus 3 has reached a predetermined time limit where the time unit price becomes zero. If the time limit has yet to be reached, the system 5 proceeds to settle the charges on the next settlement date. If the time limit is judged to be reached, the charge management system 5 notifies (not shown) the electronic apparatus 3 that settlement of fees is not necessary from now on and terminates the charging process. Given the notice, the electronic apparatus 3 displays it on the display part 17 to draw the user's attention and will not perform charging process from that point on. The user 1 is allowed continuously to use the electronic apparatus 1 free of charge.

Second Embodiment

Figure 8:
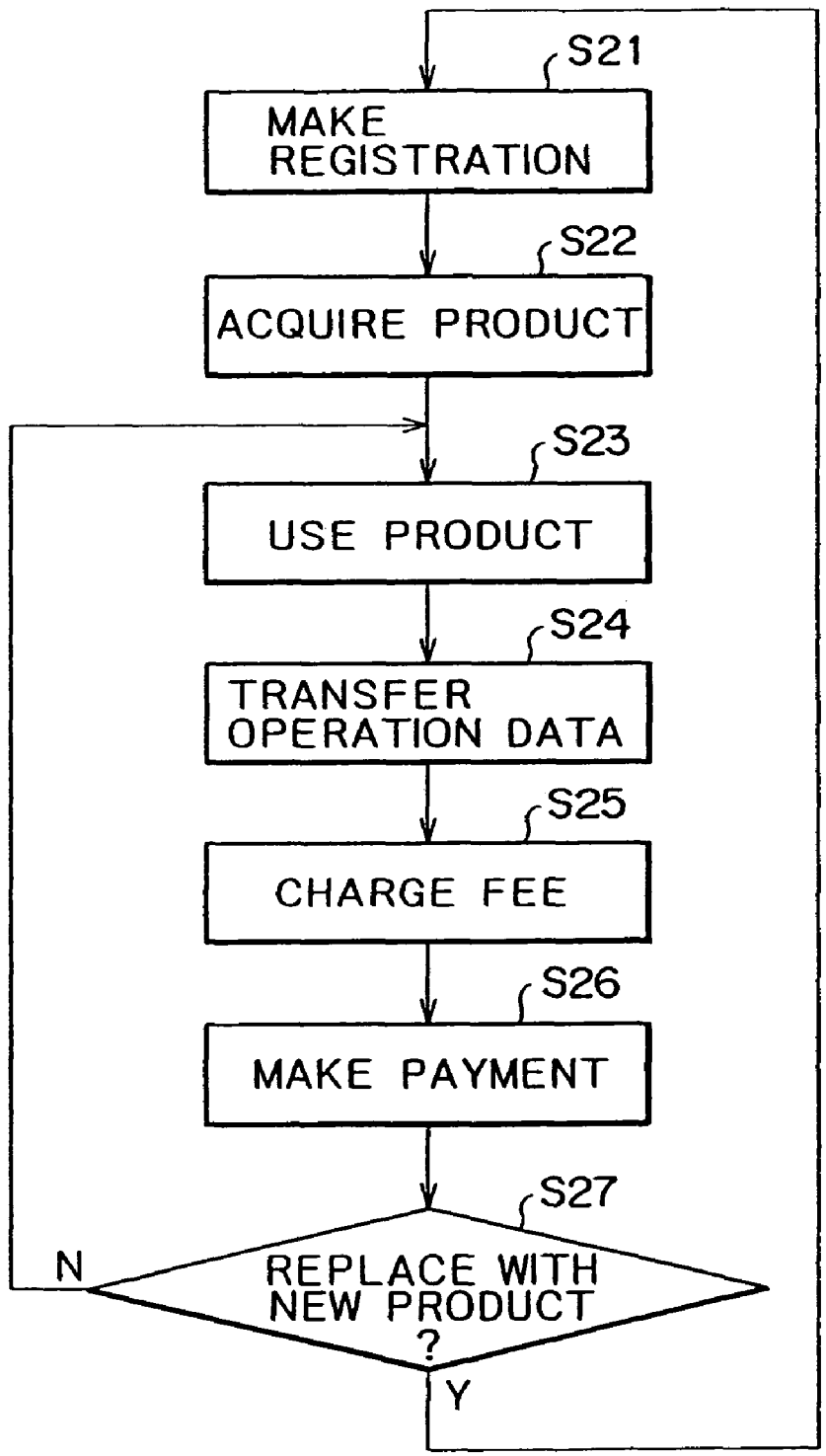
FIG. 8 is a flowchart of steps outlining how a charging system practiced as a second embodiment of this invention typically works.
Figure 9:
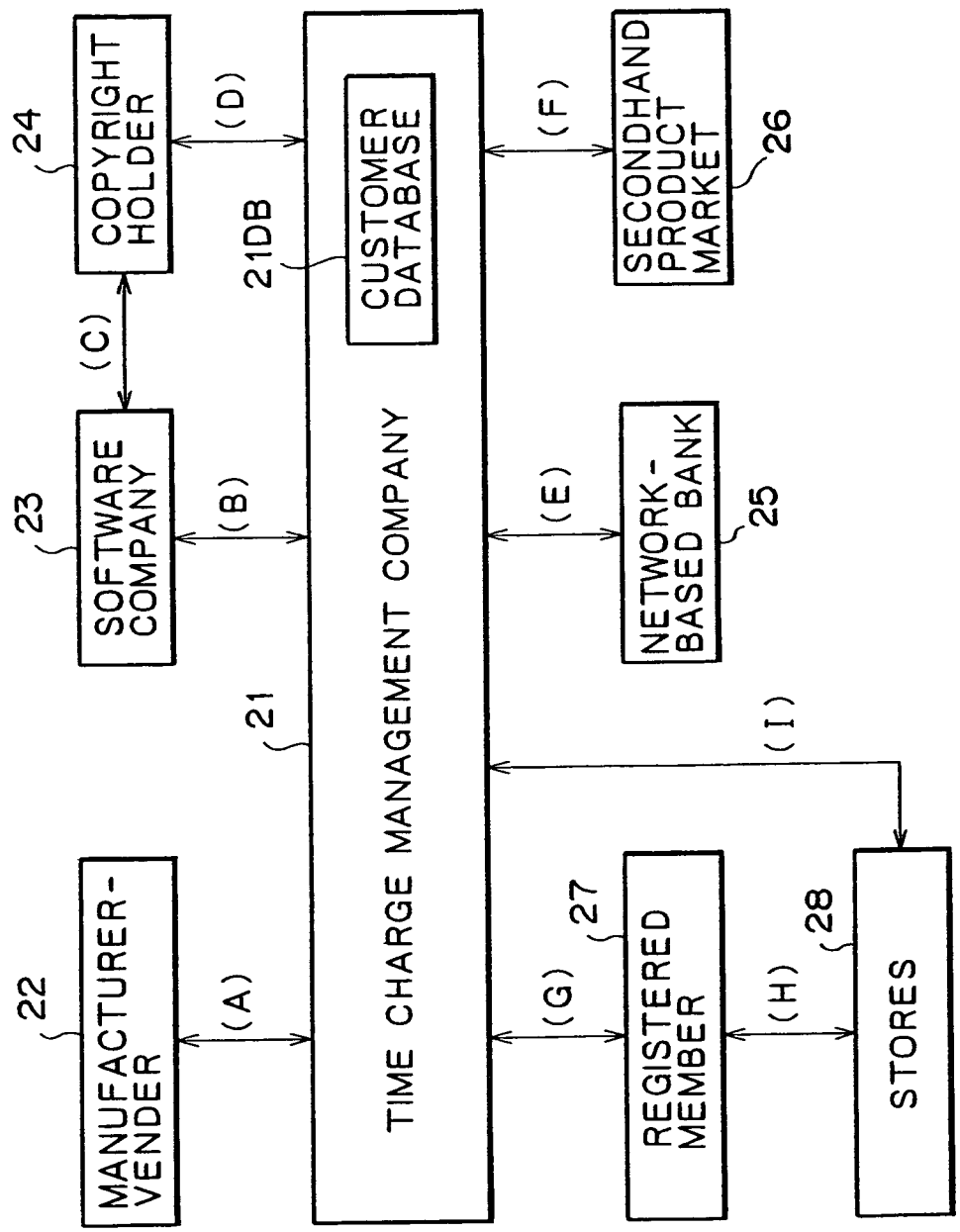
FIG. 9 is an explanatory view outlining the charging system of the second embodiment.

The second embodiment of this invention is also implemented as an electronic apparatus to be charged and paid for an accumulated time period of actual use. FIG. 8 is a flowchart of steps representing overall processing performed by the second embodiment. FIG. 9 is an explanatory view outlining a business model of the second embodiment constituting a used time-based charging system. FIG. 9 illustrates how companies and customers are typically organized around a time charge management company 21 that manages charges based on the used time of chargeable products.

As shown in FIG. 9, the second embodiment involves the time charge management company 21 having a relation A with a manufacturer-vender 22. In the relation A, the management company 21 subcontracts development and production of time use-chargeable products to the manufacturer-vender 22 and purchases the products from the latter.

There can be a number of types of purchase contracts between the time charge management company 21 and the manufacturer-vender 22. One purchase contract may be a simple sales contract whereby the time charge management company 21 has the ownership of the products purchased from the manufacturer-vender 22. Another type of purchase contract may be the combination of a sales contract and a partial fee sharing contract, to be described later, whereby payments of used time-based fees are partially shared between the two companies. Yet another type of purchase contract may involve only a partial fee sharing contract with no purchase contract made (product ownership belongs to the manufacturer-vender 22), whereby payments of used time-based fees are partially shared between the two companies.

A software company 23 has a relation C (FIG. 9) with a copyright holder 24. In the relation C, the software company 23 subcontracts production of software to the copyright holder 24 and purchases software from the latter. Between the software company 23 and the time charge management company 21 is a relation B (FIG. 9) wherein the software company 23 supplies software to the management company 21. The time charge management company 21 also has a relation D (FIG. 9) direct with the copyright holder 24. In the relation D, the management company 21 subcontracts production of software direct to the copyright holder 24 and purchases software from the latter.

The time charge management company 21 has a relation E (FIG. 9) with a network-based bank 25 regarding settlements and financing. The management company 21 also has a relation F (FIG. 9) with a secondhand product market 26 such as network auction sites where old products replaced by their successors are put on sale.

The time charge management company 21 has a relation G (FIG. 9) with a registered member 27 regarding the transfer of such data as product supply information and chargeable time data. In turn, the registered member 27 has a relation H (FIG. 9) with a shop 28. The shop 28 has a relation I (FIG. 9) with the time charge management company 21 regarding the collection of fees from the registered member 27 and the delivery of products to the latter.

A customer becomes a registered member 27 when having his name registered with the time charge management company 21 (in step S21 of FIG. 8). The registered member 27 may obtain (in step S22) and use (in step S23) a desired chargeable product such as an electronic apparatus.

Registration of membership may be done either over the counter of the time charge management company 21 or at a website on the Internet in electronic fashion. In the case of electronic registration, the chargeable product is handed over to the registered member 27 illustratively by way of the shop 28, such as a convenience store, that has a contract with the time charge management company 21. It is also possible to deliver the product by mail from the time charge management company. 21 to the registered member 27.

Upon registration, the member 27 is granted a member identifier (member ID, also serving as the user ID).

The time charge management company 21 has a customer database 21DB that stores such membership information as members' IDs, names (of individuals and corporations), ages, addresses, electronic mail addresses, contract periods, settlement methods (to be described later), and bank account numbers or credit card numbers on all members.

A memory of each electronic apparatus as a chargeable product contains individual information such as the product identifier (product ID), member ID, member's address, and member name, as well as date information. With such information written to the memory, the chargeable product is handed over to the registered member 27.

In the customer database 21DB of the time charge management company 21, member IDs are stored in association with the product IDs of the products used by the members in question. Writing of the product ID to each chargeable product may be done either by the time charge management company 21 or by the manufacturer-vender 22.

The chargeable product used by the registered member 27 may be replaced by another product during the contract period. If such replacement is carried out, memory contents of the products involved are updated and so are the contents of the customer database 21DB regarding the product IDs in question. The contract period may be altered as well if desired.

Each registered member 27 also registers his preferred settlement method with the time charge management company 21. The registered settlement method is added by the company 21 to the record about the member 27 in question. There are a number of settlement methods: using the member's bank account; using the member's credit card account; transferring payments from a bank branch, a post office or a convenience store to the time charge management company's account; or utilizing a proprietary electronic money settlement system established by the management company. The preferred settlement method may be replaced by another method during the contract period if desired.

When using his bank account or credit card account for settlement, the registered member 27 notifies the time charge management company 21 thereof along with a password. These items of information are placed into the customer database 21DB in the manner described above.

The registered member 27 sends operation data to the time charge management company 21 at predetermined intervals, in response to a settlement request made by the chargeable product itself, or upon receipt of charges from the company 21 (in step S24 of FIG. 8). The operation data cover the period between the last settlement date and the current settlement date (i.e., which constitutes the chargeable period).

The operation data, as will be described later, includes a power-on/off count, function-wise operation information about the electronic apparatus, media-related information, TV channel information, music information, video information, and defect information. The function-wise operation information about the electronic apparatus includes function key-on/off information and function-wise operation time information.

Given the operation data sent from each registered member 27, the time charge management company 21 computes a used time-based fee for the chargeable product of the member in question. With the fee computed, the management company 21 sends charges to the registered member 27 (in step S25 of FIG. 8).

Each registered member 27 settles the charges using the registered settlement method (in step S26 of FIG. 8).

If a new product with enhanced functionality comes along, the registered member 27 is informed thereof illustratively by the website on the Internet or by facsimile. If the member 27 wishes to replace the current product with the new one, the replacement registration is carried out over the counter at the time charge management company 21 or shop 28, or at the website on the Internet, and the products are switched (in step S27 of FIG. 8).

Each old product replaced by the new one is returned and auctioned off on the secondhand product market 26 such as network auction sites. Alternatively, the used products may be freshened up and sold at fixed discount prices.

With the second embodiment, the electronic apparatus as the chargeable product is assumed to have a plurality of functions. One such apparatus may be a recording and reproducing apparatus offering such diverse functions as playback, recording, fast forward, rewind, pause, and stop. The used times of the functions are not merely added up to compute a chargeable time; the chargeable time is computed by having the used time of each of the functions multiplied by a weighting factor established in advance for each function.

Illustratively, the functions related directly to usage by the user are given larger weighting factors; those functions not directly associated with actual use by the user are provided with smaller weighting factors. A function that cost much when developed may be given a larger weighting factor than less costly functions.

For example, a playback key (i.e., playback function) of video and/or audio equipment may be considered the reference function having a weighting factor of 1. With respect to that reference function, a stop key (stop function) and a rewind key (rewind function) may be given a weighting factor of 0 each in advance; a fast forward key (fast forward function) may have a weighting factor of 0.5; a recording key (recording function) may be given a weighting factor of 1.2; and an effect key (effect function) may have a weighting factor of 2.

With the second embodiment, different electronic apparatuses may be given in advance different weighting factors used to compute a chargeable time based on used time. Illustratively, if audio apparatuses are given a weighting factor of 1, then video apparatuses may have a weighting factor of 1.5 to provide for the playback of both video and audio information. Text-oriented apparatuses may be given a weighting factor of 0.8 for their simplified function.

Varied weighting factors may also be adopted depending on the types of media in use such as CD (compact disc), MD (MiniDisc), DVD (digital video disc), television, and radio.

Described below in detail is how the second embodiment is implemented through the combination of two weighting schemes: weighting by electronic device type, and weighting on a function-by-function basis. The function-wise weighting is effected in accordance with a load factor P of the CPU in a microcomputer part 31. The load factor P of the CPU is determined by the rate of time in which the CPU operates continuously (including sleep time) for each of the functions involved.

Figure 10:
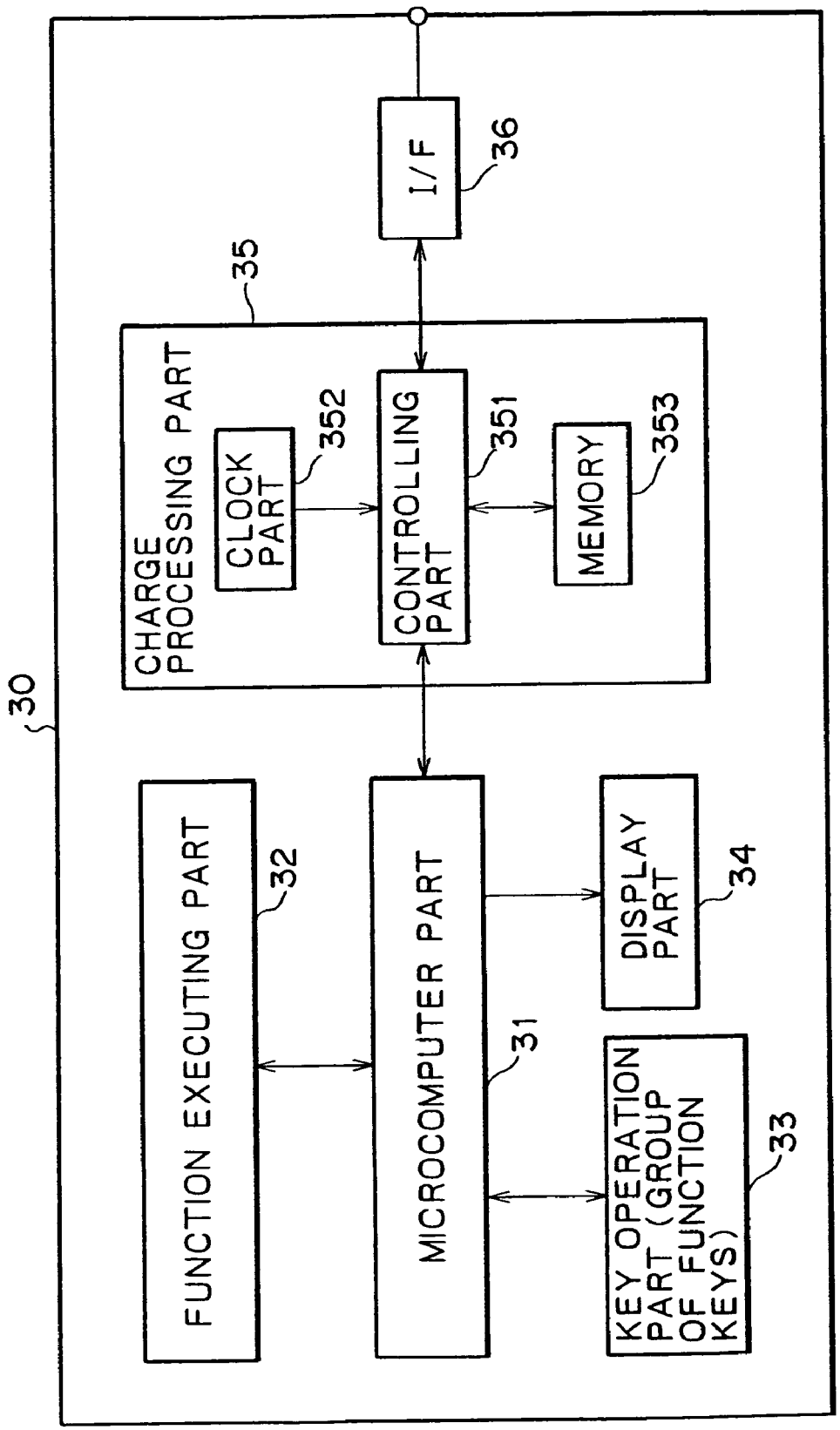
FIG. 10 is a block diagram illustrating a typical structure of an electronic apparatus employed as the second embodiment.

FIG. 10 is a block diagram of an electronic apparatus 30 employed as a used time charging system constituted by the second embodiment. As shown in FIG. 10, the electronic apparatus 30 of the second embodiment comprises the microcomputer part 31 that makes up a controlling part for overall control of the apparatus 30; a function executing part 32 made up of a storage medium drive, a digital signal processor and an analog signal processor; a key operation part 33 constituted by a plurality of function keys; a display part 34 illustratively composed of a liquid crystal display; a charge processing part 35; and an interface part 36 for interfacing with a personal computer.

The charge processing part 35 is constituted by a controlling part 351 made of a microcomputer, by a clock part for measuring time, and by a nonvolatile memory 353. The charge processing part 35 may be implemented as a one-chip IC which is either connected with an externally furnished nonvolatile memory .353 or incorporates such a nonvolatile memory 353.

The microcomputer part 31 determines which function key has been operated given an input operation by the user on the key operation part 33. With the operated function key recognized, the microcomputer part 31 controls the function executing part 32 accordingly. In addition, information about the operated function key is transferred to the controlling part 351 in the charge processing part 35.

Given the function key information from the microcomputer part 31, the controlling part 351 in the charge processing part 35 ascertains that a specific function corresponding to the function key in question is being selectively executed. By referring to time information from the clock part 352, the controlling part 351 measures an execution time of the function in question, i.e., the time in which the function is being used. On the basis of the used time thus measured, the controlling part 351 computes a chargeable time in the manner described earlier. The computed chargeable time is stored into the memory 353.

Figure 11:
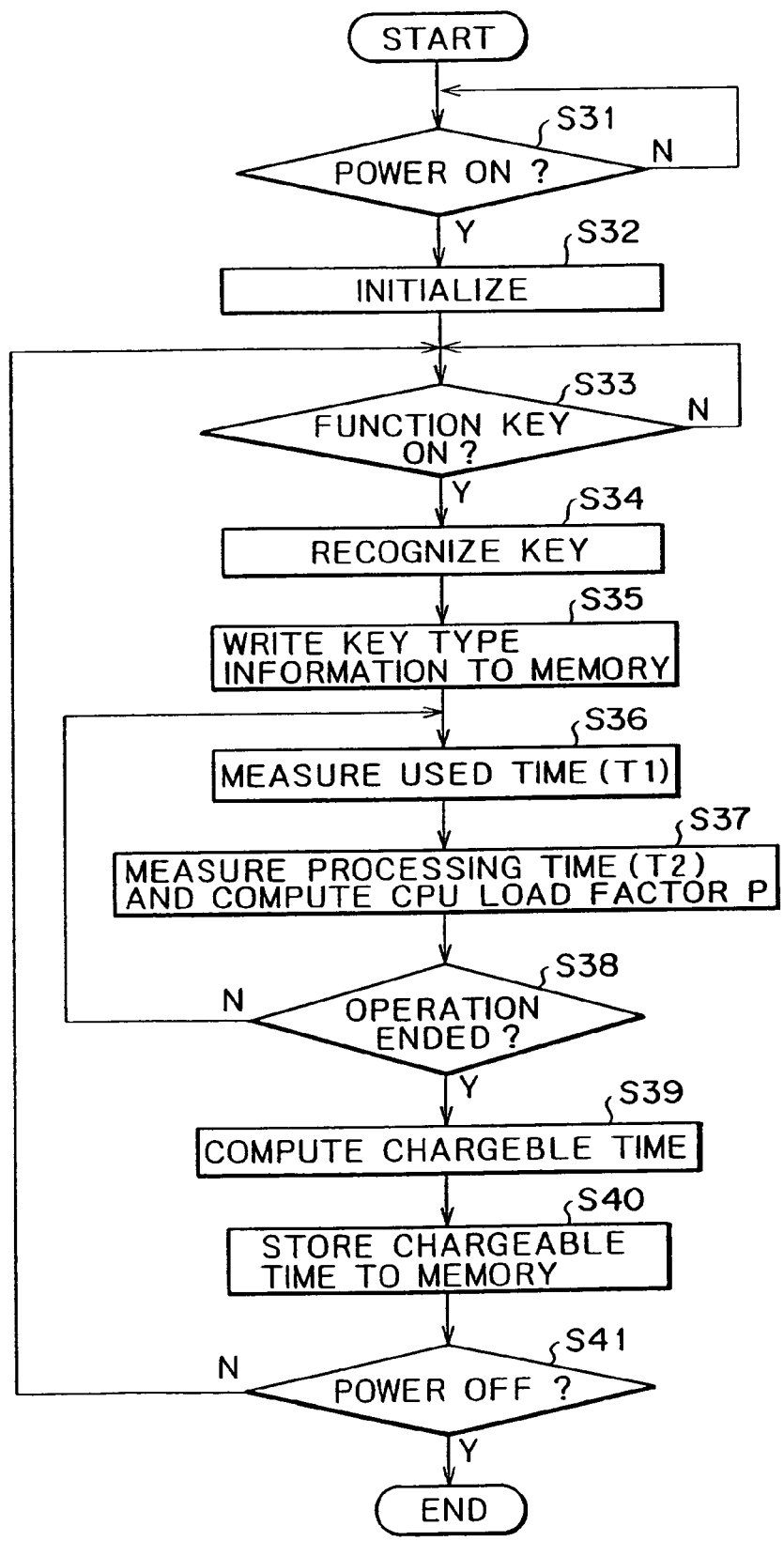
FIG. 11 is a flowchart of steps performed by the electronic apparatus of the second embodiment.

FIG. 11 is a flowchart of steps in which the electronic apparatus 30 computes the chargeable time for each function and stores the computed time.

When the electronic apparatus 30 is turned on (in step S31), initialization is carried out (in step S32). A check is then made to see if any function key is operated (in step S33). If a function key is judged operated, the key in question is recognized (in step S34). These steps are carried out by the microcomputer part 31.

Information about the recognized function key is sent from the microcomputer part 31 to the controlling part 351 in the charge processing part 35. The controlling part 351 recognizes the operated function key, and writes to the memory 353 key type information identifying the recognized function key (in step S35).

Using information from the clock part 352, the controlling part 351 measures an execution time of the activated function, i.e., a used time T1 of the function in question (in step S36). The used time T1 includes a sleep time in which the CPU of the microcomputer part 31 has been in a sleep state. Then a processing time T2 in which the CPU of the microcomputer part 31 has been continuously operating, i.e., a CPU operation period excluding the sleep time is measured, and the load factor P of the CPU in the microcomputer part 31 is computed (in step S37).

The load factor P is computed by use of the following expression:

$$P=(T2/T1)\times K$$

where, K denotes a coefficient of variation determined by the type of equipment such as video equipment, audio equipment, television set, or storage medium in use. Because it varies with the equipment type, the coefficient may be called an equipment type-wise coefficient.

Step S36 to measure the used time T1 and step S37 to measure both the processing time T2 and the CPU load factor P are repeated, until execution of the function in question comes to an end (in step S38). In this example, the CPU load factor P is computed repeatedly during function execution. Alternatively, the CPU load factor P may be calculated at the end of the function execution.

When execution of the function is judged to have ended, the controlling part 351 in the charge processing part 35 computes a chargeable time "t" (in step S39) using the following expression:

$$\text{chargeable time } t = \text{used time } T1 \times \text{CPU load factor } P$$

Information about the chargeable time "t" resulting from the computation is written to the memory 353 (in step S40). Since the chargeable time "t" is given as T2×K, it is possible alternatively to measure only the processing time T2 and skip used time (T1) measurement.

A check is made to see if power is turned off (in step S41). If power is not turned off, step S33 is reached again and activation of another function key is awaited. If power is judged to be removed, this processing routine is terminated.

Figure 12:
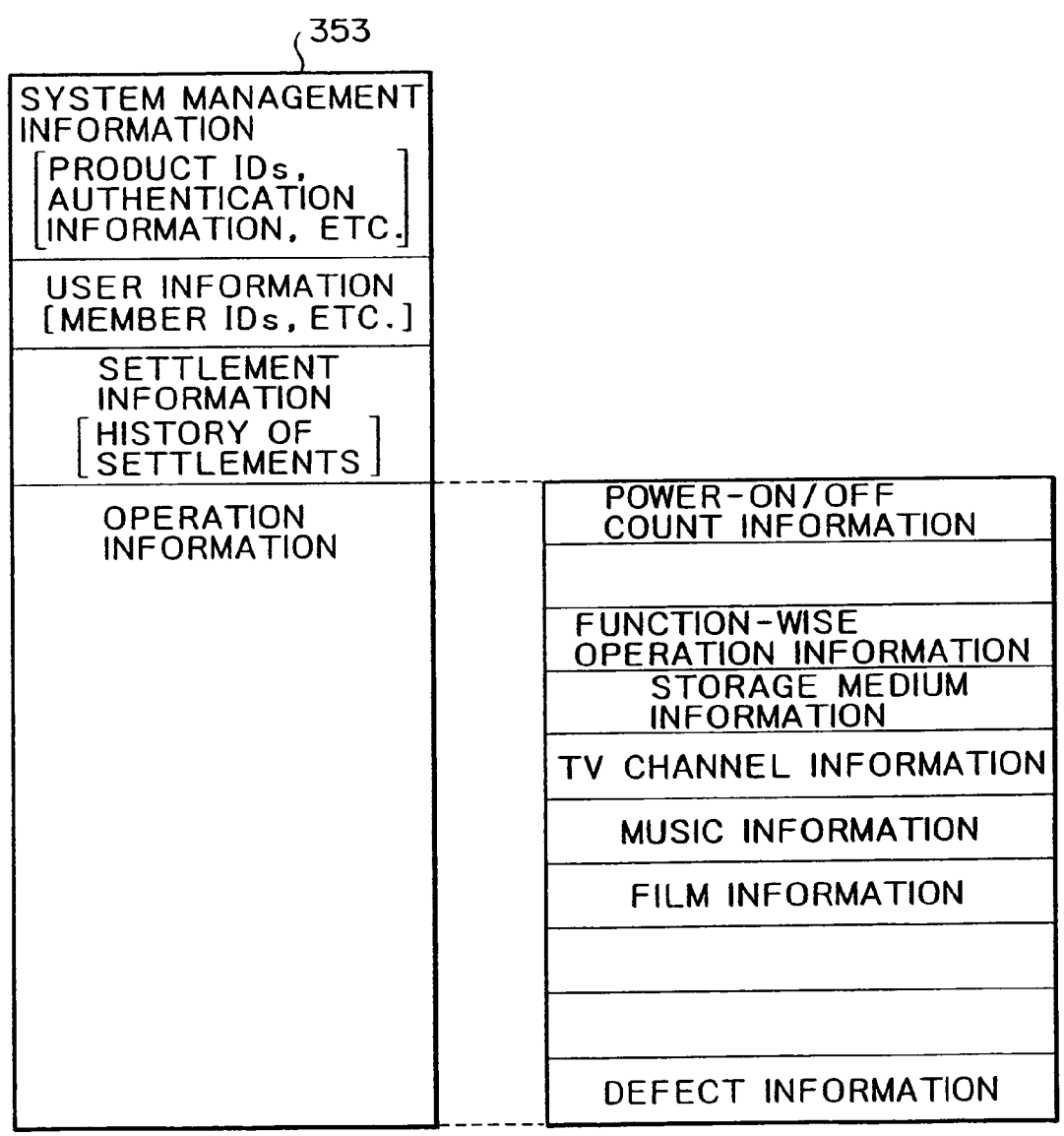
FIG. 12 is a schematic view of what is contained in a memory of the electronic apparatus used as the second embodiment.

FIG. 12 is a schematic view of what is contained in the memory 353 of the charge processing part 35. Specifically, the memory 353 has its retained data classified into system management information, user information, settlement information, and operation information. The pieces of such information are held at appropriate memory addresses.

The system management information includes product IDs, used time restriction information about products whose used times among others are limited under contract, and authentication information. The user information includes such individual information as member IDs, user names, ages, bank accounts and credit card numbers. The settlement information comprises the number of settlements, venue for settlement, and date information.

The operation information includes such diverse types of information as power-on/off count information; function-wise operation information designating chargeable times on a function-by-function basis; storage medium information on CDs, MDs and DVDs employed; TV channel information indicating which channel has been watched for how long; music information detailing, among others, which pieces of music by whom have been played back; film information about the titles of films watched; defect information; and download time information for an electronic apparatus having a downloading function.

The operation information is sent to the time charge management company 21. The company 21 computes fees based on the received information in accordance with the terms of contract with the registered member, and sends the charges to the latter.

Figure 13:
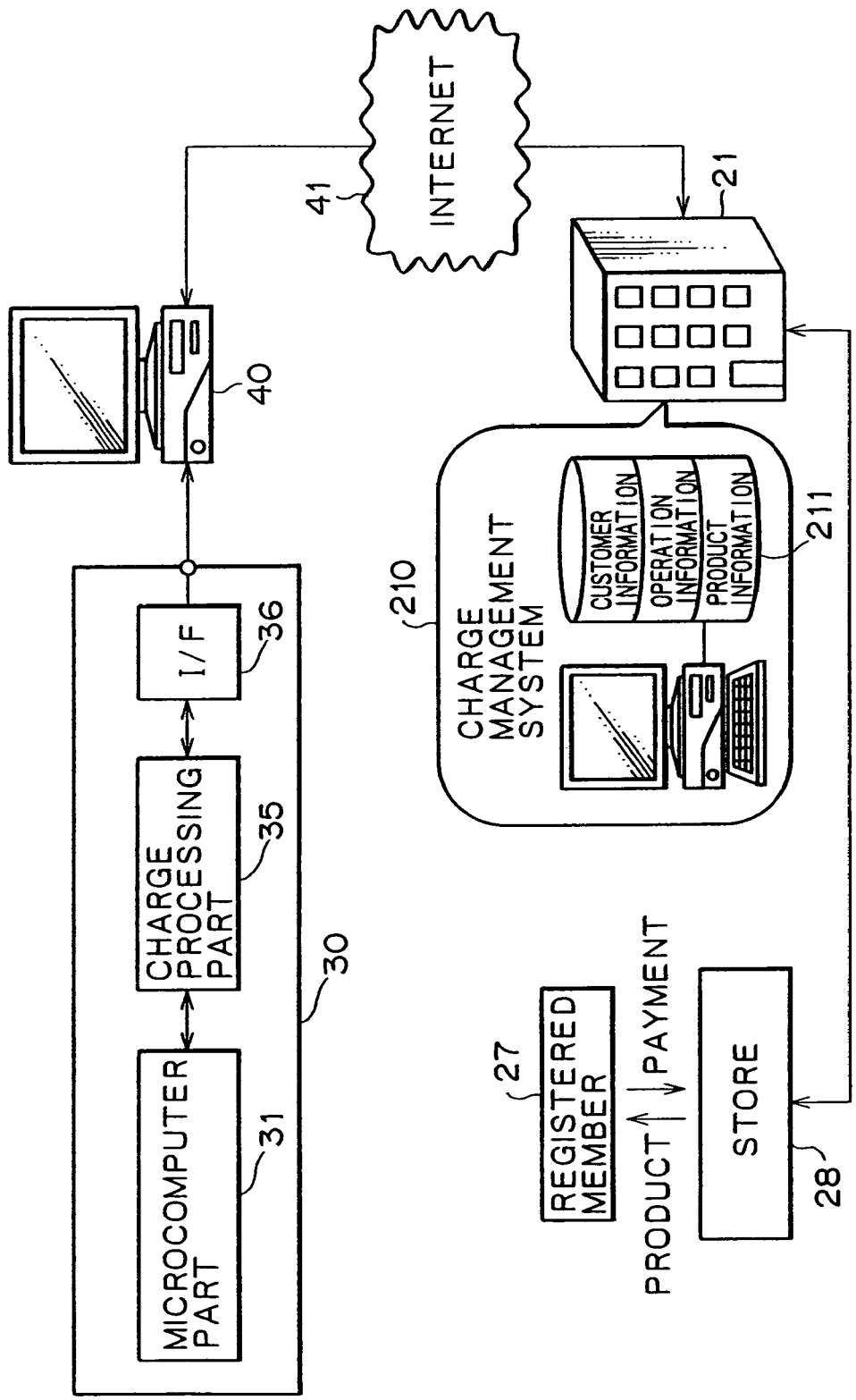
FIG. 13 is a schematic view explaining how charges are settled by the charging system of the second embodiment.

As shown in FIG. 13, the electronic apparatus 30 of the second embodiment is connected to a personal computer 40 through the interface 36. On receiving a data transfer request from the personal computer 40, the electronic apparatus 30 reads the product ID, member ID and operation information from the memory 353 and transfers the retrieved data to a storage part such as a hard disc drive of the computer 40.

The personal computer 40 is connected to a charge management system 210 of the time charge management company 21 via a digital communication network such as the Internet 41. When a settlement date draws near, the charge management system 210 notifies the personal computer 40 thereof illustratively by electronic mail and prompts the latter to transfer operation information and other relevant information about the electronic apparatus. If the user has no means to handle electronic mail, then mail by the postal service is used to notify the user of the approaching settlement date.

Figure 14:
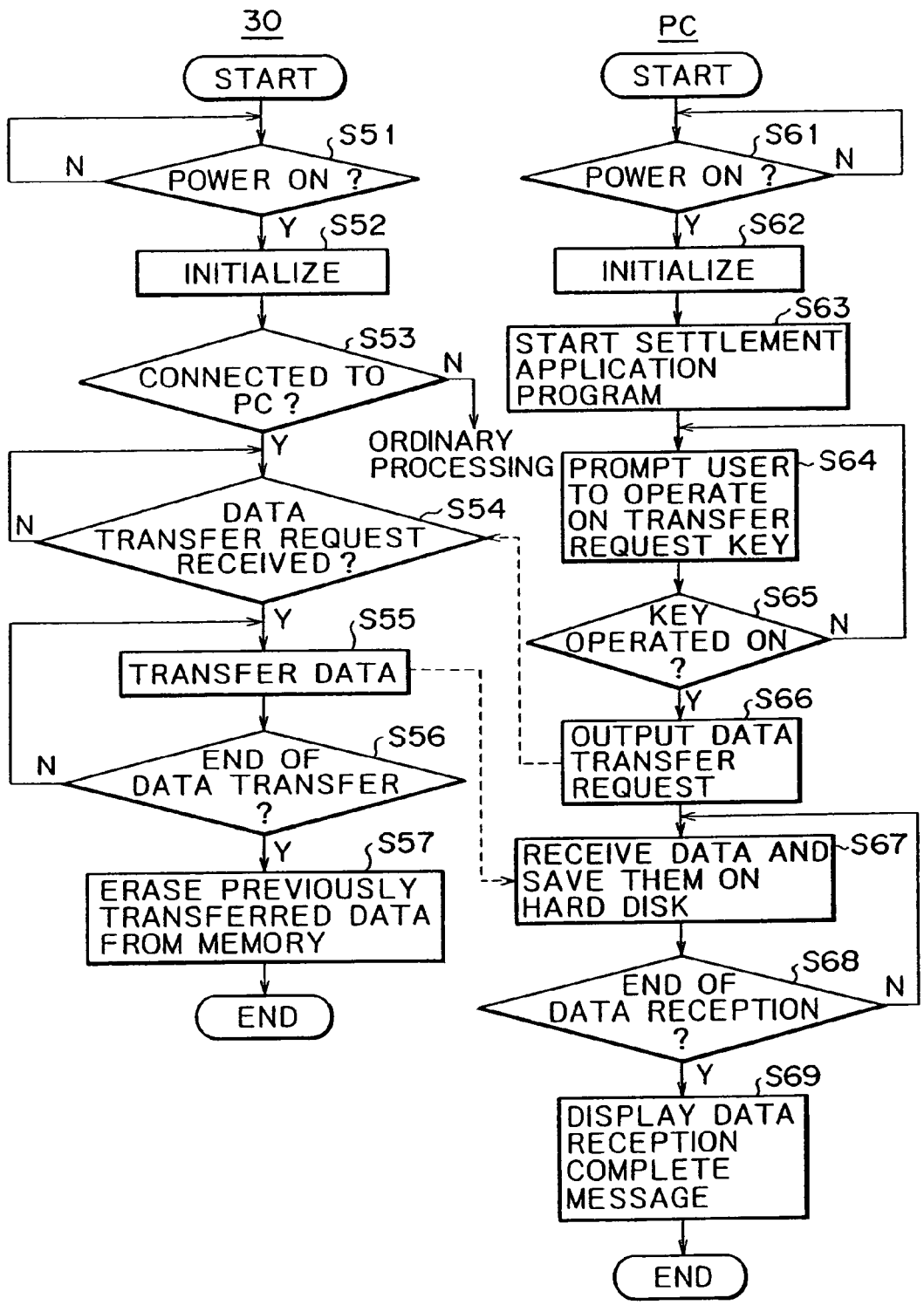
FIGS. 14A and 14B are flowcharts of steps constituting a data transfer process for settlement performed by the charging system of the second embodiment.

Given the notice, the user connects the electronic apparatus 30 to the personal computer 40 to carry out data transfer. FIGS. 14A and 14B are flowcharts of steps for effecting data transfer processing. FIG. 14A shows steps performed by the electronic apparatus 30, and FIG. 14B indicates steps carried out by the personal computer 40.

When power is turned on (in step S51), the electronic apparatus 30 is initialized (in step S52). A check is made to see if the electronic apparatus 30 is connected to the personal computer 40 (in step S53). If the apparatus 30 is judged to be connected, then arrival of a data transfer request from the personal computer 40 is awaited (in step S54).

Upon receipt of the data transfer request from the personal computer 40, the electronic apparatus 30 transfers its operation information, product ID, member ID and other relevant data from the memory 353 to the computer (in step S55). At the end of the data transfer (in step S56), the data transferred during the preceding settlement are erased from the memory (in step S57). The processing routine is then terminated.

The data transferred this time are left intact while the previous data are erased from the memory for the following reasons: for one thing, the limited memory capacity needs to be taken into account; for another, the current data must be retained for fear that the data transfer might fail on a transmission channel and need to be effected again upon request by the charge management system. The previous data are judged no longer necessary, since no request for data retransmission has come from the charge management system up to the current data transfer.

If a sufficiently large memory capacity is available, the largest possible amount of transfer data may alternatively be retained. In that case, the data two transfers ago or more ancient data need only be erased.

Meanwhile, upon power-up (in step S61), the personal computer 40 is initialized (in step S62). A settlement application program is started on the user's instructions (in step S63). In turn, a message is output prompting the user to operate on a transfer request key icon (in step S64). When the user operates on the transfer request key in response to the message (in step S65), the personal computer 40 transmits a data transfer request to the electronic apparatus 30 (in step S66).

In reply to the data transfer request, the electronic apparatus 30 transfers data such as operation information. The transferred data are stored on a hard disc (in step S67). When confirming the end of data reception from the electronic apparatus 30 (in step S68), the personal computer 40 displays a data reception complete message (in step S69), and terminates this processing routine.

Figure 15:
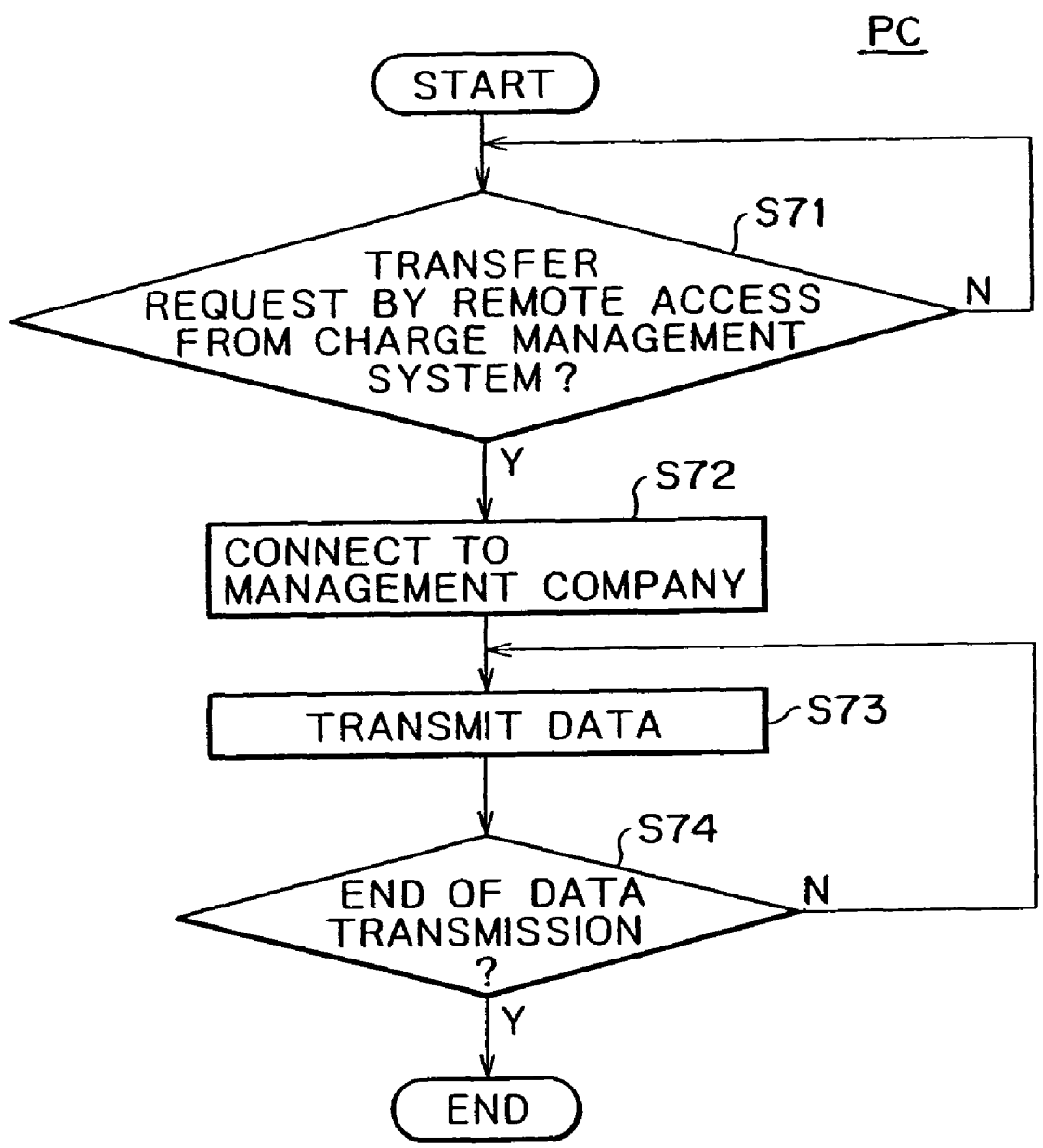
FIG. 15 is a flowchart of further steps constituting the data transfer process for settlement performed by the charging system of the second embodiment.

As shown in FIG. 15, upon receipt of a transfer request by remote access from the charge management system 210 of the time charge management company 21 (in step S71), the personal computer 40 automatically enters a transfer mode and connects to the system 210 (in step S72). The computer 40 transfers the data such as operation information from its hard disc to the charge management system 210 (in step S73). When verifying the end of the data transfer (in step S74), the personal computer 40 leaves its automatic data transfer mode.

Figure 16:
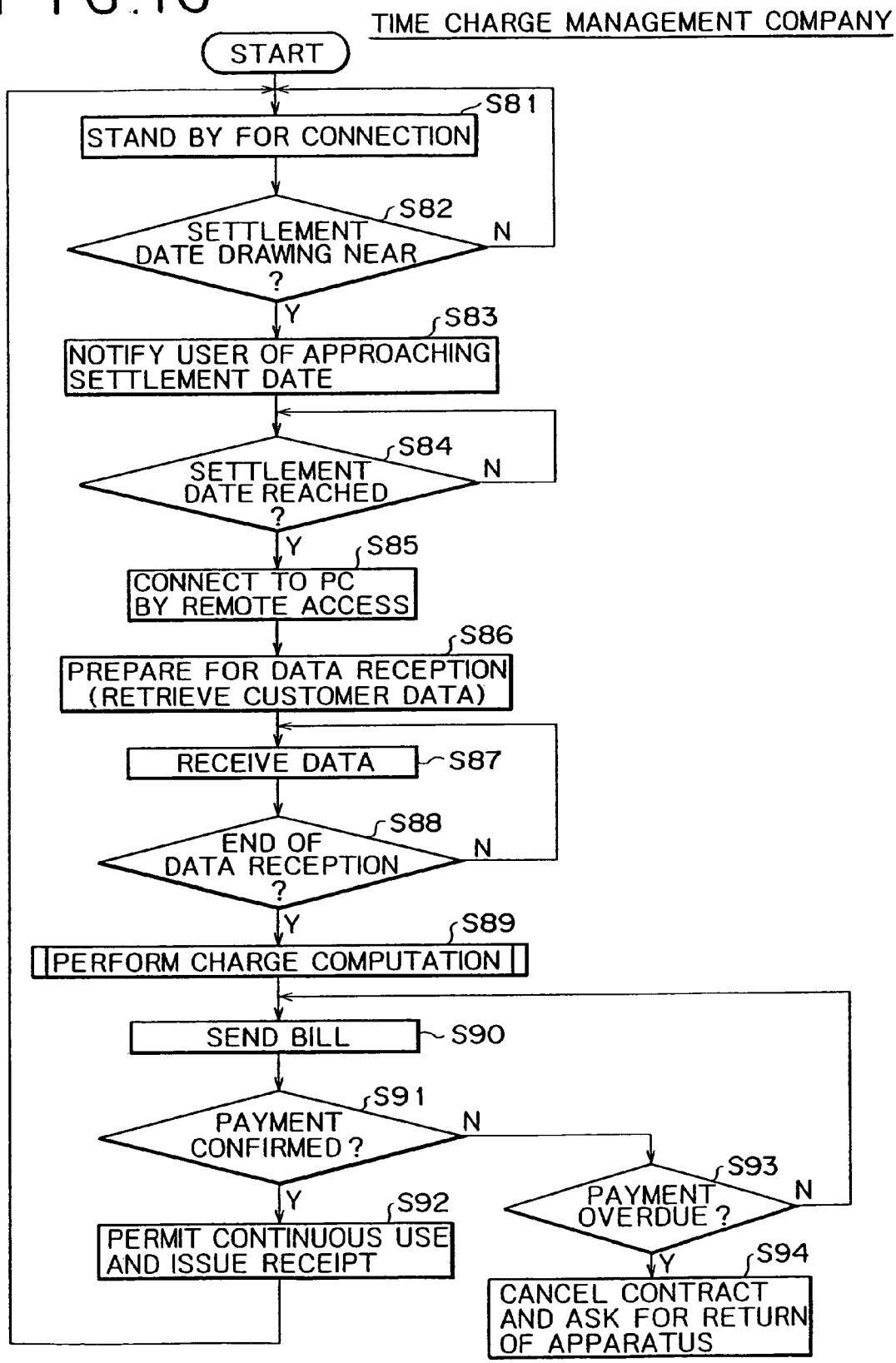
FIG. 16 is a flowchart of steps for settlement performed by the charging system of the second embodiment.

FIG. 16 is a flowchart of steps performed during the above processing by the charge management system 210 of the time charge management company 21.

Before the settlement date draws near, the charge management system 210 is in a standby state for connection with the electronic apparatus (steps S81 and S82). Upon detecting the approach of the settlement date (in step S82), the charge management system 210 notifies the user thereof illustratively by electronic mail as described (in step S83).

When the settlement date is reached (in step S84), the charge management system 210 connects to the personal computer 40 by remote access (in step S85) to prepare for data reception (in step S86). While the preparations are underway, the system 210 retrieves data about the customer in question.

Then the data coming from the personal computer 40 as described above are all received (in steps S87 and S88). With the data reception completed, the charge management system 210 computes fees for the current used time by multiplying the chargeable time, included in the function-wise operation information, by the time unit price (in step S89).

When the charge computation has ended, the system 210 issues (in step S90) a bill to the user (i.e., registered member). The bill may be sent either by electronic mail or by mail of the postal service. Given the bill, the user effects the payment illustratively from a convenience store or like establishments (shown in FIG. 13) or by automatic money transfer from his bank account or credit card company's account as mentioned earlier.

When the payment by the user is confirmed (in step S91), the system 210 gives permission to let the electronic apparatus be used continuously and issues a receipt (in step S92). If no payment by the user is confirmed, a check is made to see if the time limit for settlement is exceeded (step S93). If the time limit is judged exceeded, then the system 210 cancels the contract and asks for the return of the electronic apparatus by illustratively transmitting a return request signal to the personal computer 40 (in step S94).

Figure 17:
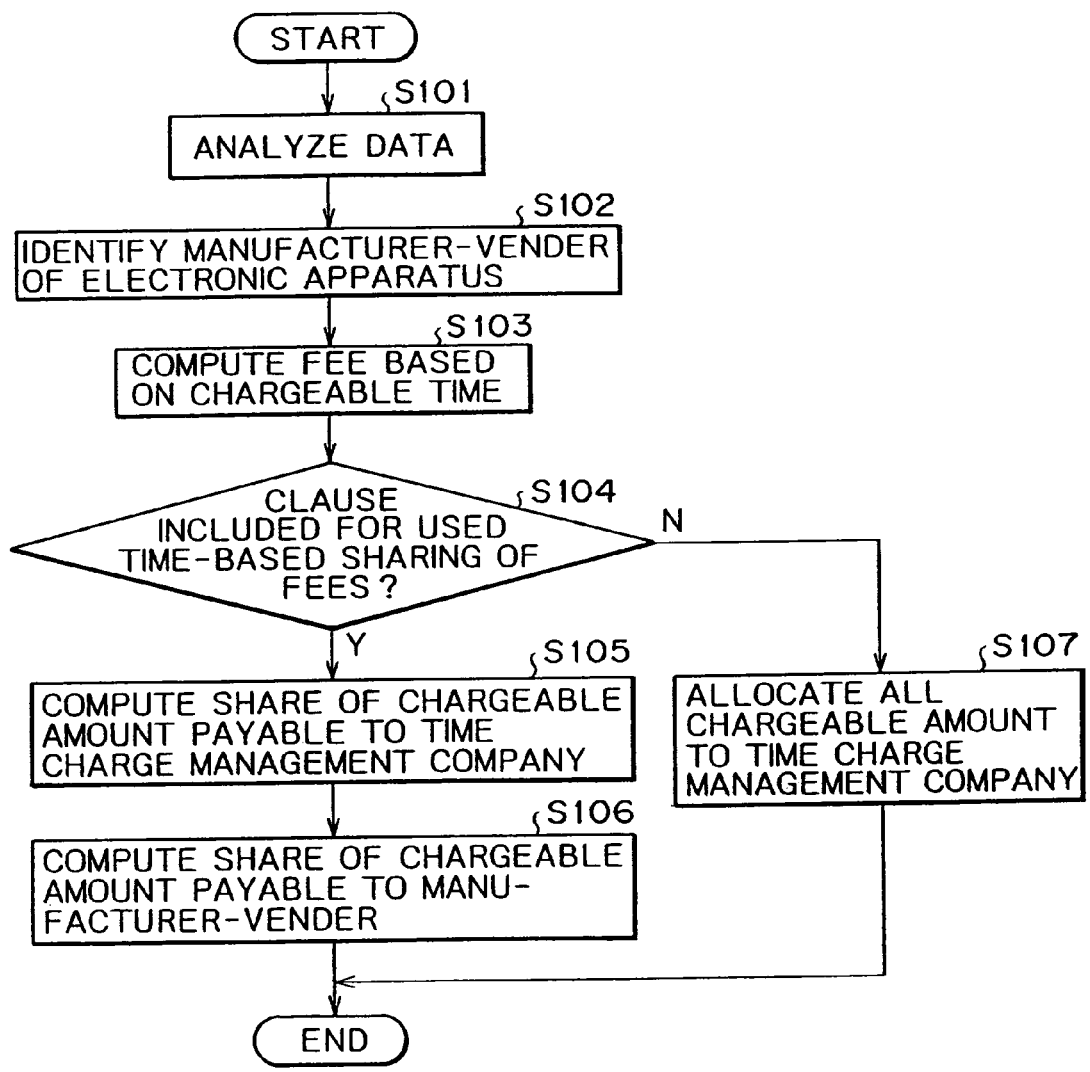
FIG. 17 is a flowchart of further steps for settlement performed by the charging system of the second embodiment.

FIG. 17 is a flowchart of typical steps in which the charge management system 210 performs the charge computation of step S89 in FIG. 16. This is an example where certain terms of contract between the manufacturer-vender and the time charge management company are taken into account in the charge computation. A database 211 of the charge management system 210 at the time charge management company 21 contains product information in addition to customer information and operation information. The product information associates the chargeable products with their manufacture-venders by use of product IDs. The database 211 also includes information about specific terms of contract on each product with its manufacturer-vender. Illustratively, each product may be subject to a sales contract or to a sales and used time-based fee sharing contract (or may come under the fee sharing contract alone).

The received data are analyzed (in step S101). Using the product ID from the analysis, the manufacturer-vender of the electronic apparatus is identified and the contract terms are verified (in step S102). The fee is computed in the manner described above by use of chargeable time information retrieved from the received data (in step S103).

With the contract terms obtained in step S102, a check is made to see if the contract on the product in question involves a clause for sharing fees between the time charge management company and the manufacturer-vender (in step S104). If the fee sharing clause is found involved, a share of the chargeable amount (obtained in step S103) payable to the time charge management company is computed and stored into a share memory part of the management company (in step S105). A share of the fee payable to the manufacturer-vender is then computed and stored into its own share memory part (in step S106).

If in step S104 the contract is judged to include no clause for the used time-based sharing of fees on the product, the all chargeable amount acquired is allocated as the time charge management company's share and stored as such into the company's share memory part (in step S107).

With the second embodiment, the electronic apparatus 30 which supplies the charge management system with data not directly but via a personal computer is charged suitably on a used time basis. That is, when the settlement date arrives at predetermined intervals (e.g., monthly), a calendar function of the clock part 352 in the charge processing part 35 is used by the electronic apparatus 30 to notify the user of the approaching settlement date and to prompt him to transfer data for settlement processing.

FIG. 18 is a flowchart of steps constituting a routine for processing settlement dates and data transfers performed by the electronic apparatus 30. The processing routine is carried out by periodic interruption.

When the processing routine is started by interruption, the charge processing part 35 checks to see if a settlement date is reached or drawing near (in step S111). If the settlement date is judged neither reached nor approaching, the processing routine is terminated. If the settlement date is judged reached or drawing near, the charge processing part 35 requests the microcomputer part 31 to issue a message indicative of the approaching settlement date. The microcomputer part 31 in turn causes the display part 34 to display the message alerting the user to the approaching settlement date (in step S112). The user is prompted to transfer data for settlement processing.

The controlling part 351 checks to see if the user has connected the electronic apparatus 30 to the personal computer 40 in response to the displayed message (in step S113). If no connection is judged to be made, the controlling part 351 checks to see if the time limit for settlement is exceeded (in step S115). If the time limit is not judged exceeded, the processing routine is terminated.

If the time limit for settlement is judged exceeded, the charge processing part 35 requests the microcomputer part 31 to disable the electronic apparatus 30 partially or totally. In turn, the electronic apparatus 30 has its functions totally deactivated or partially restricted (in step S116).

If in step S113 the electronic apparatus 30 is judged connected to the personal computer 40, the microcomputer part 31 checks to see if the data transfer key is operated on (in step S114). If the data transfer key is not judged activated, the controlling part 351 checks to see if the time limit for settlement is exceeded (in step S115). If the time limit is not judged exceeded, the processing routine is terminated.

If the controlling part 351 judges the time limit for settlement to have been exceeded, the charge processing part 35 requests the microcomputer part 31 to disable the electronic apparatus 30 partially or totally. In turn, the electronic apparatus 30 has its functions totally deactivated or partially restricted (in step S116).

If in step S114 the transfer key is judged operated on, the information in the memory 353 such as the operation information, product ID and member ID is transferred (in step S117). At the end of the data transfer (in step S118), the previously transferred data are erased from the memory (in step S119), and the processing routine is terminated.

With the second embodiment, the charge management system collects operation information from electronic apparatuses and analyzes the collected information to determine how the users have used their apparatuses. For example, the management system is able to know the most-used and the least-used functions of each apparatus. The findings are fed back to the development of future products from which certain functions may illustratively be omitted for their relative inaction confirmed by the feedbacks.

According to the invention, pieces of music and videos are charged and paid for the length of time they have been listened to or watched. It follows that even if the contents of a storage medium played back by the electronic apparatus are a copy and not the original, the fees and royalties involved are still collected. A major advantage of this scheme is that it ensures the payment of royalties to copyright holders.

Although the second embodiment has been shown setting function-wise weighting factors for the chargeable time computation based on the CPU load factor, this is not limitative of the invention. Alternatively, the memory 353 in the charge processing part 35 may be provided with a predetermined function-to-weighting factor correspondence table. From the table in the memory 353, a weighting factor corresponding to any given function may be retrieved and used in the actual computation of chargeable times.

As another alternative, an equipment type-wise coefficient may be set in advance to the memory 353 in conjunction with the electronic apparatus of interest incorporating the charge processing part 35. The coefficient may be used in computing the chargeable time of the apparatus.

With the second embodiment, the charge processing part 35 in the electronic apparatus 30 has been shown computing chargeable times. Alternatively, the chargeable time computation may be performed on the side of the charge management system if the used time T1 and such operation information as function key-on/off information are transferred to the system. The computation is then made by the charge management system in the same manner as by the charge processing part 35.

The transfer of data for settlement has been shown effected by remote access to the personal computer 40. Alternatively, the data transfer may be performed manually by the user through the personal computer 40 to the charge management system 210.

The transfer of data from the electronic apparatus 30 to the personal computer 40 has been shown triggered by the apparatus 30 in response to a data transfer request from the computer 40. Alternatively, a data transfer key of the electronic apparatus 30 may be activated to send a data transfer request from the apparatus 30 to the personal computer 40 so that the operation information and other relevant information about the apparatus may be transferred to the computer.

Third Embodiment

The third embodiment of this invention is identical in overall structure to the second embodiment shown in FIG. 9.

Whereas the second embodiment was described as utilizing a personal computer to transfer data for settlement, the third embodiment is connected by wireless communication means to the charge management system of the time charge management company. In this structure, the third embodiment transfers operation-related data directly to the charge management system.

Figure 19:
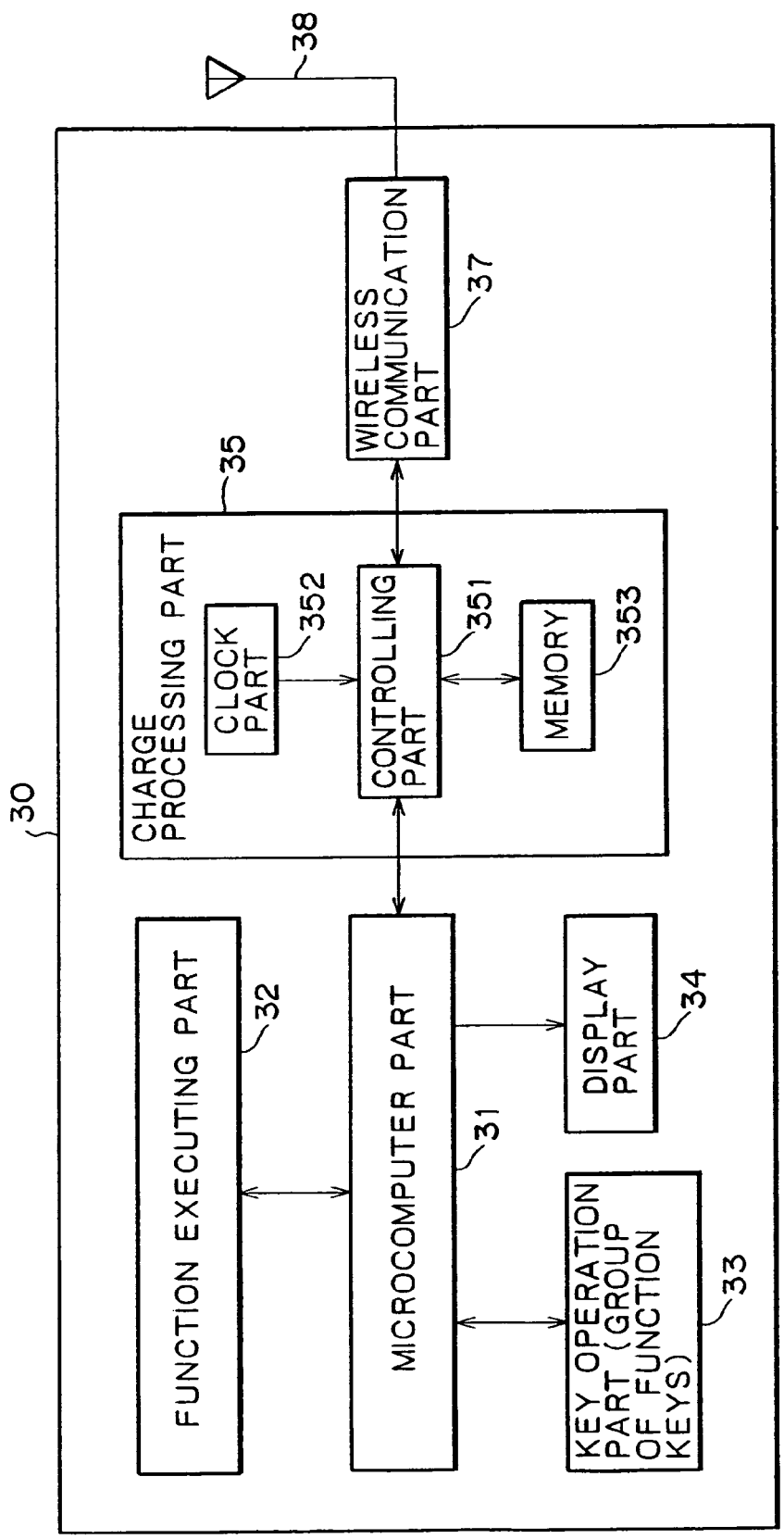
FIG. 19 is a block diagram illustrating a typical structure of an electronic apparatus practiced as a third embodiment of this invention.

FIG. 19 is a block diagram illustrating a typical structure of an electronic apparatus 30 practiced as the third embodiment. In the third embodiment, the interface part 36 of the second embodiment is replaced by a wireless communication part 37 and a transmitting-receiving antenna 38. The remaining component parts are the same as those of the electronic apparatus 30 as the second embodiment.

Figure 20:
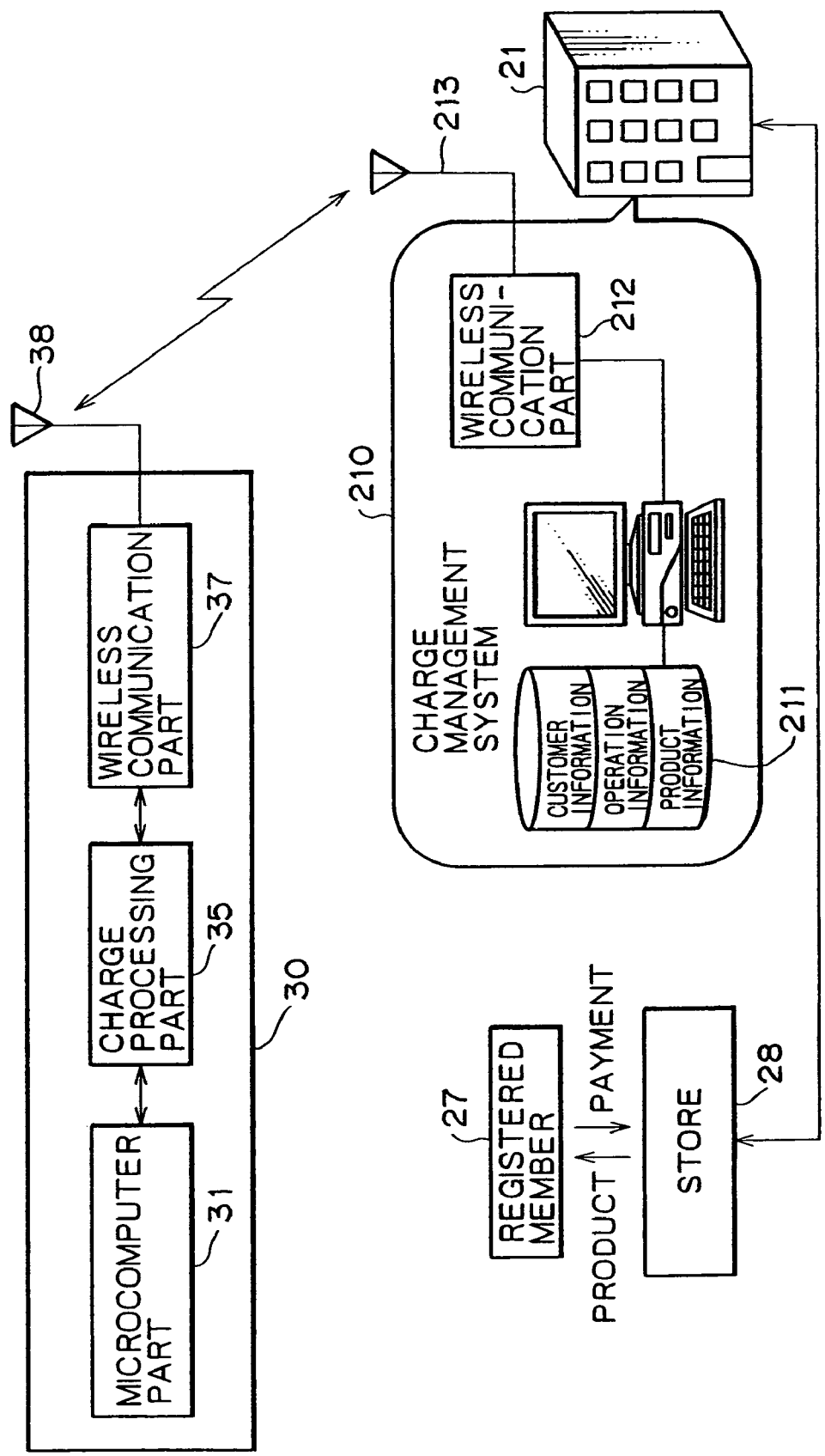
FIG. 20 is an explanatory view picturing how a charging system of the third embodiment typically settles charges.

FIG. 20 is an explanatory view picturing how the third embodiment is typically constituted so as to transfer operation data. In the case of the third embodiment, the charge management system 210 of the time charge management company 21 also has a wireless communication part 212 that exchanges diverse kinds of data with the electronic apparatus 30 over a wireless communication channel through an antenna 213.

Figure 21:
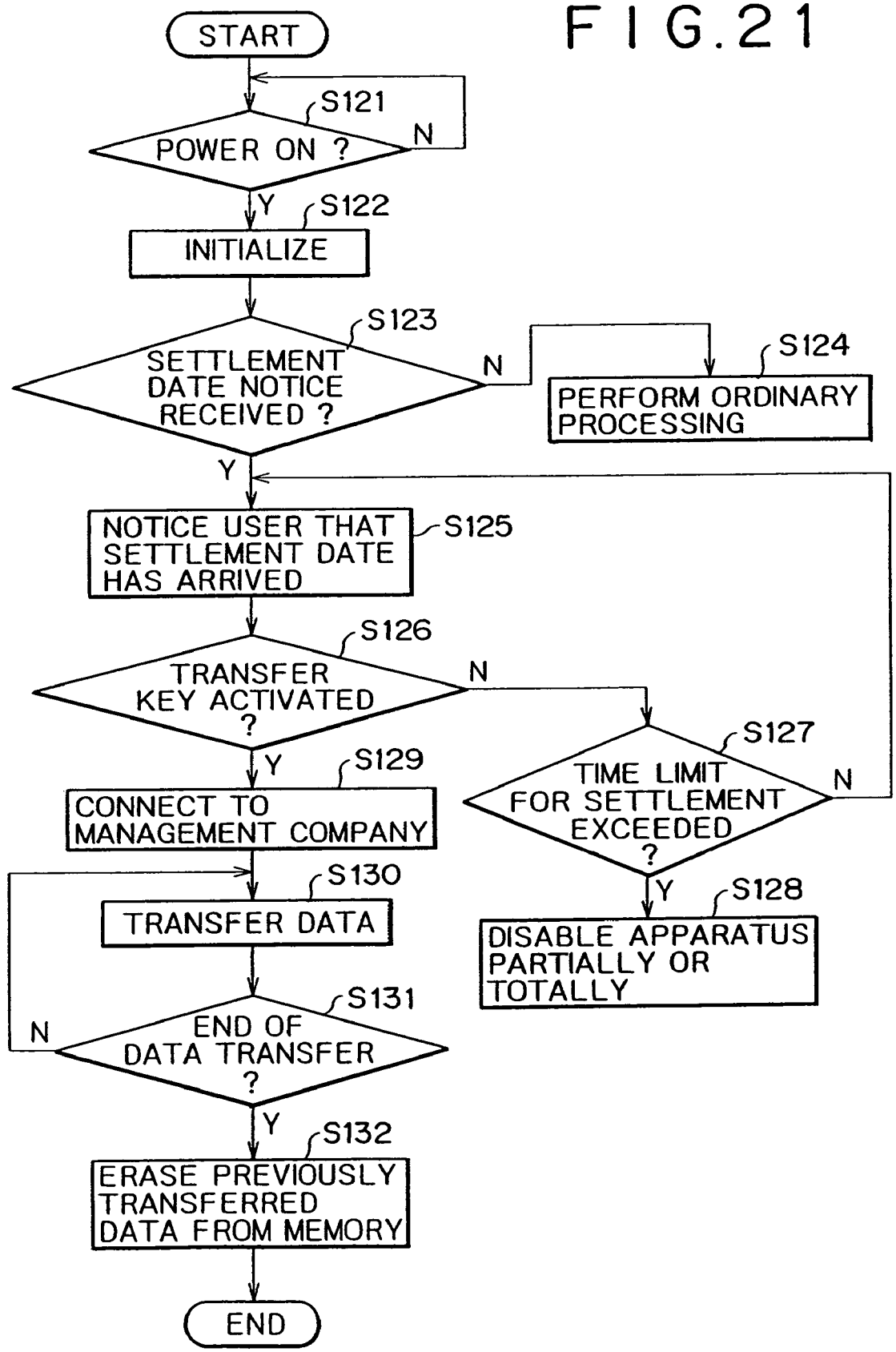
FIG. 21 is a flowchart of steps constituting a data transfer process for settlement performed by the charging system of the third embodiment.

FIG. 21 is a flowchart of steps constituting a data transfer process for settlement performed by the electronic apparatus 30 as the third embodiment.

When power is turned on (in step S121), the electronic apparatus 30 is initialized (in step S122). When a settlement date is reached, the charge management system 210 transits a settlement date notice over the wireless communication channel to the electronic apparatus 30. The charge processing part 35 of the electronic apparatus 30 checks to see if the settlement date notice has arrived (in step S123). Until the notice arrives, the charge processing part 35 carries out ordinary processing such as used time computations (in step S124).

Upon detecting the arrival of a settlement date notice, the charge processing part 35 requests the microcomputer part 31 to issue a message indicating the arrival of the notice. In turn, the microcomputer part 31 causes the display part 34 to display the message (in step S125) prompting the user to transfer necessary data for settlement processing.

The charge processing part 35 checks information from the microcomputer part 31 to see whether any function key has been activated (in step S126).

With any function key yet to be activated, a check is made to see if the time limit for settlement is exceeded (in step S127). Upon receipt of the settlement date notice, the charge processing part 35 starts a timer to count time up to the time limit for settlement.

If the transfer key is not judged activated past the time limit for settlement, the charge processing part 35 requests the microcomputer part 31 to disable the electronic apparatus 30 partially or totally. This puts the electronic apparatus in an operation-stopped or operation-restricted state (in step S128).

If the transfer key is judged activated in step S126, the charge processing part 35 connects the electronic apparatus 30 to the charge management system 210 of the time charge management company 21 over the wireless communication channel (in step S129). The operation information, product ID and member ID are then transferred from the memory 353 to the charge management system 210 (in step S130). At the end of the data transfer (in step S131), the previously transferred data are erased from the memory (in step S132). After the data erasure, the processing routine is terminated.

With the third embodiment, the electronic apparatus 30 has been shown communicating with the charge management system over the wireless communication channel. Alternatively, the wireless communication channel may be replaced by a public switched network such as a telephone line (ADSL, ISDN, a cellular telephone network, a PHS (Personal Handyphone System) network, the Internet), a leased line, or a CATV communication network for direct communication between the electronic apparatus and the time charge management company. Such an alternative setup permits exactly the same type of processing as that which was described above.

Fourth Embodiment

The fourth embodiment of this invention is identical in overall structure to the second embodiment shown in FIG. 9.

Whereas the second and the third embodiment were shown incorporating the charge processing part 35, the fourth embodiment replaces that part 35 with a detachable charge processor 50.

Figure 22:
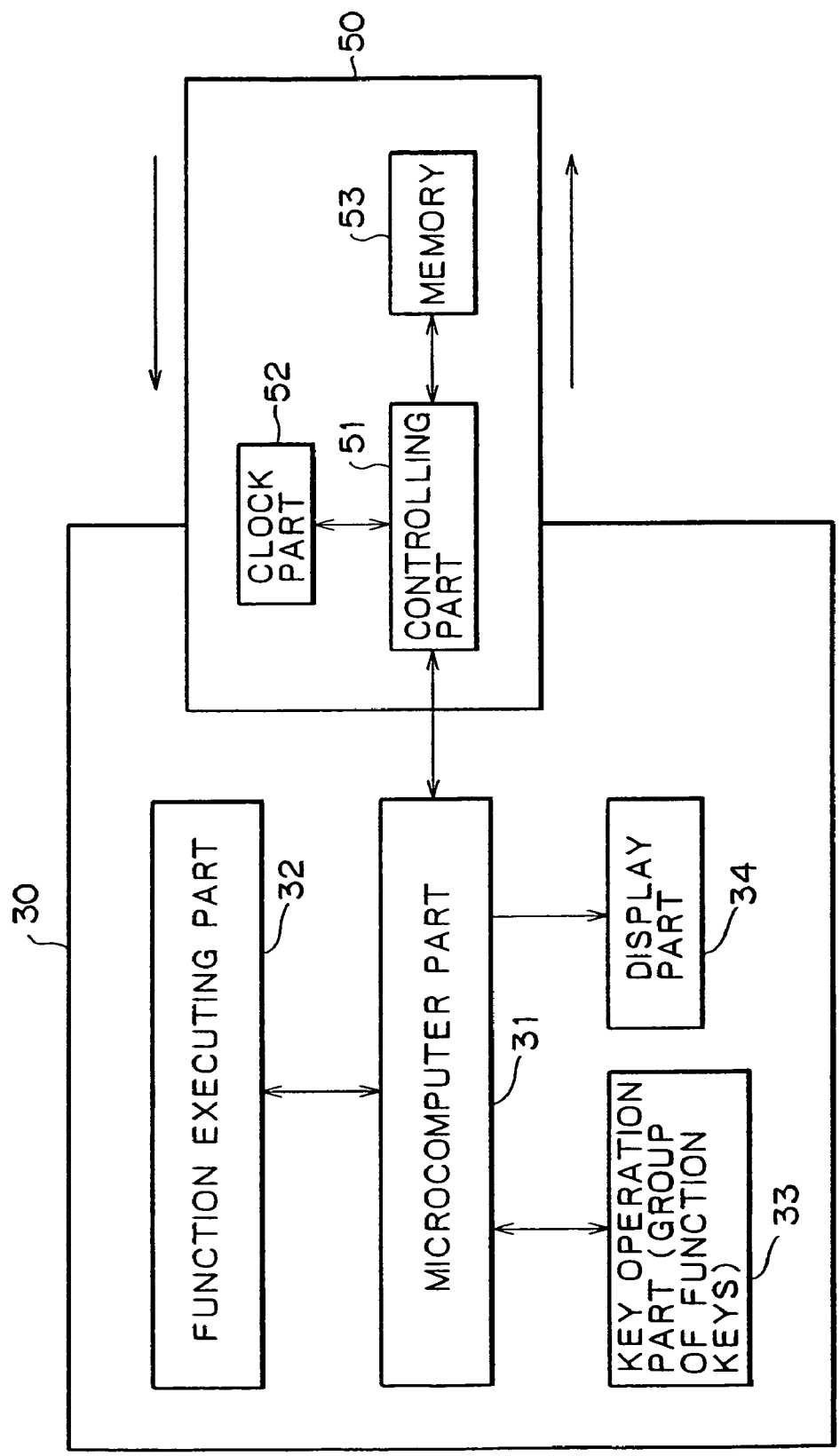
FIG. 22 is a block diagram indicating a typical structure of an electronic apparatus practiced as a fourth embodiment of this invention.

FIG. 22 is a block diagram indicating a typical structure of an electronic apparatus 30 practiced as the fourth embodiment equipped with the charge processor 50. Although not shown in FIG. 22, the electronic apparatus 30 has a slot that the charge processor 50 is attached to and detached from. Inserting the charge processor 50 into the slot (i.e., connector) connects the processor 50 to the microcomputer part 31 as depicted in FIG. 22.

The charge processor 50 has the same structure as the charge processing part 35. The processor 50 comprises a controlling part 51, a clock part 52, and a nonvolatile memory 53.

Figure 23:
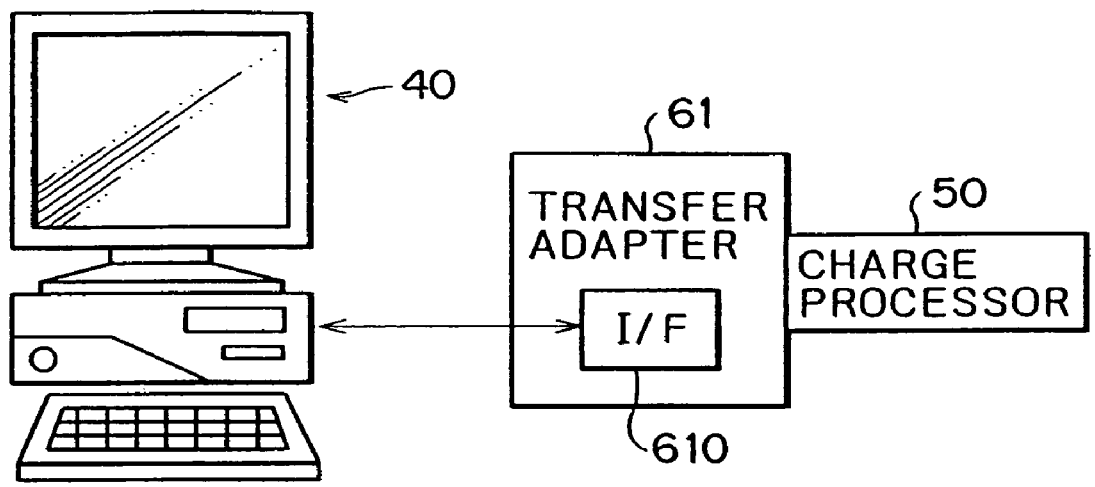
FIG. 23 is a schematic view picturing how a data transfer process for settlement is typically implemented by the fourth embodiment.

When data are to be transferred for settlement via the personal computer 40 as with the second embodiment, the charge processor 50 is attached to a transfer adapter 61 having an interface part 610 for connection to the personal computer 40 as depicted in FIG. 23.

The transfer adapter 61, as with the electronic apparatus 30, comprises a slot (not shown) that the charge processor 50 is attached to and detached from. Inserting the charge processor 50 into the slot connects the controlling part 51 of the processor 50 to the interface part 610. The interface part 610 is the same in structure as the interface part 36 of the electronic apparatus 30 practiced as the second embodiment in FIG. 10. In this setup, the personal computer 40 sends a data transfer request to the charge processor 50 through the transfer adapter 61. The processor 50 in turn transfers data to the computer 40.

Figure 24:
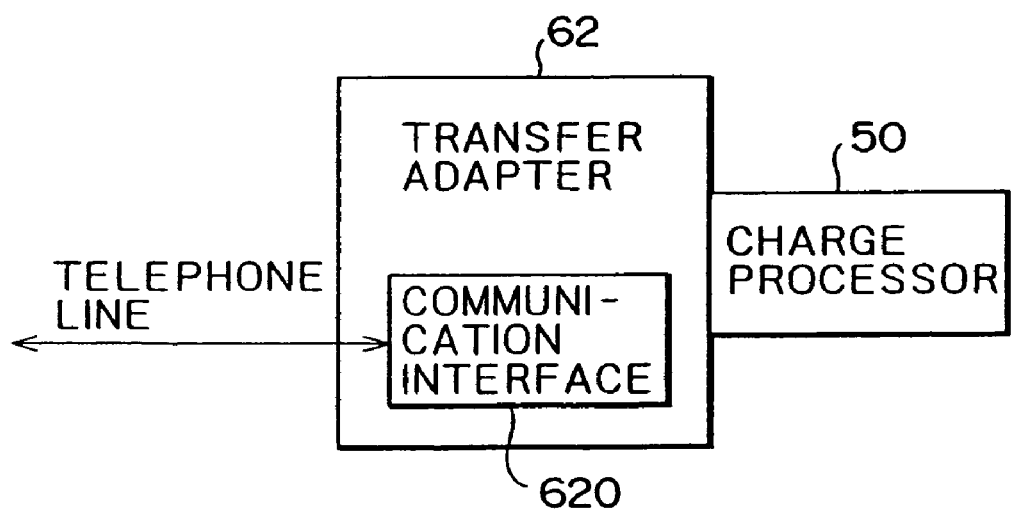
FIG. 24 is another schematic view portraying how the data transfer process for settlement is typically implemented by the fourth embodiment.

If a transfer adapter 62 connectable to a telephone line as shown in FIG. 24 is used, the charge processor 50 may be connected to the charge management system 210 not via the personal computer 40 but directly as in the case of the third embodiment. The charge processor 50 is then able to transfer data to the system 210.

The transfer adapter 62 of FIG. 24, as with the transfer adapter 61, has a slot (not shown) that the charge processor 50 is attached to and detached from. Inserting the charge processor 50 into the slot connects the controlling part 51 of the processor to the communication interface part 620 hooked up to suitable communication means.

In FIG. 24, the communication interface part 620 may be replaced by a wireless communication part. The alternative setup, as with the third embodiment, connects the electronic apparatus 30 to the charge management system 210 not via the personal computer 40 but over a public switched network such as a telephone line (ADSL, ISDN, a cellular telephone network, a PHS (Personal Handyphone System) network, the Internet), a leased line, or a CATV communication network. This provides direct data transfer from the charge processor 50 to the charge management system 210.

Figure 25:
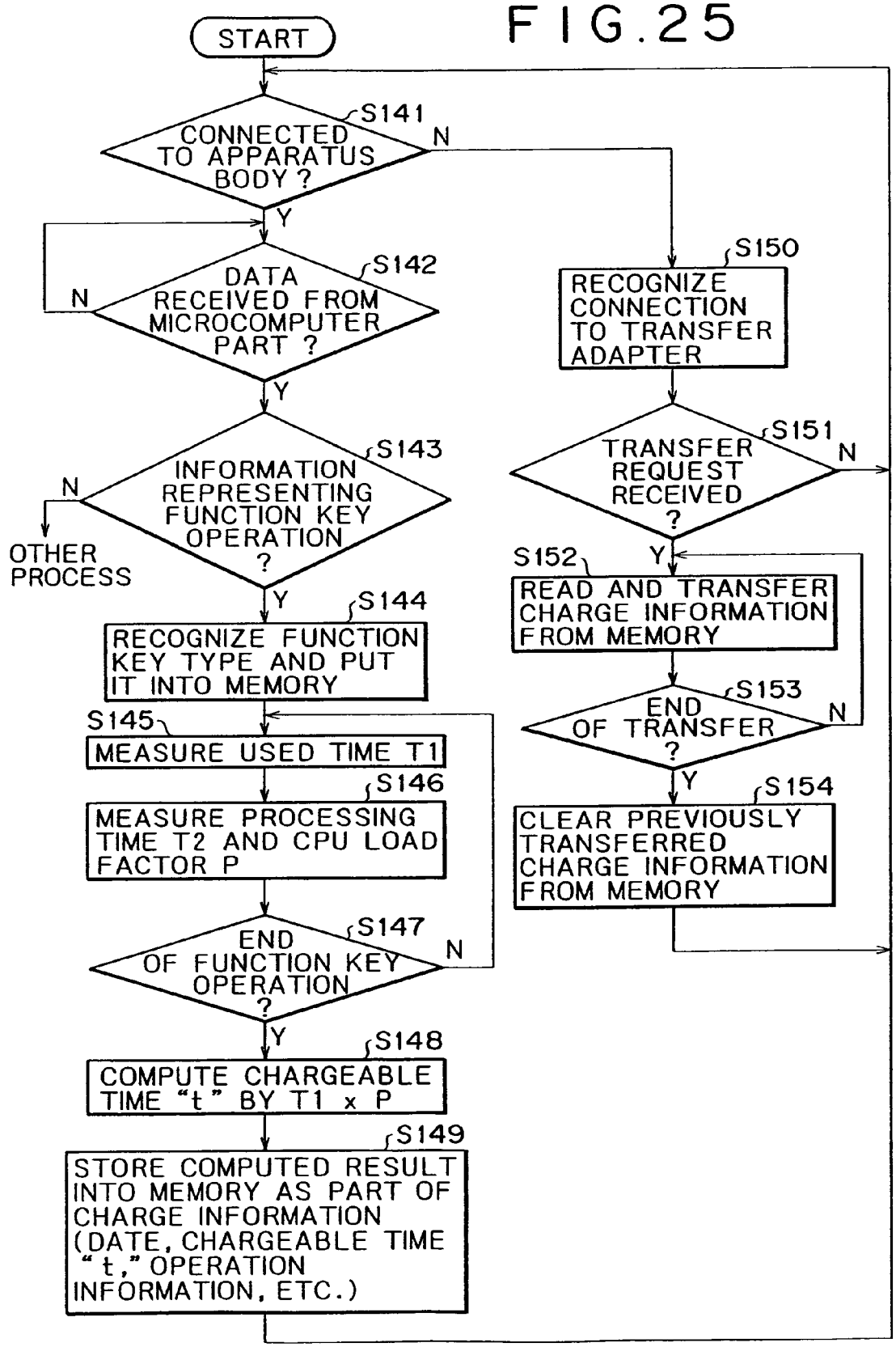
FIG. 25 is a flowchart of steps performed by the electronic apparatus of the fourth embodiment.

FIG. 25 is a flowchart of steps carried out illustratively by the charge processor 50 with the transfer adapter 61 of FIG. 23 hooked up for use.

The controlling part 51 of the charge processor 50 first checks to see if the processor 50 is connected to the body of the electronic apparatus 30 (in step S141). If the charge processor 50 is judged connected to the electronic apparatus 30, then reception of data from the microcomputer part 31 is awaited (in step S142).

If the controlling part 51 has detected receipt of data from the microcomputer part 31, the controlling part 51 checks to see if the received data represent activation of any function key (in step S143). If the data turn out to be of a different nature, an appropriate process corresponding to the data is carried out. If the data are judged to represent operation of a function key, the controlling part 51 recognizes the activated function key and stores key type information indicative of the recognized function key into the memory 53 (in step S144) Using information from the clock part 52, the controlling part 51 measures an execution time in which the function in question has been active, i.e., a used time T1 of the enabled function (in step S145). The controlling part 51 then measures a CPU processing time in which the CPU of the microcomputer part 31 has been continuously operating, i.e., a processing time T2 excluding the sleep time, as well as a CPU load factor P of the microcomputer part 31 (in step S146). In this example, the CPU load factor P is computed repeatedly during function execution. Alternatively, the CPU load factor P may be calculated at the end of the function execution.

As mentioned earlier, the load factor P is computed by use of the following expression:

$$P = (T2/T1) \times K$$

where, K denotes a coefficient of variation determined by the type of equipment such as video equipment, audio equipment, television set, or storage medium in use.

Step S145 to measure the used time T1 and step S146 to measure both the processing time T2 and the CPU load factor P are repeated, until execution of the function in question comes to an end (in step S147).

When execution of the function is judged to have ended, the controlling part 51 of the charge processor 50 computes a chargeable time "It" (in step S148) using the following expression:

$$\text{chargeable time } t = \text{used time } T1 \times \text{CPU load factor } P$$

Since the chargeable time "t" is given as T2×K, it is possible alternatively to measure only the processing time T2 and skip used time (T1) measurement.

Information about the chargeable time "t" resulting from the computation is written to the memory 53 as part of the charging information made up of dates, chargeable time "t" and operation information (in step S149). Step S149 is followed by step S141.

If in step S141 the controlling part 51 does not judge that the charge processor 50 is connected to the body of the electronic apparatus 30, then connection of the charge processor 50 to the transfer adapter 61 is recognized (in step S150). The controlling part 51 checks to see if a data transfer request has arrived from the personal computer 40 (in step S151). If no data transfer request is judged to have arrived, step S141 is reached again.

If the data transfer request is judged to have arrived, the controlling part 51 reads charging information from the memory 53 and transfers the information through the transfer adapter 61 to the personal computer 40 (in step S152). On verifying completion of the data transfer (in step S153), the controlling part 51 erases the previously transferred charging information from the memory 53 (in step S154). Then step S141 is reached again.

Fifth Embodiment

Whereas the embodiments discussed above were shown collecting fees or royalties after the used time of the chargeable product was established, the fifth embodiment of this invention adopts what may be called a prepaid scheme. Specifically, the fifth embodiment involves the use of prepaid cards.

Figure 26:
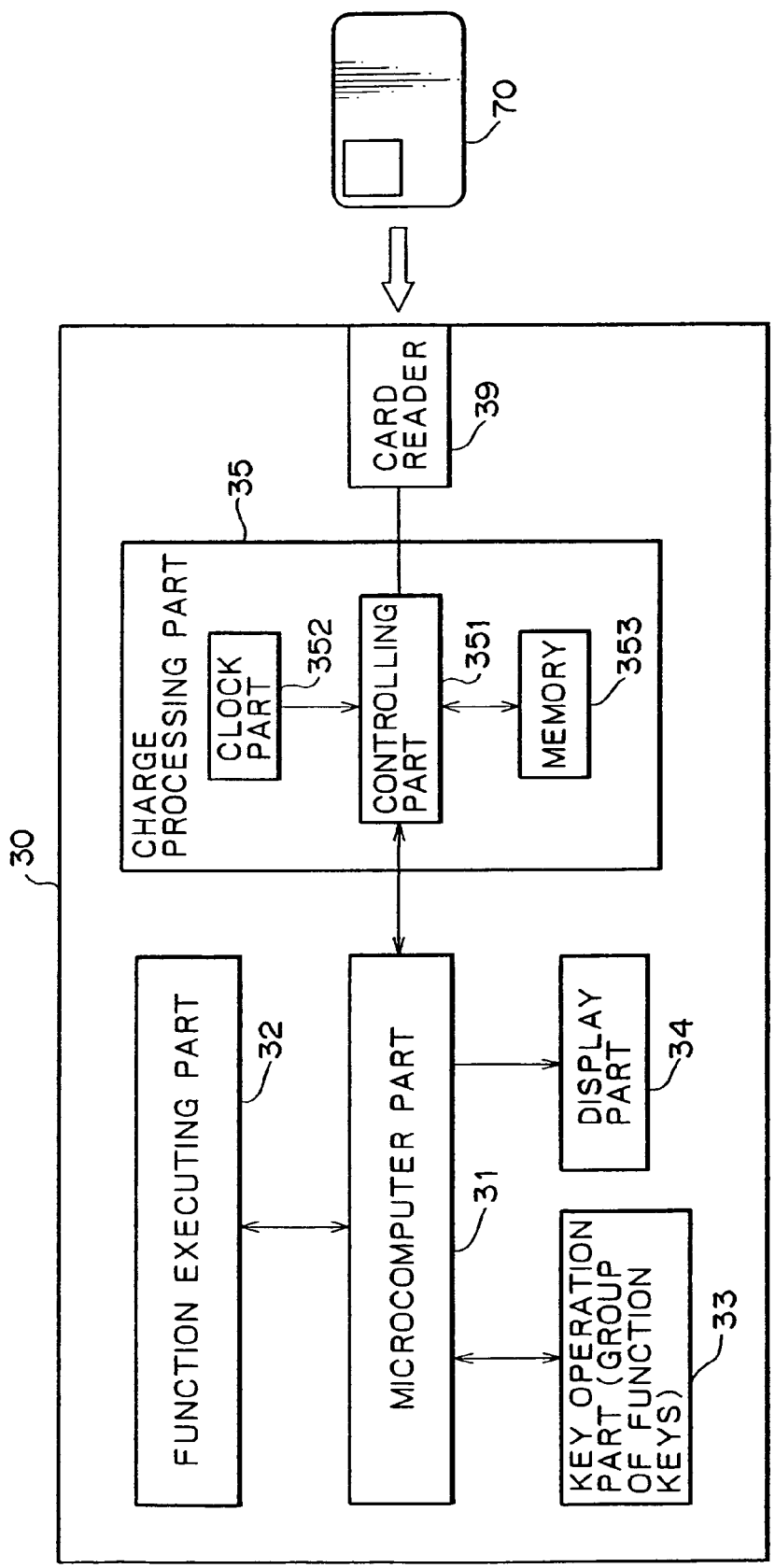
FIG. 26 is a block diagram showing a typical structure of an electronic apparatus practiced as a fifth embodiment of this invention.

FIG. 26 is a block diagram showing a typical structure of an electronic apparatus 30 practiced as the fifth embodiment. In the fifth embodiment, the interface part 36 of the second embodiment in FIG. 10 or the wireless communication part 37 of the third embodiment in FIG. 19 is replaced by a card reader 39 that reads stored information from a prepaid card 70.

The charge processing part 35 comprising a controlling part 351, a clock part 352 and a nonvolatile memory 353 is the same in hardware constitution as the second and the third embodiments. As with the second or the third embodiment, the memory 353 may be attached externally to the charge processing part 35.

The controlling part 351 is different in software structure from the second and the third embodiments. More specifically, whereas programs for measuring used times and chargeable times are the same, the fifth embodiment includes software causing the electronic apparatus 30 to settle payments based on charging information in the memory 353 and on stored information from the prepaid card 70.

The prepaid card 70 has usable time information written on it in advance. The stored usable time is decremented by the charge processing part 35 of the electronic apparatus 30 in keeping with the time period in which the user has operated the apparatus 30. In other words, the prepaid card 70 always retains information about the remaining usable time.

Figure 27:
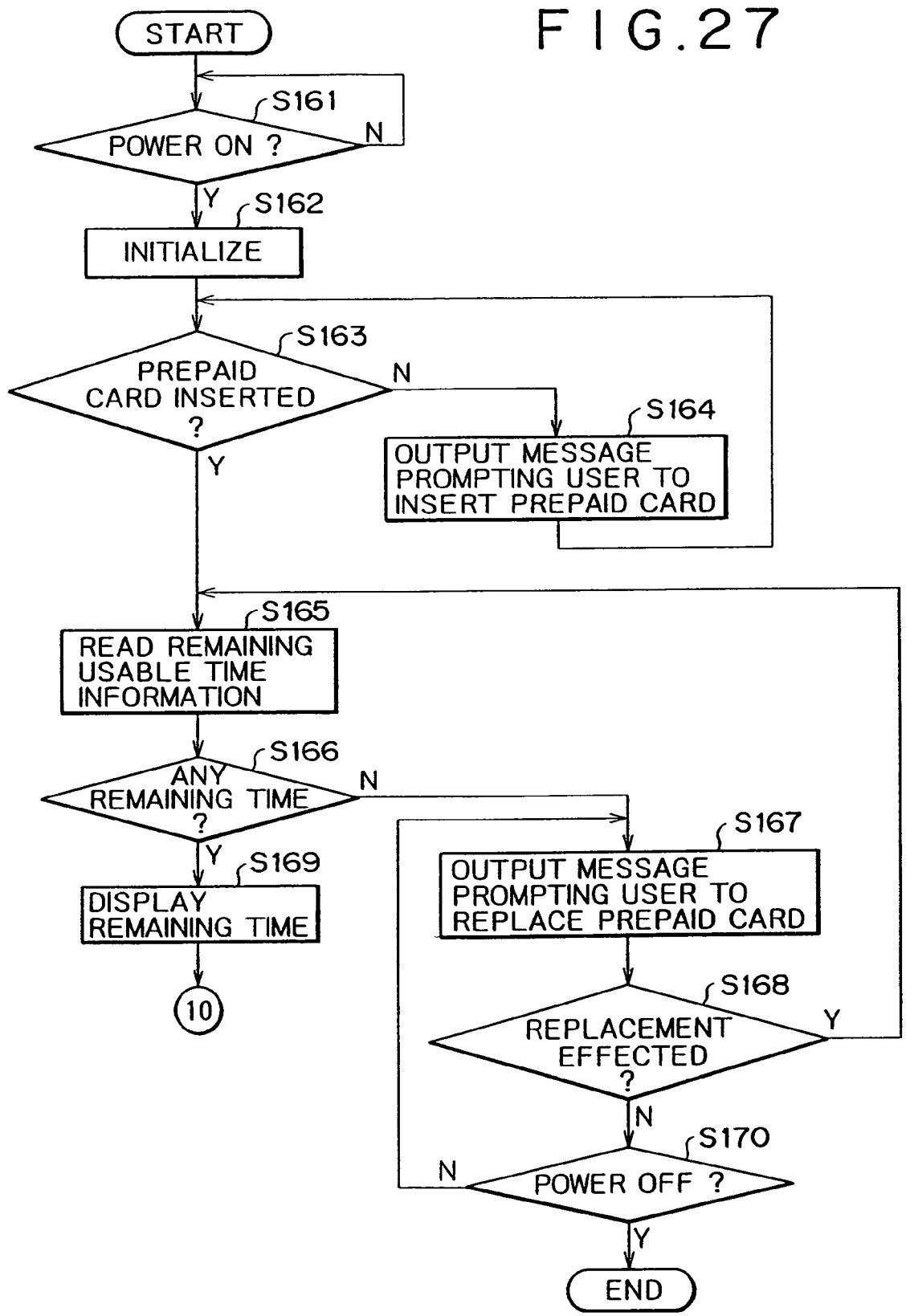
FIG. 27 is a flowchart of steps performed by the electronic apparatus of the fifth embodiment.
Figure 28:
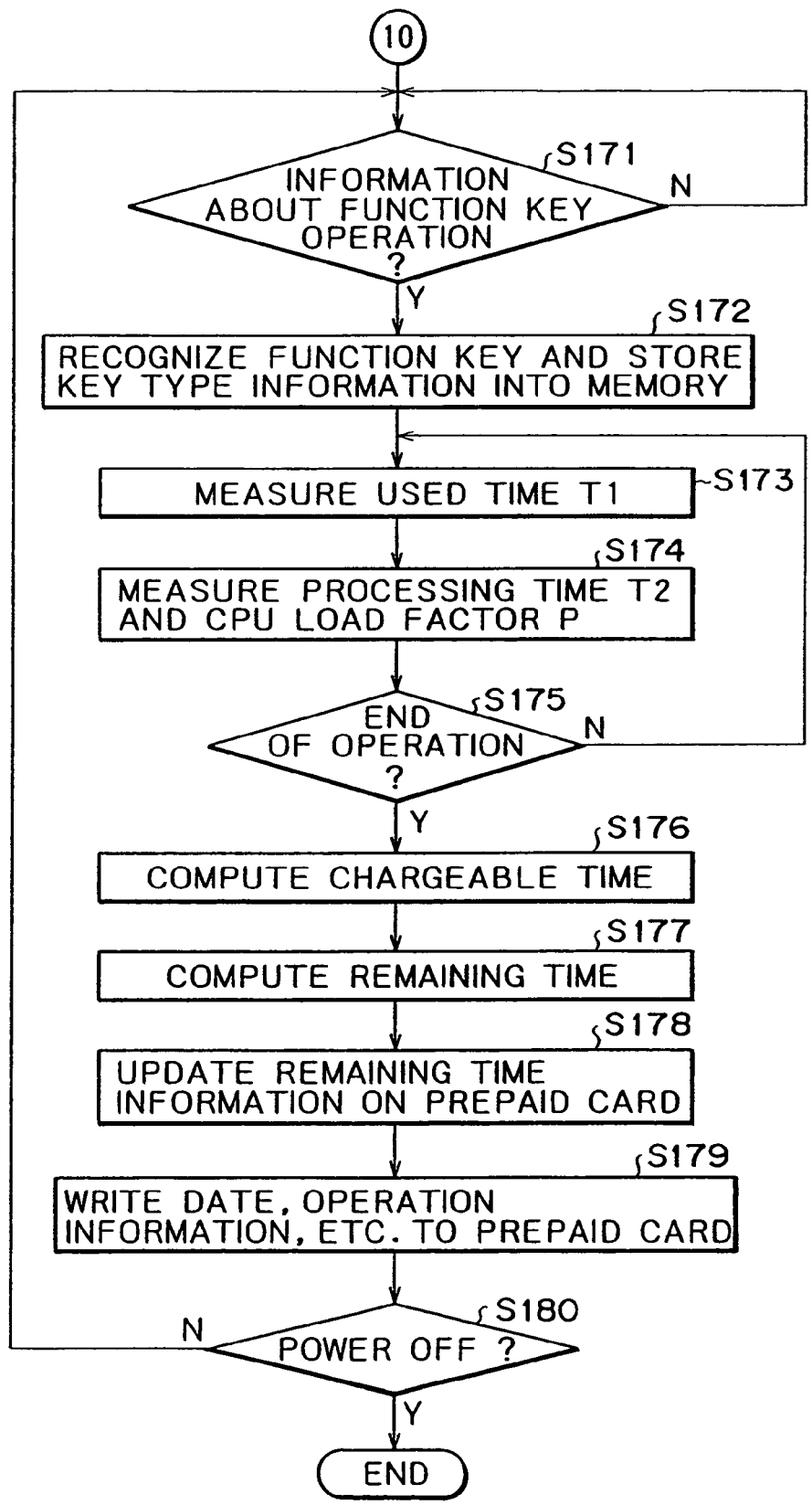
FIG. 28 is a flowchart of further steps performed by the electronic apparatus of the fifth embodiment.

FIGS. 27 and 28 are flowcharts of steps performed illustratively by the electronic apparatus 30 as the fifth embodiment.

When the electronic apparatus 30 is turned on (in step S161), initialization is carried out (in step S162). The controlling part 351 checks to see if a prepaid card 70 is inserted (in step S163). If no prepaid card is judged inserted, the controlling part 351 causes the microcomputer part 31 to display on a display part 34 a message prompting the user to attach the prepaid card 70 (in step S164).

When the controlling part 351 judges that the prepaid card 70 is inserted, the controlling part 351 reads the remaining usable time information from the card (in step S165). A check is made to see if the remaining usable time is zero (in step S166). If the remaining time is judged zero, the apparatus 30 causes the microcomputer part 31 to display on the display part 34 a message saying that the prepaid card has no remaining usable time and needs to be replaced (in step S167).

A check is made to see if the prepaid card 70 is replaced (in step S168). If the prepaid card 70 is not replaced, a check is made to see if the apparatus 30 is turned off (in step S170). If power is judged removed, the processing is brought to an end. If power is judged still applied, then step S167 is reached again and the message urging replacement of the prepaid card 70 is displayed on the display part 34.

If in step S168 the controlling part 351 judges that the prepaid card 70 is replaced, the controlling part 351 reads the remaining usable time information from the newly inserted card (in step S165). A check is made to see if the remaining time is zero (step S166). If the remaining time is not judged zero, the remaining time is displayed on the display part 34 by means of the microcomputer part 31 (in step S169).

The controlling part 351 awaits reception of information about function key activation from the microcomputer part 31 (in step S171). Upon receipt of the information about any function key being activated, the controlling part 351 recognizes the operated function key and stores key type information into the memory 353 (in step S172).

Using information from the clock part 352, the controlling part 351 measures an execution time in which the function in question has been active, i.e., a used time T1 of the enabled function (in step S173). The controlling part 351 then measures a CPU processing time in which the CPU of the microcomputer part 31 has been continuously operating, i.e., a processing time T2 excluding the sleep time, as well as a CPU load factor P of the microcomputer part 31 (in step S174). In this example, the CPU load factor P is computed repeatedly during function execution. Alternatively, the CPU load factor P may be calculated at the end of the function execution.

As mentioned earlier, the load factor P is computed by use of the following expression:

$$P=(T2/T1) \times K$$

where, K denotes a coefficient of variation determined by the type of equipment such as video equipment, audio equipment, television set, or storage medium in use.

Step S173 to measure the used time T1 and step S174 to measure both the processing time T2 and the CPU load factor P are repeated, until execution of the function in question comes to an end (in step S175).

When execution of the function is judged to have ended, the controlling part 351 of the charge processing part 35 computes a chargeable time "t" (in step S176) using the following expression:

$$\text{chargeable time } t = \text{used time } T1 \times \text{CPU load factor } P$$

Since the chargeable time "t" is given as T2×K, it is possible alternatively to measure only the processing time T2 and skip used time (Ti) measurement.

Using the chargeable time "t" information thus computed, the controlling part 351 computes the remaining usable time (in step S177). With the remaining time computed, the remaining time information on the prepaid card 70 is updated accordingly (in step S178). Other information such as dates and operation information is also written to the prepaid card 70 (in step S179). These items of information are later retrieved from the card 70 by the time charge management company 21 as material for market research and other purposes.

The microcomputer part 31 then checks to see if power is removed (in step S180). If power is not judged removed, step S171 is reached again and the activation of another function key is awaited. If power is judged turned off, the processing routine is terminated.

The prepaid card 70 may be sold not only through the manufacturer-vender and time charge management company 21 but also over the counter of convenience stores and other establishments. It may be a good idea to devise a scheme whereby users who turned in their exhausted prepaid cards are rewarded with bonus data and/or a courtesy usable time card so that valuable material such as operation information may be culled from the returned cards.

Sixth Embodiment

Whereas the fifth embodiment above was shown settling payments after they came due by use of prepaid cards in conjunction with the electronic apparatus, the sixth embodiment of this invention utilizes an IC bank card in place of the prepaid card. The electronic apparatus of the sixth embodiment is the same in hardware constitution as that of the fifth embodiment and thus will not be discussed further.

The sixth embodiment causes payments to be settled after they have come due, not before. Illustratively, following step S40 in the flowchart of FIG. 11 for the second embodiment, the charge processing part 35 computes fees corresponding to the chargeable time. The fees are transferred from the user's bank account by use of his IC bank card. Operation information and other related items of information are also written to the bank card.

With the sixth embodiment, the operation information and other relevant items written to the IC bank card are transferred from the bank to the time charge management company 21. Of the items of information stored in the memory 353 of the electronic apparatus 30, the operation information may be transferred from the electronic apparatus 30 to the time charge management company 21.

Seventh Embodiment

Whereas the fifth embodiment above was shown settling payments after they came due by use of prepaid cards, the seventh embodiment of this invention uses the memory 353 of the charge processing part 35 to set up a prepaid scheme in conjunction with the electronic apparatus 30.

The charge processing part of the seventh embodiment may be implemented in one of two types: a built-in type such as the charge processing part 35 inside the electronic apparatus 30 of the second embodiment, or a detachable type such as the charge processor 50 for the fourth embodiment.

The electronic apparatus of the seventh embodiment, as with the second embodiment, is connectable to the charge management system 210 of the time charge management company 21 via the personal computer 40 and over a digital or analog communication network.

Figure 29:
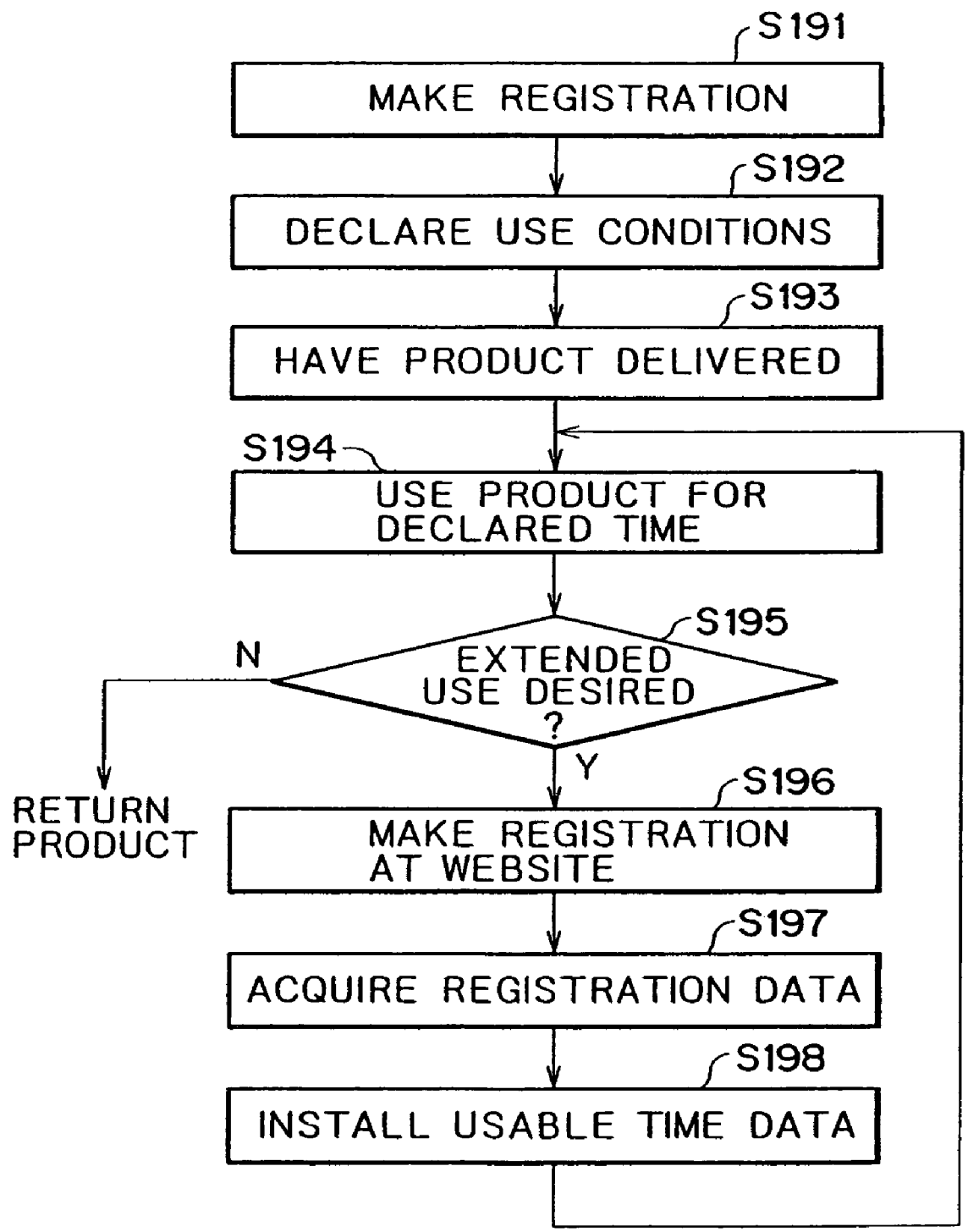
FIG. 29 is a flowchart of steps constituting overall processing performed by a charging system of a seventh embodiment of this invention.

FIG. 29 is a flowchart of steps constituting overall processing performed by the seventh embodiment.

A customer registers with the time charge management company 21 to become a registered member (in step S191). Registration of membership may be done either over the counter of the time charge management company or at a website on the Internet. The registered member may declare in advance such conditions of use as a usable time (in step S192), acquire a desired chargeable product such as the electronic apparatus in this example (in step S193), and use the product during the usable time declared (in step S194).

If the registered member wishes to continue using the product past the declared usable time (in step S195), the member makes another registration of use conditions at the website using the personal computer 40 (in step S196), obtains registration data (in step S197), and installs usable time data into the memory 353 of the electronic apparatus 30 (in step S198). This enables the electronic apparatus 30 for use over an extended period.

If any extended use of the product is not desired (in step S195), then the registered member returns the electronic apparatus to the time charge management company 21.

Figure 30:
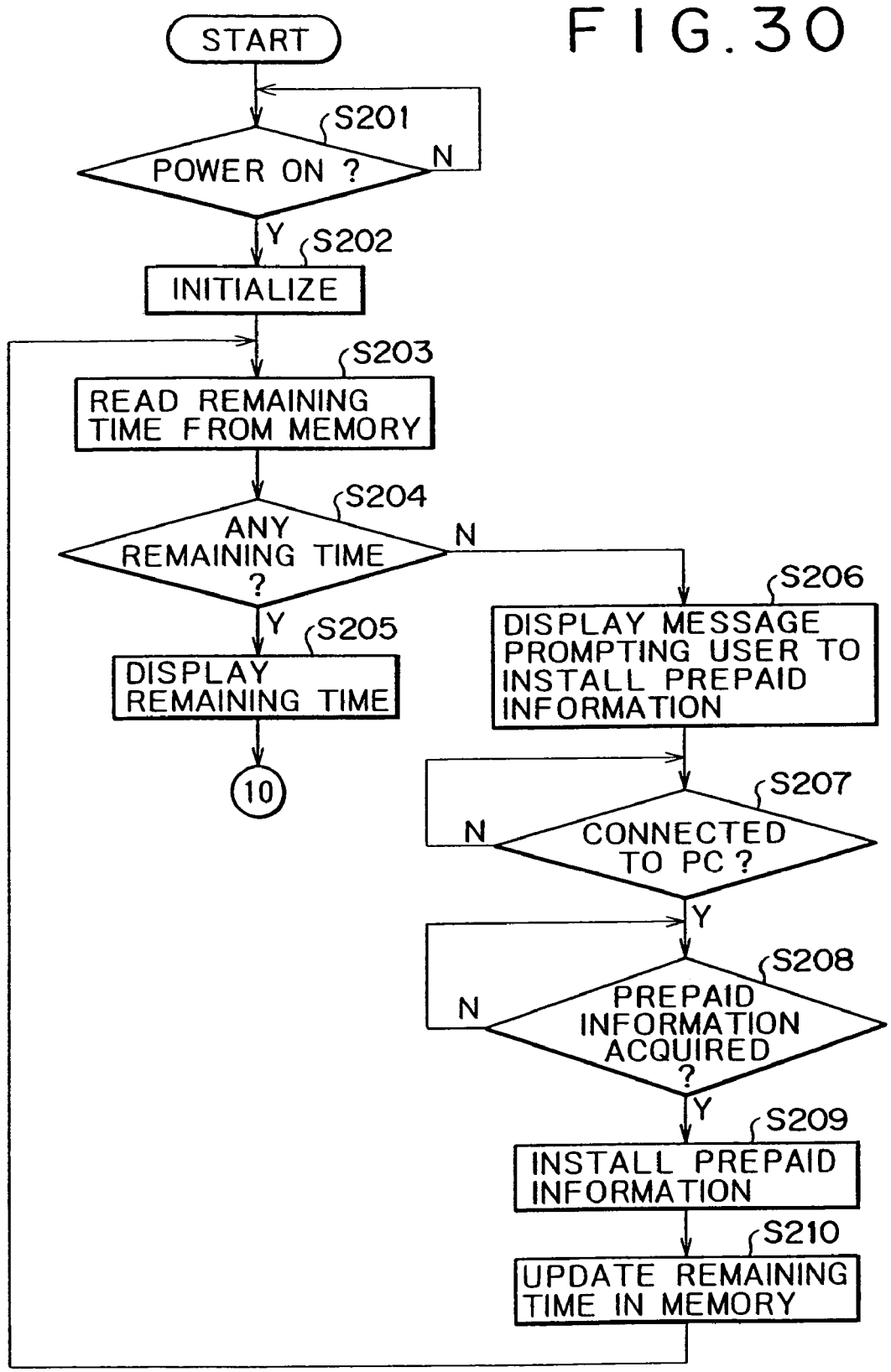
FIG. 30 is a flowchart of steps carried out by an electronic apparatus practiced as the seventh embodiment.

FIG. 30 is a flowchart of steps carried out by the electronic apparatus 30 of the seventh embodiment.

When the electronic apparatus 30 is turned on (in step S201), initialization is carried out (in step S202). The controlling part 351 reads the remaining usable time information from the memory 353 of the charge processing part 35 (in step S203). A check is made to see if the remaining time is zero (in step S204). If the remaining time is judged zero, a message prompting the user to install usable time information (i.e., prepaid information representative of use conditions) is displayed on the display part 34 by means of the microcomputer part 31 (in step S206).

Given the message, the user connects the electronic apparatus 30 to the personal computer 40 to prepare for prepaid information installation.

The controlling part 351 of the electronic apparatus 30 checks to see if the apparatus 30 is connected to the personal computer 40 (in step S207). Using the personal computer 40, the user acquires prepaid information about a usable time from the time charge management company 21, in a manner to be described later. The prepaid information thus obtained is transferred to the electronic apparatus 30.

The controlling part 351 of the electronic apparatus 30 checks to see if the prepaid information has come from the personal computer 40 (in step S208). If the receipt of the prepaid information is confirmed, the information is installed into the memory 353 of the charge processing part 35 (in step S209). This rewrites the remaining usable time in the memory 353 (in step S210).

Step S210 is followed by step S203 in which the controlling part 351 reads the remaining usable time from the memory 353. A check is again made to see if the remaining time is zero (in step S204). The remaining time, if any, is displayed on the display part 34 by means of the microcomputer part 31 (in step S205).

Step S205 is followed by step S171 and subsequent steps in FIG. 28, i.e., the same steps carried out in conjunction with the prepaid card. Still, there is a difference: it is not the prepaid card but the memory 353 of the charge processing part 35 in which the usable remaining time is updated in step S178 and to which the operation information and other relevant data are written in step S179.

Figure 31:
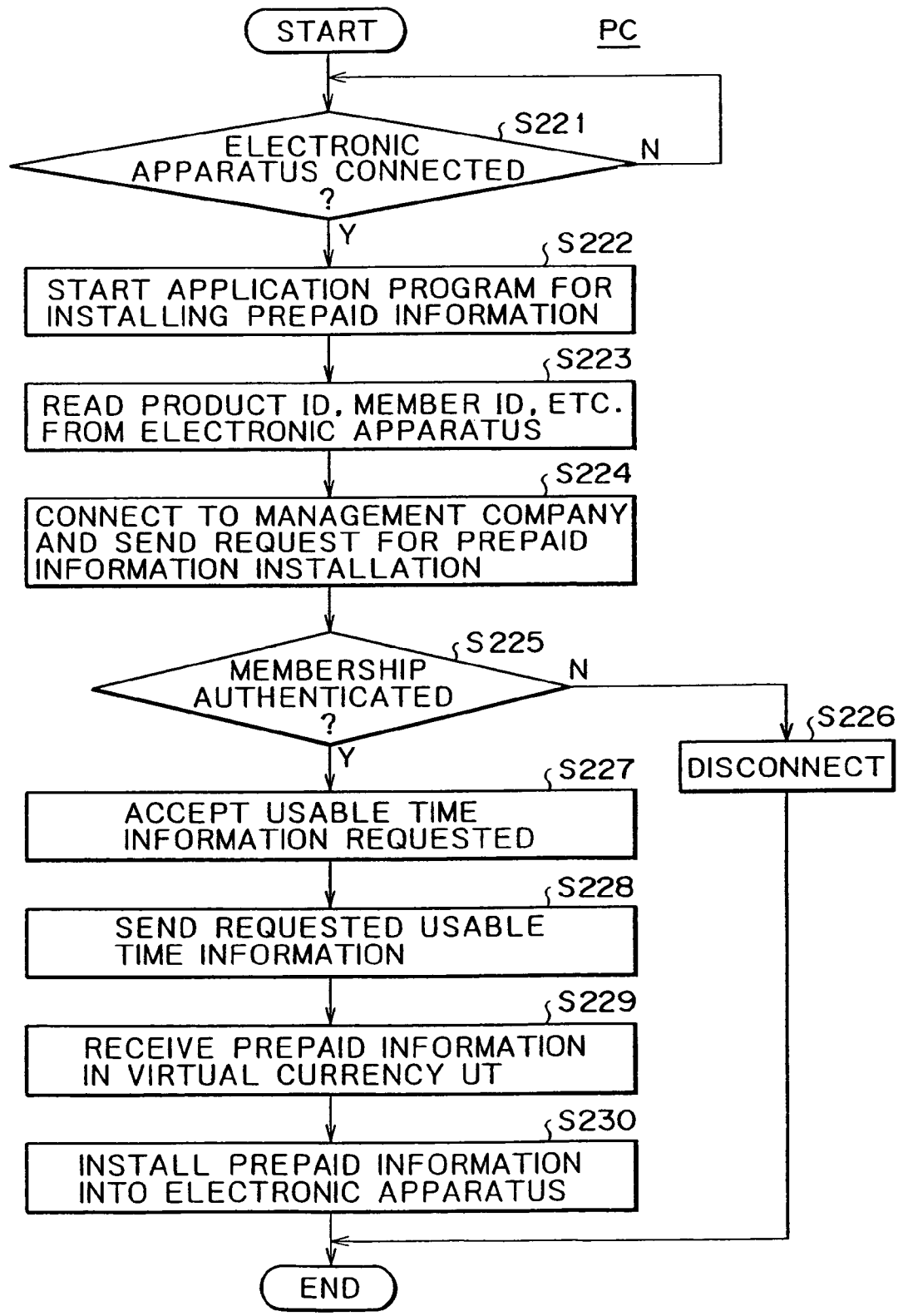
FIG. 31 is a flowchart of steps explaining a key aspect of the seventh embodiment.

How prepaid information is installed by use of the personal computer 40 will now be described by referring to a flowchart of FIG. 31. The processing of FIG. 31 corresponds to the registration of use conditions at the website in step S196 of FIG. 29.

The personal computer 40 first checks to see if the electronic apparatus 30 is connected to it (in step S221). With the electronic apparatus 30 judged connected, an application program for prepaid information installation is started by the user's operation (in step S222).

The personal computer 40 reads information necessary for membership authentication such as the member ID and product ID from the memory 353 of the charge processing part 35 in the electronic apparatus 30 (in step S223). After a connection is established with the charge management system 210 of the time charge management company 21 through a data communication network such as the Internet, a prepaid information installation request is output to the charge management system 210 (in step S224) together with the information needed for membership authentication read in step S223.

Upon receipt of the installation request, the charge management system 210 performs membership authentication and notifies the personal computer 40 of the result of the authentication. Given the notice, the personal computer 40 checks to see if the user's membership is authenticated (in step S225). If the user's membership is not authenticated, the personal computer 40 severs the hookup to the charge management system 210 (step S226). The processing routine is then brought to an end.

If the user's membership is found authenticated, then the input of usable time information requested by the user is accepted (in step S227). The accepted usable time information is sent to the charge management system 210 (in step S228).

With the seventh embodiment, the charge management system 210 converts the accepted usable time information into a virtual currency UT (Used Time) and regards the currency as prepaid information. The charge management system 210 settles payments corresponding to the prepaid information by resorting to a settlement method registered by the user identified by his member ID.

UT is a virtual currency unit established in consideration of a unit used time in which the product has been used. For example, if one UT is worth 0.1 minute and the unit time fee is ¥0.01 per second, then the exchange rate between the virtual currency UT and the Japanese currency is 0.06 yen to the UT.

Cash paid in advance and converted to the virtual currency UT is represented by prepaid information. The charge management system 210 returns such prepaid information to the personal computer 40.

The personal computer 40 receives the prepaid information in virtual currency UT (in step S229). The received prepaid information is forwarded to the electronic apparatus 30 and installed therein as usable time information (in step S230).

With the seventh embodiment, the electronic apparatus 30 decrements by unit time the usable time information expressed in virtual currency UT. For example, when one minute of chargeable time has elapsed, an amount worth 10 UT units is subtracted from the remaining usable time. The display of the remaining usable time is carried out by converting into time numbers the usable time information expressed in virtual currency UT.

A major advantage of the seventh embodiment is this: if it is desired to replace the currently used product with a new one before the remaining usable time in the memory 353 of the charge processing part 35 is exhausted, the replaced old product with its remaining usable time can still be marketed in the secondhand product market.

Figure 32:
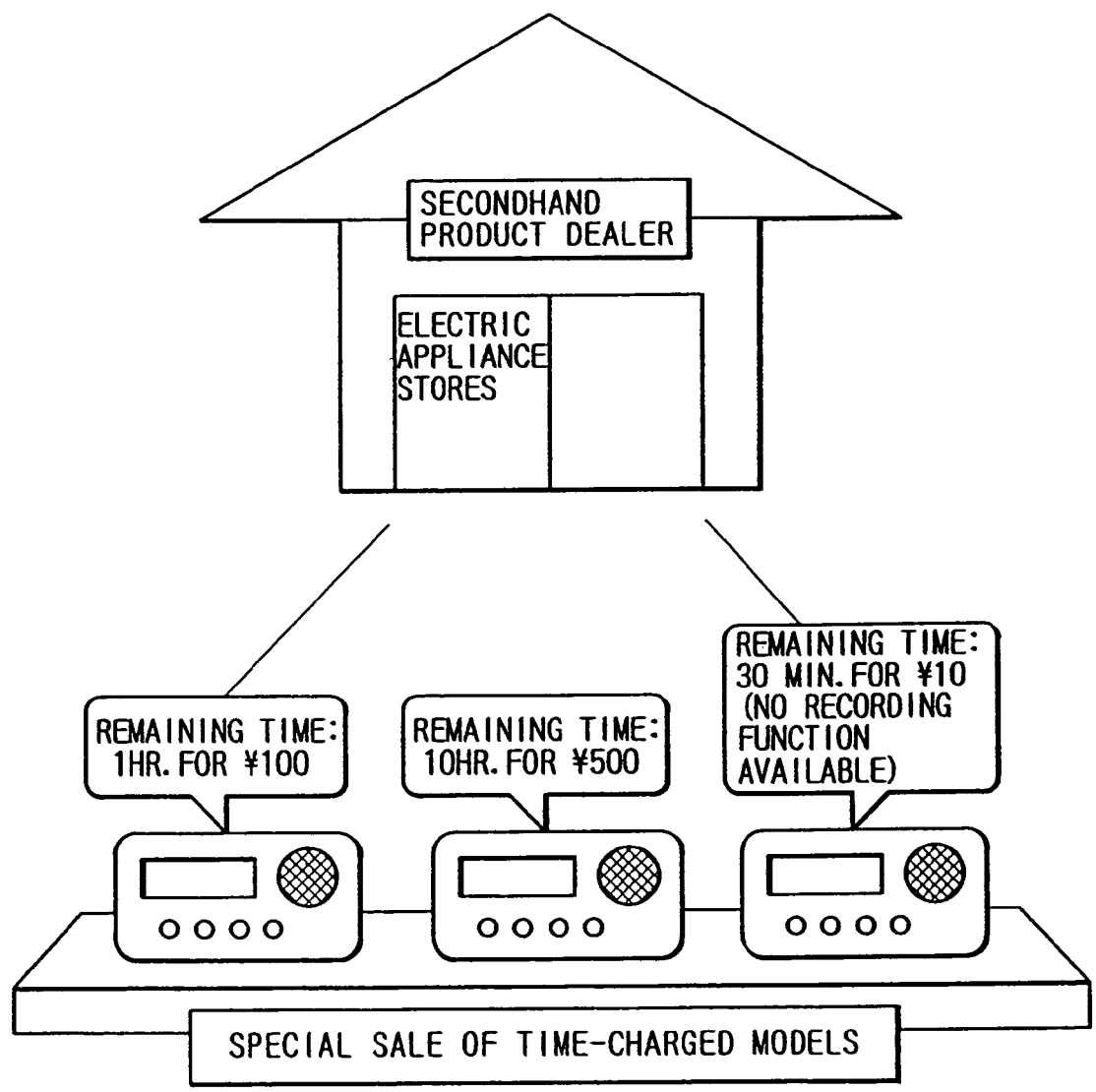
FIG. 32 is a schematic view explaining a secondhand product market.

FIG. 32 is an explanatory view showing how a replaced but still usable product is typically handled on a secondhand product market. A secondhand product dealer reads the remaining usable time from the memory 353 of the replaced electronic apparatus 30, and sets fees corresponding to the retrieved remaining time. Whereas the electronic apparatus of the seventh embodiment displays its remaining usable time when turned on, other electronic apparatuses with no such remaining time display function can still be placed on the secondhand product market if their remaining usable time information is retrieved and established as a marketable resource by the personal computer or by a suitable dedicated reading device.

As with the first embodiment, any one of the second through the seventh embodiments may have its accumulated used time computed for charges based on the time-price relationship table of FIG. 2 for depreciation purposes.

Eighth Embodiment

The eighth embodiment of this invention is also implemented as an electronic apparatus. Whereas the foregoing embodiments were each shown fabricated as a time-charged model from the beginning, the eighth embodiment may be switched between a time-charged model and an ordinary sell-off model setting, simply by use of a password.

Figure 33:
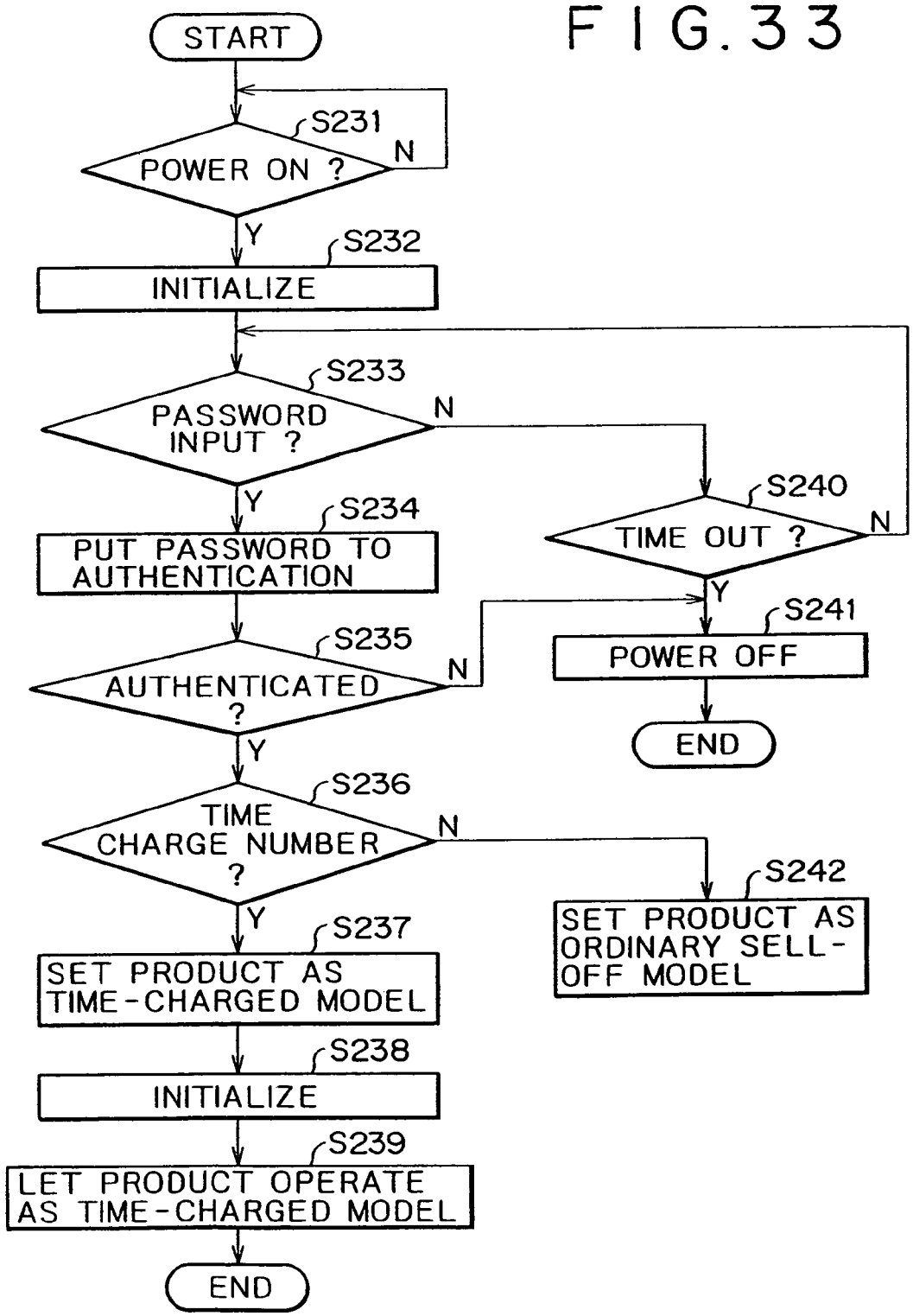
FIG. 33 is a flowchart of steps in which an electronic apparatus practiced as an eighth embodiment of this invention is switched between settings of different models.

FIG. 33 is a flowchart of steps in which the electronic apparatus of the eighth embodiment is switched between settings of the two models.

When power is turned on (in step S231), initialization is carried out (in step S232). The input of a password is awaited (in step S233). If the microcomputer part 31 judges that no password is input within a predetermined time period (in step S240), the electronic apparatus is automatically turned off (in step S241), and this processing routine is terminated.

If the microcomputer part 31 judges that a password is input in time, the microcomputer part 31 subjects the password to authentication (in step S234). If the password is not authenticated (in step S235), the electronic apparatus is automatically turned off (in step S241), and the processing routine is brought to an end.

If the input password is authenticated (in step S235), the microcomputer part 31 checks to see if the password represents a time charge number (in step S236). The time charge number is a number that is attached to the time-charged model.

If in step S236 the microcomputer part 31 judges that the input password is not the time charge number, then the electronic apparatus is established as an ordinary sell-off model (in step S242). In the electronic apparatus of the ordinary model, the charge processing part 35 remains inactive.

If in step S236 the input password is judged to be the time charge number, the electronic apparatus is established as a time-charged model and its charge processing part 35 is activated (in step S237). After the electronic apparatus is initialized as the time-charged model (in step S238), the apparatus is enabled so as to effect the diverse functions discussed in connection with the foregoing embodiments (in step S239). Although the flowchart of FIG. 33 shows how password authentication is carried out to establish each of an ordinary sell-off model and a time-charged model, this is not limitative of the invention. Alternatively, the routine may be rearranged to authenticate the password to establish either an ordinary sell-off model or a time-charged model only.

As described, the electronic apparatus of the eighth embodiment is classified either as an ordinary sell-off model or a time-charged model by the simple input of a password. There is no need to manufacture electronic apparatuses in two different models. This facilitates mass-production of the apparatuses, which contributes to reducing their costs.

Ninth Embodiment

The ninth embodiment of this invention is another example of the prepaid scheme. But instead of using prepaid cards or IC bank cards, the ninth embodiment utilizes coin-type virtual currency. Each coin contains electronic circuitry made up of a storage part for storing operation data and other relevant information, a processing part for computing charges, and a data transmitter-receiver. In the description that follows, the virtual currency coin will be referred to as UT (Used Time) Money (not to be confused with electronic money constituted by electronic data).

The ninth embodiment makes use of the virtual currency UT discussed in connection with the seventh embodiment above. The virtual currency UT represents the value of usable time information held in the storage part of the electronic circuitry in the coin. As mentioned earlier, the unit of the virtual currency is one UT.

The ninth embodiment presupposes the business model shown in FIG. 9. To have its used time paid for, the ninth embodiment resorts to a scheme depicted in FIG. 34 in which charges are settled through the UT Money.

As described earlier, the user registers with the time charge management company 21 to become a registered member 27. As a registered member, the user takes delivery of the electronic apparatus 30 whose use contract has been concluded with the time charge management company 21, and receives UT Money 80. At this point, the storage part of the UT Money 80 contains the virtual currency units UT corresponding to the amount paid by the registered member. The UT count represents the usable time of the product. The storage part of the UT Money 80 also retains such user-related information as the name of the registered member 27 (i.e., user's name), user ID, and password.

The registered member 27 inserts into the electronic apparatus 30 a UT Money 80 whose UT count as the virtual currency is not zero (i.e., the usable time is not zero). This allows the electronic apparatus 30 to start being used. As in the case of the prepaid card above, the electronic apparatus 30 has its used time converted into the corresponding amount of virtual currency UT for charge processing. Specifically, the virtual currency UT count in the storage part of the UT Money 80 is decremented by an amount corresponding to the accumulated used time. During the charge processing, the electronic apparatus 30 writes use history information to the storage part of the UT Money 80. The use history information includes dates of use, used time periods and other relevant data.

The registered member 27 can buy additional virtual currency UT at a UT trading kiosk terminal 90 when the remaining UT count of the virtual currency is running short in the storage part of the UT Money 80. With the ninth embodiment, the registered member 27 may sell an unnecessary but still usable coin in virtual currency UT at the UT trading kiosk terminal 90.

The UT trading kiosk terminal 90 is connected to the time charge management company 21 through the digital communication network 29. The UT trading kiosk terminal 90, upon request by the management company 21 or on its own initiative, transfers to the management company 21 UT trading information as well as use history information retrieved from the UT Money 80.

The ninth embodiment regards the virtual currency UT as a fluctuating currency, as will be described later. One factor of currency fluctuation is defined by the past history of used times such as the accumulated used time per day or per month. That is, if the used time of the preceding month turned out to be relatively short, the exchange rate of the virtual currency UT for this month is lowered; if the used time of the preceding month was relatively long, the exchange rate for this month is raised. The exchange rate is modified by altering an exchangeable amount per UT. Although it is possible to change the used time per UT, altering the exchangeable amount is more convenient because the absence of the need to change the used time per UT means there is no need to modify the exchange rate in computing the usable time.

Another factor of virtual currency fluctuation is defined by the number of virtual currency units UT traded. Specifically, if a large number of virtual currency units UT have been traded, the exchange rate of the virtual currency is raised; if only a small number of virtual currency units UT have been traded, the exchange rate is lowered. In such a case, the number of virtual currency units UT traded with the ninth embodiment is determined not only by the number of traded UT units reported by the kiosk terminals 90 but also by the number of UT units traded on a virtual UT trading market 100, to be described later.

The exchange rate of the virtual currency UT is determined as described illustratively by the month and transferred to each kiosk terminal 90 over the digital communication network 29. The transferred rate is used as the month's exchange rate for trading the virtual currency UT. The registered member 27 buys or sells the virtual currency in reference to this exchange rate.

When the virtual currency is allowed to fluctuate in value with regard to the actual currency, any seasonal fluctuations in used time of the electronic apparatus 30 are averaged out over time. This can contribute to raising the operating rate of the electronic apparatus 30. A boosted operating rate of the electronic apparatus 30 helps reduce its excess stock as a product to be charged for used time.

Suppose that the use status of a time-chargeable product such as the electronic apparatus 30 fluctuates due to economic, seasonal and/or political factors. In that case, if the charging rate is fixed with respect to used time, the used time count of the electronic apparatus 30 can fluctuate wildly as indicated by thick solid lines 101 in FIG. 35.

Figure 35:
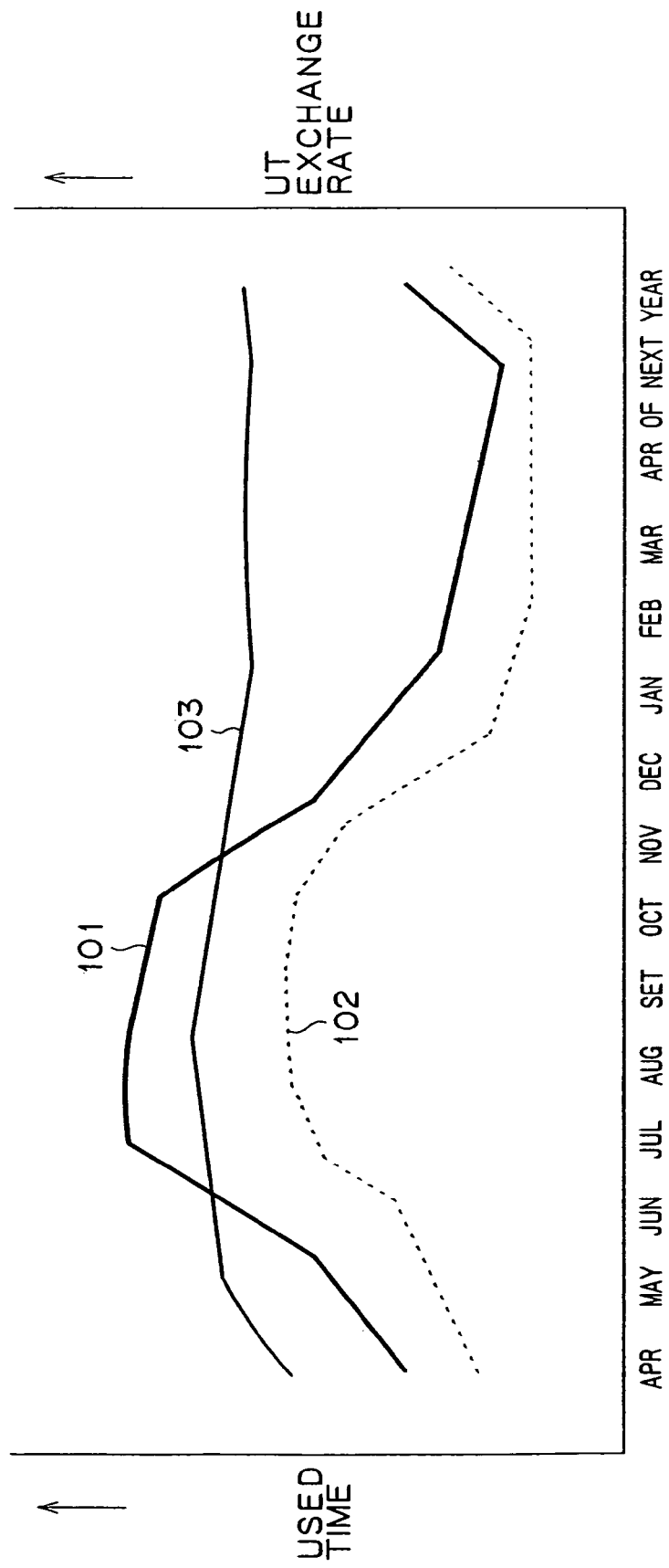
FIG. 35 is a graphic representation depicting variations of consideration for product usage time in connection with the ninth embodiment.

By contrast, if the charging rate of the virtual currency UT is allowed to fluctuate as plotted by broken lines 102 in FIG. 35, then the used time is expected to drop when the exchange rate is higher and go up when the rate is lower. This scheme, when implemented, is expected to average out seasonal fluctuations in used time of the electronic apparatus 30, as illustrated by thin solid lines 103 in FIG. 35.

If the virtual currency UT itself is traded, more UT units are expected to be purchased when the exchange rate is lower and sold when the rate is higher. This allows users to take advantage of any fluctuations in the exchange rate of the virtual currency UT traded.

Figure 34:
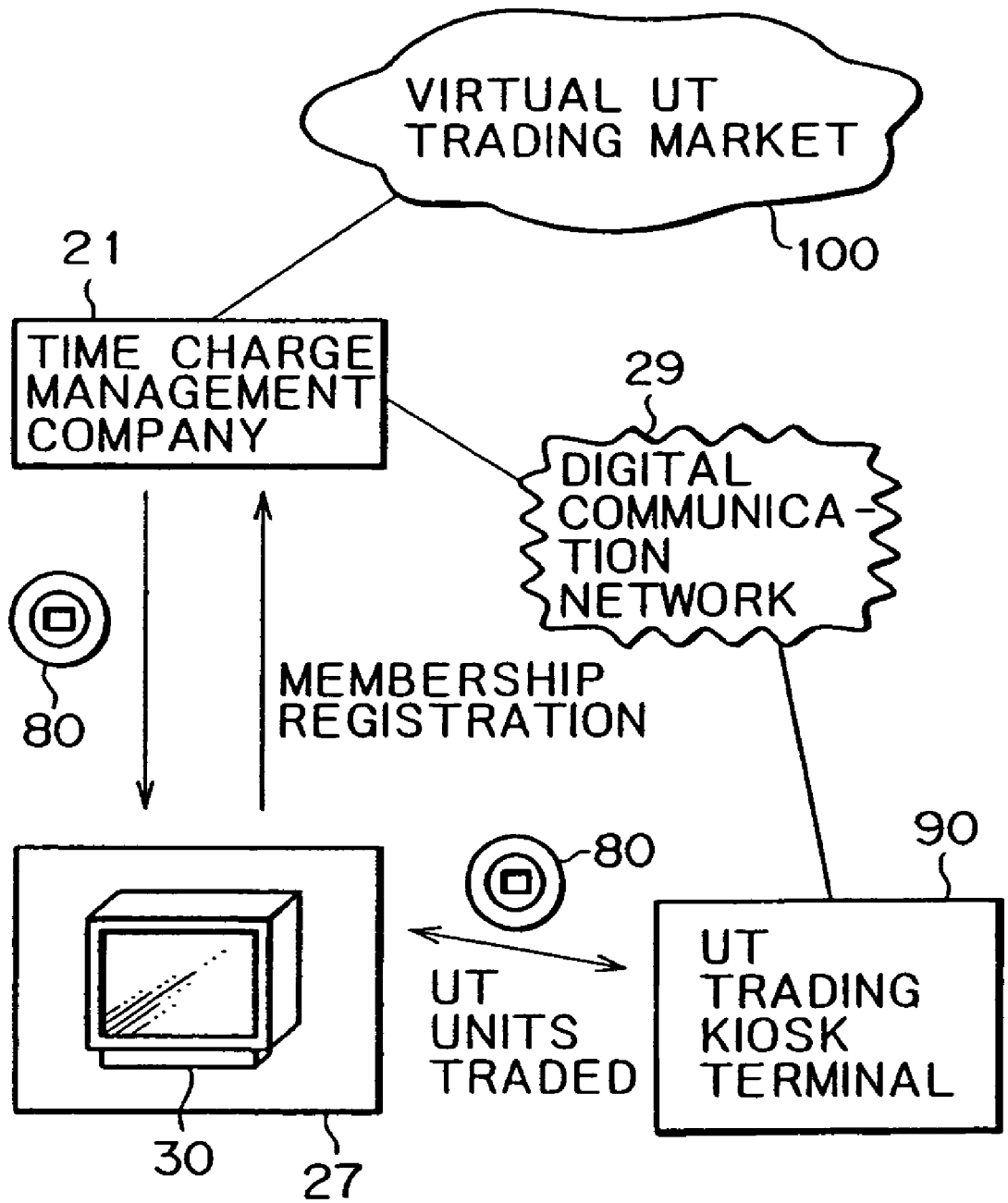
FIG. 34 is a schematic view explaining a business model to which a ninth embodiment of this invention is applied.
Figures 36A, 36B:
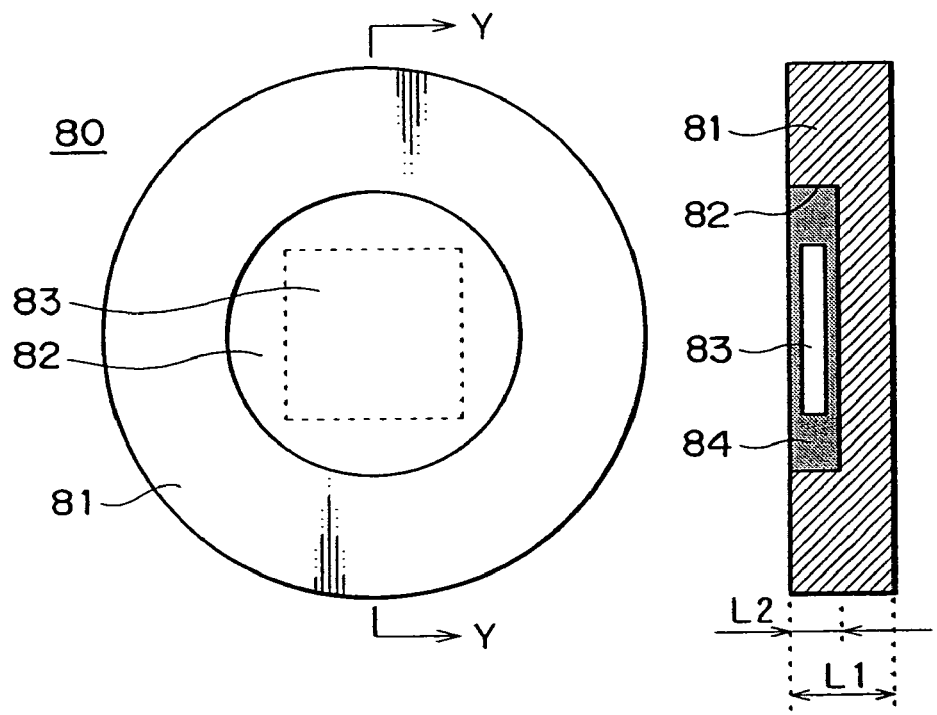
FIGS. 36A and 36B are schematic views explaining a structural example of a UT (Used Time) Money for use with the ninth embodiment.

Described below are some structural examples of the UT Money 80 shown in FIG. 34. FIGS. 36A and 36B illustrate a first structural example of the UT Money 80. FIG. 36A is a front view of the first example of the UT Money 80, and FIG. 36B is a cross-sectional view taken on line Y-Y in FIG. 36A.

The UT Money 80 of the first example is constituted by a flat disc 81 which is made of a metal or resin material and which has a circular depression 82 in the middle. The depression 82 of the UT Money 80 accommodates an electronic circuit 83 and is packed with a filler 84 to secure the circuit 83 inside. A typical filler 84 is an ultraviolet curing resin. In this example, the depth L2 of the circular depression 82 should be smaller than the thickness L1 of the disc 81, e.g., L2=L1/2 or thereabout. The depression 82 is insulated from the electronic circuit 83.

Figure 37:
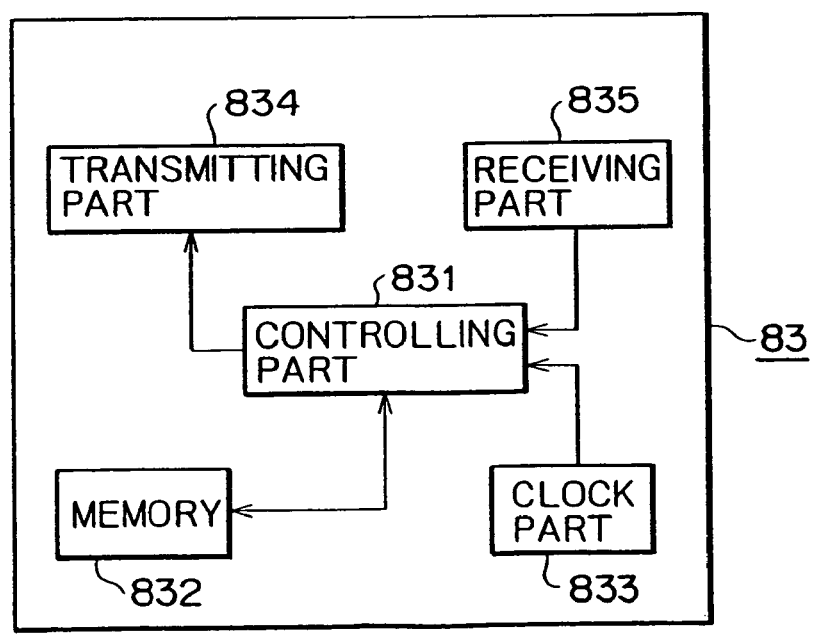
FIG. 37 is a block diagram showing a typical structure of an electronic circuit incorporated in the UT Money used by the ninth embodiment.

In the first example, as shown in FIG. 37, the electronic circuit 83 includes a controlling part 831 composed of a microcomputer, a memory 832, a clock part 833, a transmitting part 834, and a receiving part 835. The transmitting part 834 and receiving part 835 of this setup exchange data with the outside on a wireless basis. Data may be transmitted and received by radio, by infrared emissions, or by ultrasonic waves.

Figures 38A, 38B:
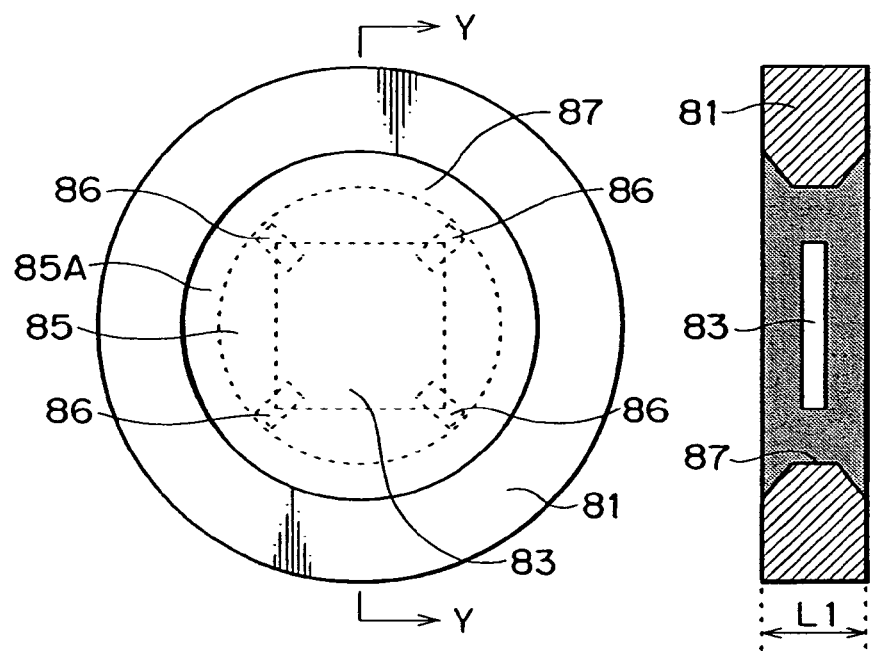
FIGS. 38A and 38B are schematic views explaining another structural example of the UT Money for use with the ninth embodiment.
Figure 39A:
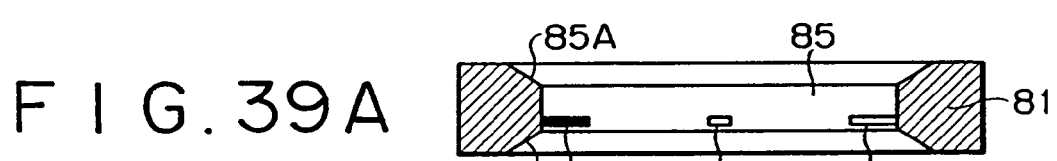
FIGS. 39A, 39B and 39C are schematic views outlining steps to fabricate the UT Money whose structure is shown in FIGS. 38A and 38B.
Figure 39B:
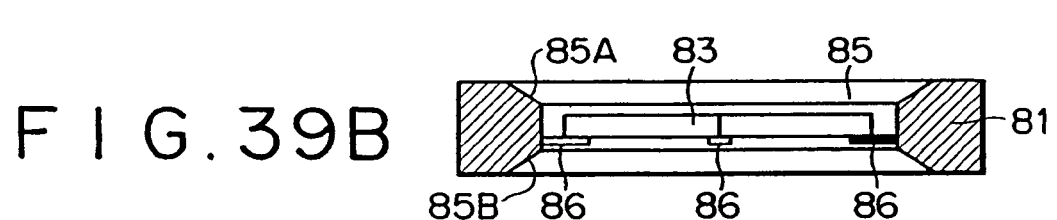
Figure 39C:
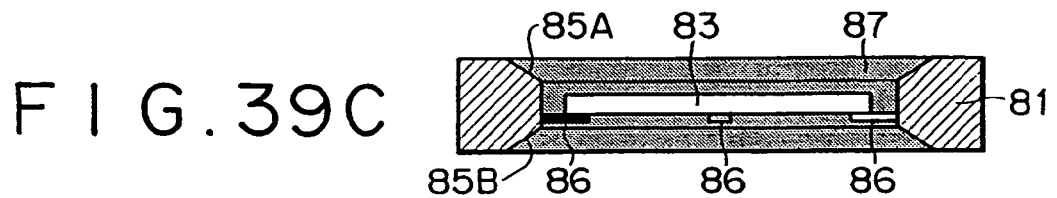

FIGS. 38A and 38B sketch a second structural example of the UT Money 80. FIG. 38A is a front view of the second example of the UT Money 80, and FIG. 38B is a cross-sectional view taken on line Y-Y in FIG. 38A. FIGS. 39A, 39B and 39C are explanatory views outlining steps to fabricate the structure.

The UT Money 80 of the second example is also constituted by a flat disc 81 which is made of a metal or resin material with an electronic circuit 83 embedded in the middle. What characterizes the second example is that measures are taken to attach the embedded electronic circuit 83 securely to the disc 81.

In the second example, as shown in FIG. 39A, the disc 81 has at its center a through-hole 85 that is concentric with the circumference of the disc 81. The inner wall of the through-hole 85 is furnished with tapered faces 85A and 85B which get larger in diameter as they approach both surfaces of the disc 81. The inner wall of the through-hole 85 also has a plurality of projections 86 that fasten the electronic circuit 83 in place.

The electronic circuit 83 is placed onto and engaged with the projections 86 as illustrated in FIG. 39B, so that the circuit 83 is accommodated snugly inside the through-hole 85. With the state of FIG. 39B kept unchanged, the through-hole 85 is stuffed completely with the filler 84 as shown in FIG. 39C. The filler 84 may be an ultraviolet curing resin as mentioned above.

According to the second structural example of the UT Money, the tapered faces 85A and 85B of the through-hole 85 prevent the electronic circuit 83 packed with the filler 84 from getting detached from the disc 81.

Described below with reference to FIG. 40 is a typical hardware constitution of the electronic apparatus 30 practiced as the ninth embodiment.

As illustrated in FIG. 40, the electronic apparatus 30 of the ninth embodiment has a UT Money loading/ejecting mechanism 301. Loading the UT Money 80 into the UT Money loading/ejecting mechanism 301 allows the electronic apparatus 30 to start being used. If the remaining UT count is zero in the memory 832 of the electronic circuit 83 within the UT Money 80, then loading the UT Money 80 will not get the electronic apparatus 30 started.

The UT Money 80 is loaded and ejected by the user operating on a load/eject key to activate the UT Money loading/ejecting mechanism 301 that is under control of the microcomputer part 31. The UT Money 80 may be ejected automatically by the electronic apparatus 30 if, say, the remaining UT count of the UT Money 80 is zero.

The electronic apparatus 30 of the ninth embodiment has no charge processing part. Charge processing is performed by the controlling part 831 of the electronic circuit 83 within the UT Money 80, in a manner to be described later. It is also possible for the electronic apparatus 30 to incorporate a charge processing part so that an outcome of the charge processing may be transferred to the UT Money 80.

The electronic apparatus 30 of this embodiment includes a transmitting part 302 and a receiving part 303 for exchanging data with the UT Money 80. As with the setup shown in FIG. 22, the electronic apparatus 30 has a microcomputer part 31 connected to a function executing part 32, to a key operation part 33 and to a display part 34.

Figure 41:
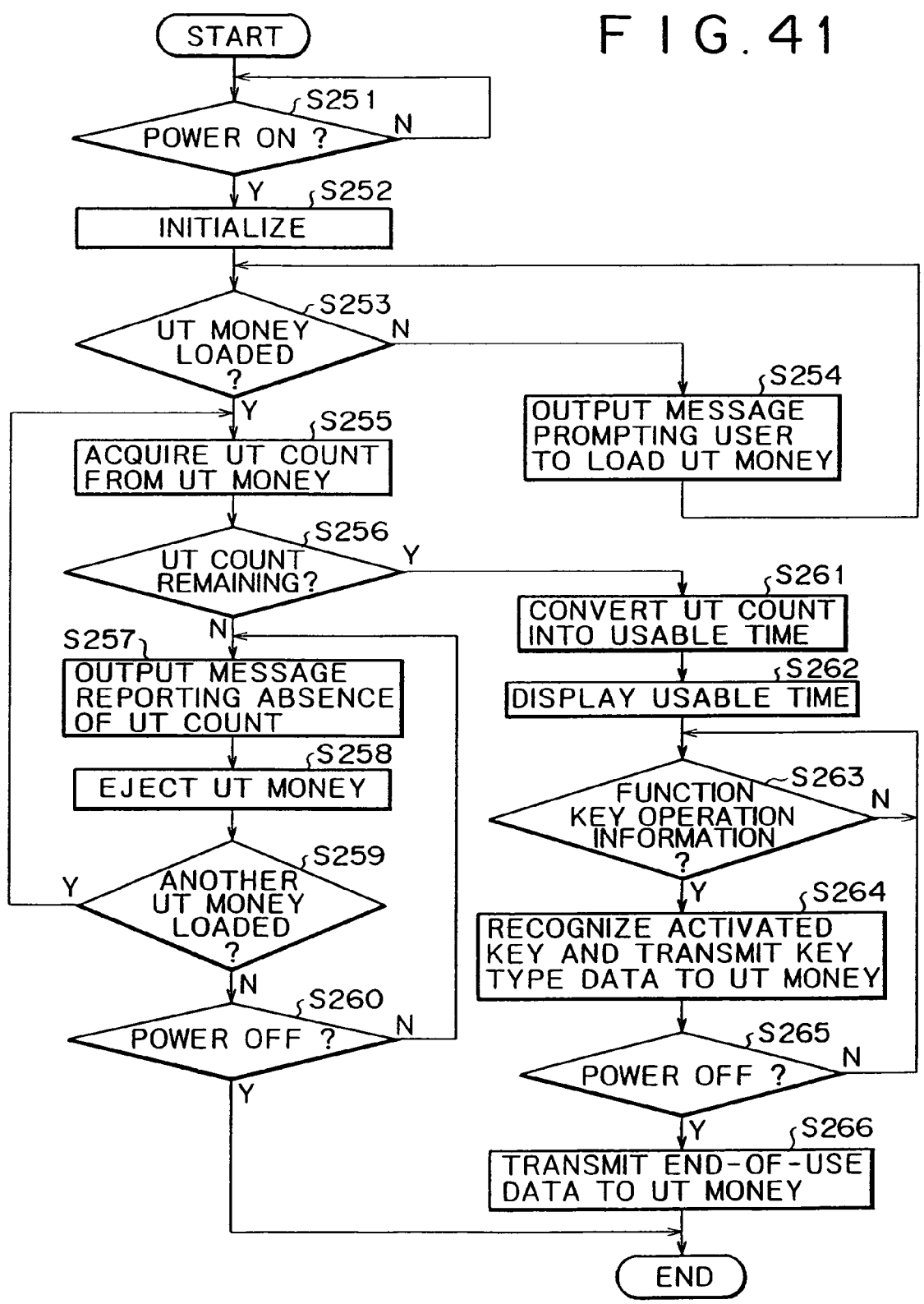
FIG. 41 is a flowchart of steps performed by the electronic apparatus of the ninth embodiment.

FIG. 41 is a flowchart of steps in which the electronic apparatus 30 typically operates as the ninth embodiment. Most of the steps in FIG. 41 are carried out by the microcomputer part 31.

When the electronic apparatus 30 is turned on (in step S251), initialization is performed (in step S252). The microcomputer part 31 checks to see if any UT Money 80 is loaded (in step S253). If no UT Money 80 is judged loaded, a message prompting the user to load the UT Money 80 is displayed on the display part 34 (in step S254).

When the microcomputer part 31 judges that the UT Money 80 is loaded, the microcomputer part 31 sends a UT information transfer request to the UT Money 80 through the transmitting part 302. A response from the UT Money 80 carrying UT count information is received through the receiving part 303 (in step S255). A check is made to see if the UT Money 80 has any remaining UT count (in step S256). If the remaining UT count is found zero, the microcomputer part 31 displays on the display part 34 a message saying that the UT Money 80 has no remaining UT count and needs to be replaced (in step S257).

The UT Money 80 is then ejected (in step S258). Replacement of the UT Money 80 is awaited (in step S259). If the UT Money 80 is not replaced, a check is made to see if power is turned off (in step S260). If power is judged removed, the processing is brought to an end. If power is not turned off, then step S257 is reached again and the display part 34 is made to display the message saying that the UT Money 80 has no remaining UT count and needs to be replaced.

If in step S259 the replacement of the UT Money 80 is confirmed, the remaining UT count is read from the replaced UT Money 80 (in step S255). A check is made to see if the remaining UT count is zero (in step S256). If the remaining UT count is not found zero, that count is converted to a usable time (in step S261). The usable time is displayed on the display part 34 (in step S262).

The microcomputer part 31 checks to see if any function key is activated through the key Operation part 33 (in step S263). If any function key is judged operated on, the type of the activated function key is recognized and key type information is transmitted to the UT Money 80 through the transmitting part 302 (in step S264).

A check is then made to see if power is turned off (in step S265). If power is not judged removed, step S263 is reached again, and step S263 and subsequent steps are repeated. If in step S265 power is judged turned off, end-of-use information is transmitted to the UT Money 80 through the transmitting part 302 (in step S266). The processing is then terminated.

Figure 42:
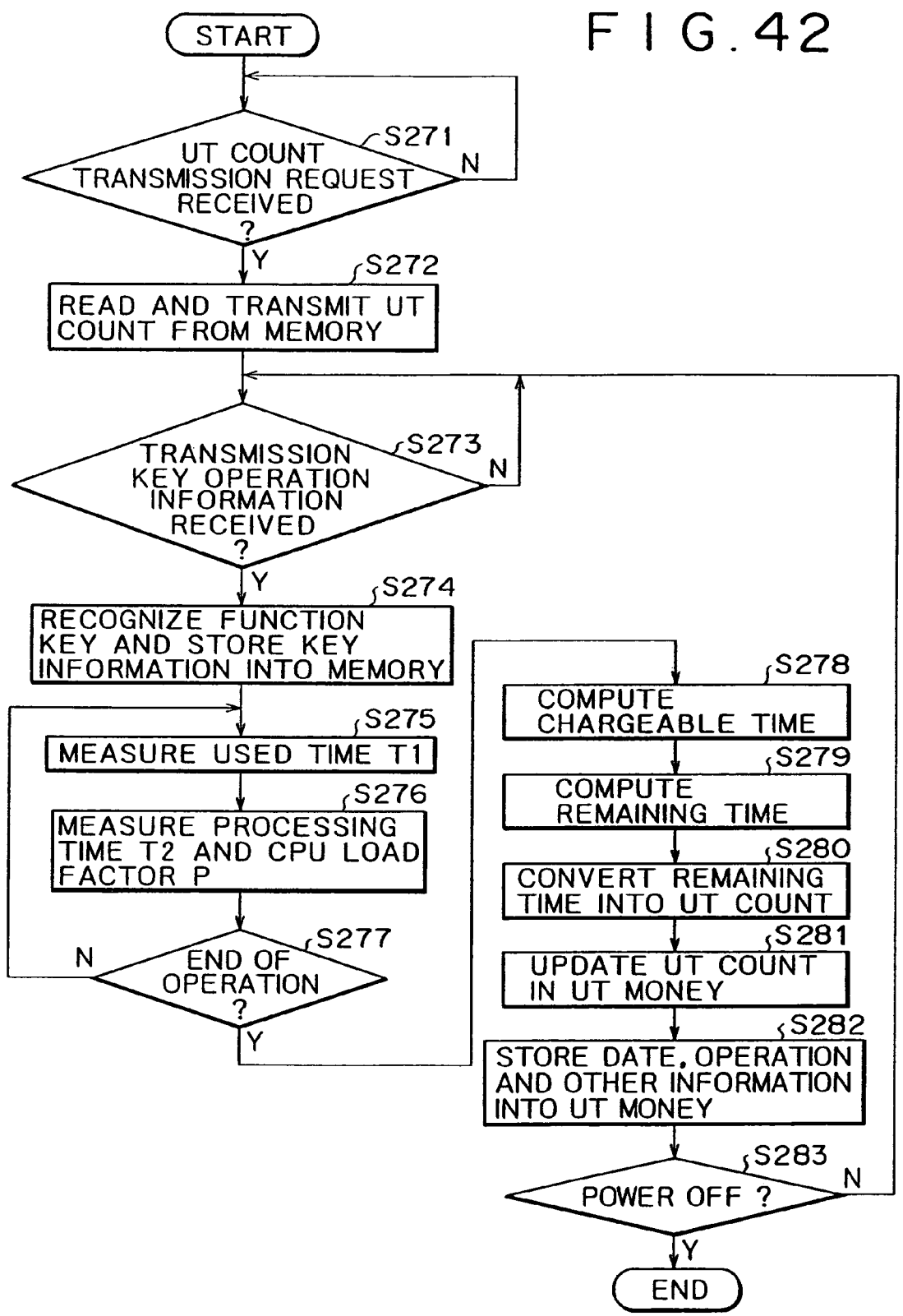
FIG. 42 is a flowchart of steps performed by the electronic circuit in the UT Money for use with the ninth embodiment.

What takes place when the UT Money 80 is loaded into the electronic apparatus 30 will now be described with reference to a flowchart of FIG. 42. The steps of FIG. 42 start being performed when the controlling part 831 of the UT Money 80 judges that the UT Money 80 has been loaded into the UT Money loading/ejecting mechanism 301 of the electronic apparatus 30.

Loading of the UT Money 80 is detected by optical or electronic means illustratively in the UT Money loading/ejecting mechanism 301 of the electronic apparatus 30. Once the UT Money 80 is judged loaded by the electronic apparatus 30, a loading detection signal is transmitted through the transmitting part 302. Alternatively, the UT Money 80 may include optical or electronic means to detect its loading into the UT Money loading/ejecting mechanism 301 of the electronic apparatus 30.

When the UT Money 80 is loaded into the electronic apparatus 30, a UT count transmission request is sent from the apparatus 30. When receipt of the transmission request is confirmed (in step S271), the remaining UT count is read from the memory 832 and transmitted to the electronic apparatus 30 through the transmitting part 834 (in step S272).

If function key operation information is received from the electronic apparatus 30 (in step S273), the activated function key is recognized and information about the function key is stored into the memory 832 (in step S274).

The controlling part 831 measures an execution time in which the function in question has been active, i.e., a used time T1 of the enabled function in accordance with clock information from the clock part 833 (in step S275). With information exchanged between the electronic apparatus 30 and the UT Money 80, the controlling part 831 measures a CPU processing time in which the CPU of the microcomputer part 31 has been continuously operating, i.e., a processing time T2 excluding the sleep time, as well as a CPU load factor P of the microcomputer part 31 (in step S276). In this example, the CPU load factor P is computed repeatedly during function execution. Alternatively, the CPU load factor P may be calculated at the end of the function execution.

As mentioned earlier, the load factor P is computed by use of the following expression:

$$P = (T2/T1) \times K$$

where, K denotes a coefficient of variation determined by the type of equipment such as video equipment, audio equipment, television set, or storage medium in use.

Step S275 to measure the used time T1 and step S276 to measure both the processing time T2 and the CPU load factor P are repeated, until execution of the function in question comes to an end (in step S277).

When execution of the function is judged to have ended, the controlling part 831 of the UT Money 80 computes a chargeable time "t" (in step S278) using the following expression:

chargeable time $t$ = used time $T1$ × CPU load factor $P$

Since the chargeable time "t" is given as T2×K, it is possible alternatively to measure only the processing time T2 and skip used time (T1) measurement.

Using the chargeable time "t" information thus computed, the controlling part 831 computes the remaining usable time (in step S279). The remaining usable time thus computed is converted to a UT count (in step S280). This UT count is subtracted from the UT count in the memory 832 of the UT Money 80, whereby the remaining UT count is updated (in step S281). Other information such as dates and operation information is also written to the memory 832 of the UT Money 80 (in step S282). These items of information are later retrieved from the UT Money 80 at the kiosk-terminal 90 as will be described later and sent to the time charge management company 21 as material for market research to determine UT exchange rate and for other purposes.

A check is then made to see if power is removed (in step S283). If power is not judged removed, step S273 is reached again and activation of another function key is awaited. If power is judged turned off, the processing routine is terminated.

Although the example above was shown having charge processing performed by the UT Money 80, this is not limitative of the invention. Alternatively, as with the setup in FIG. 10, the electronic apparatus may incorporate a charge processing part that may transfer results of its charge processing to the UT Money 80.

Figure 43:
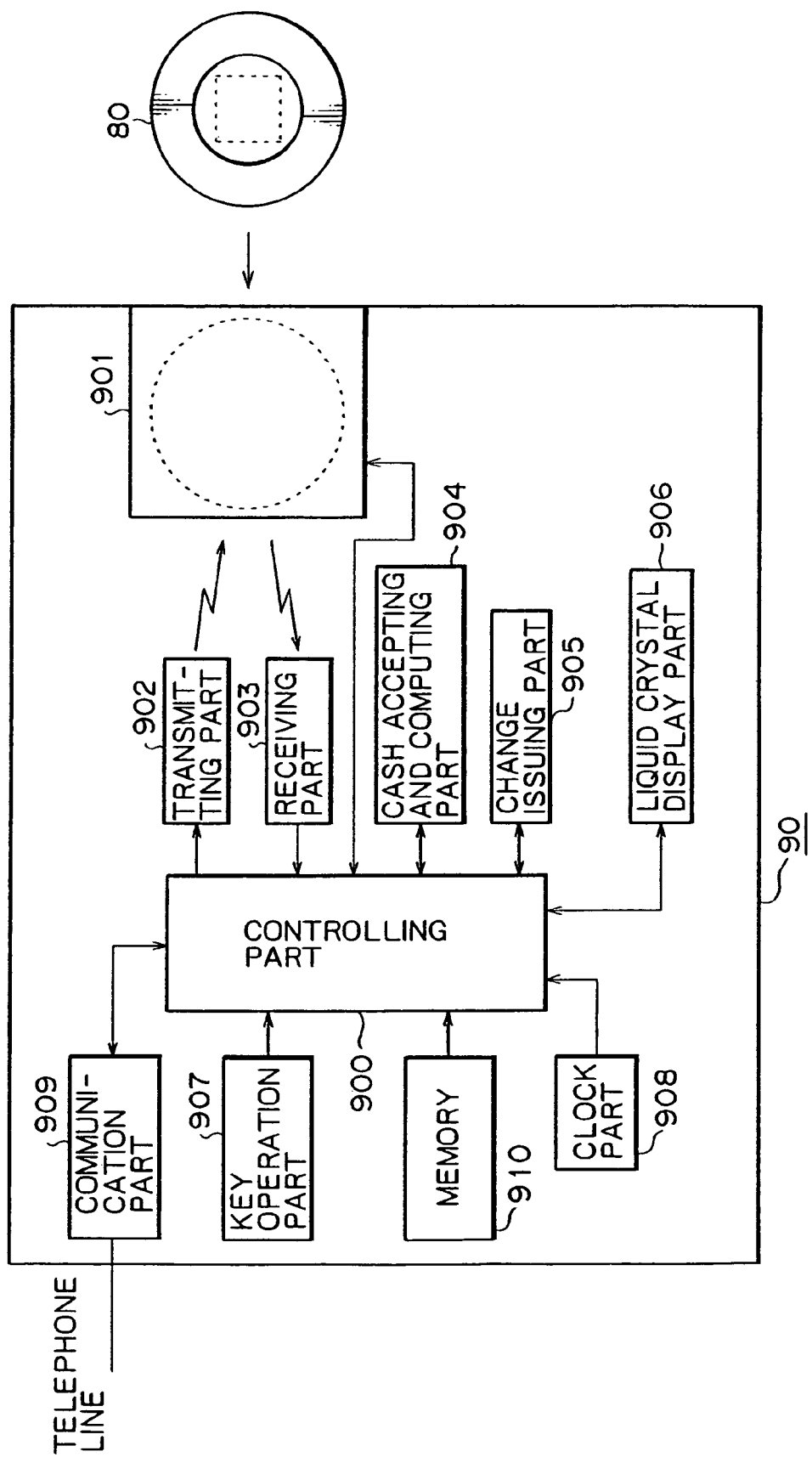
FIG. 43 is a block diagram outlining a typical structure of terminal equipment used by the ninth embodiment.

A typical constitution of the UT trading kiosk terminal 90 will now be described with reference to FIGS. 43 and 44. FIG. 43 is a block diagram outlining a typical internal structure of the UT trading kiosk terminal 90.

As shown in FIG. 43, the UT trading kiosk terminal 90 comprises: a controlling part 900 made of a microcomputer; a UT Money loading/ejecting part 901; a transmitting part 902 for transmitting data to be written to the UT Money 80; a receiving part 903 for receiving data read from the memory 832 of the UT Money 80; a cash accepting and computing part 904; a change issuing part 905; a display part 906 composed of an LCD (liquid crystal display); a key operation part 907 including such keys as numeric keys, a UT buy key and a UT sell key (to be described later); a clock part 908; a communication part 909 connected to a digital communication network 29 illustratively through a telephone line for communication with the time charge management company 21; and a memory 910. The digital communication network 29 may be replaced by an analog communication network.

Figure 44:
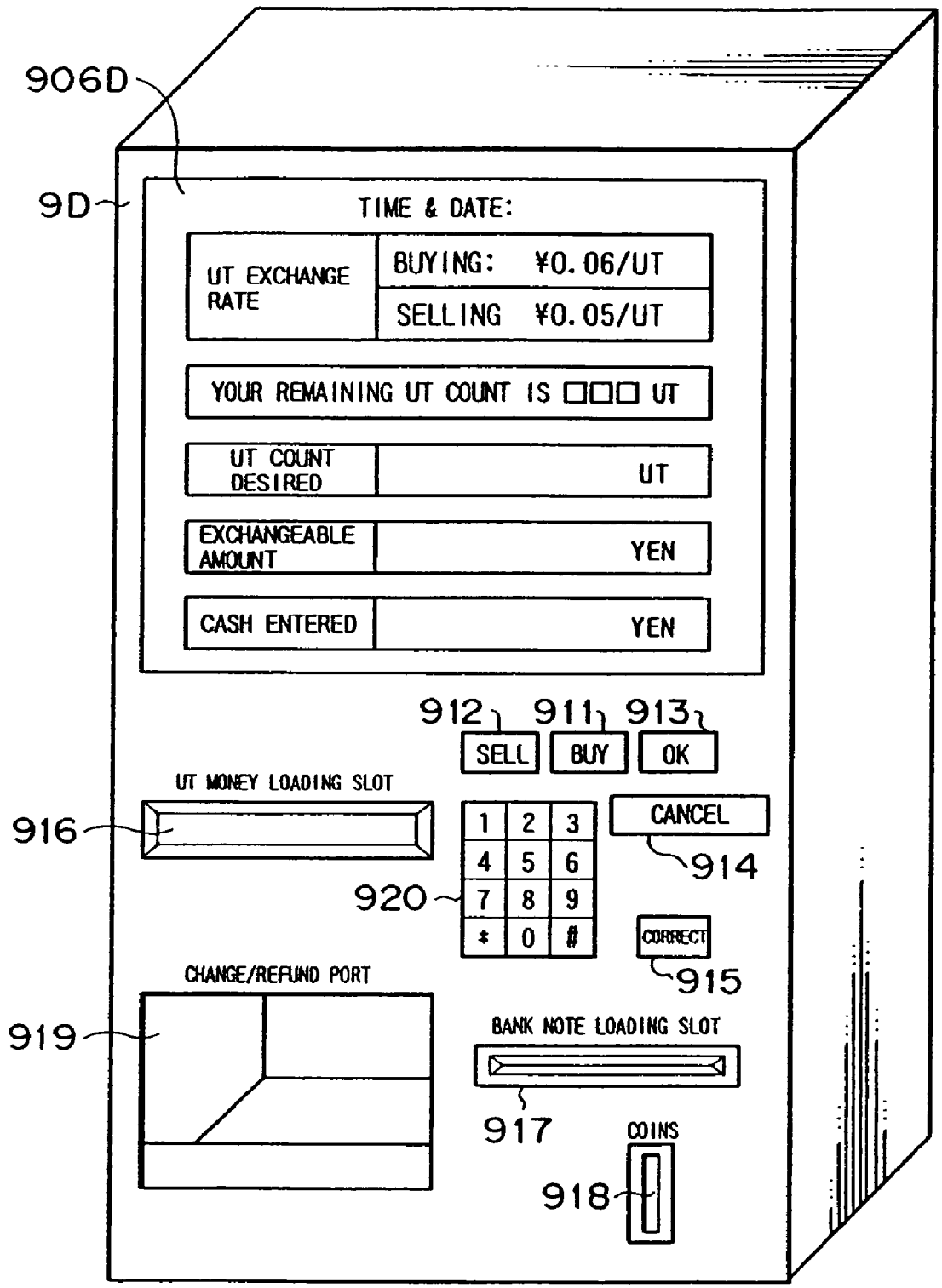
FIG. 44 is a schematic view sketching a typical front operation panel of the terminal equipment used by the ninth embodiment.

FIG. 44 is a schematic view sketching a typical operation panel of the UT trading kiosk terminal 90. As illustrated in FIG. 44, the operation panel has a display screen 906D of the display part 906 along with a plurality of keys constituting the key operation part 907. In this example, the key operation part 907 includes numeric keys 920, a UT buy key 911, a UT sell key 912, an OK key 913, a cancel key 914, and a correction key 915.

The operation panel also has a UT Money loading slot 916, a bank note loading slot 917, a coin loading slot 918, and a change/refund port 919.

UT trading kiosk terminal 90 allows users not only to buy but also to sell the virtual currency UT. The exchange rate for UT trading is sent from the time charge management company 21 to the UT trading kiosk terminal 90 over the digital communication network 29. The exchange rate is also disclosed at the website of the time charge management company 21 on the Internet.

In this example, the charge management system of the time charge management company 21 determines the UT exchange rate by the month as will be explained later. Alternatively, the exchange rate may be updated weekly or daily.

The exchange rate information is written to and stored in the memory 910 of the UT trading kiosk terminal 90. The controlling part 900 of the terminal 90 reads the exchange rate information from the memory 910 and displays on the display screen 906D an exchange rate for buying the virtual currency UT (i.e., UT buying rate) and an exchange rate for selling the currency UT (UT selling rate) as shown in FIG. 44. By referring to the UT exchange rates disclosed at the website or displayed at the UT trading kiosk terminal 90, users may wish to buy additional UT units in a month when the exchange rate is low and to sell their UT units in a month when the rate is high.

If the UT Money 80 is loaded into the UT trading kiosk terminal 90 through the UT Money loading slot 916, the terminal 90 displays the remaining UT count of the Money 80 on the screen 906D as depicted in FIG. 44. The display allows the user to verify the remaining UT count of the UT Money 80. If the user merely wishes to know the remaining UT count, simply pushing the cancel key 914 causes the UT Money 80 to be ejected from the UT Money loading slot 916.

A user wishing to buy the virtual currency UT proceeds to push the buy key 911, not the cancel key 914, and types in a desired UT count to buy by operating the numeric keys 920. A user wishing to sell the virtual currency UT pushes the sell key 912 and enters a desired UT count to sell by operating the numeric keys 920. The screen 906D displays the UT count thus input, so that the user can confirm the desired UT count. If necessary, the user may push the correction key 915 to replace the currently displayed count with another UT count desired.

The UT trading kiosk terminal 90 converts the input UT count into an exchangeable amount using the current exchange rate and displays the computed amount on the display screen 906D. The buyer or seller of the virtual currency UT verifies the input UT count and the corresponding exchangeable amount before pushing the OK key 913.

If the user has chosen to buy the virtual currency UT, the UT trading kiosk terminal 90 causes the display screen 906D to indicate a message requesting the user to pay in cash. The terminal 90 is now ready to accept the payment. The user enters the necessary amount of cash through the bank note loading slot 917 and coin loading slot 918. The amount thus loaded is displayed on the display screen 906D. If an amount of cash in excess of the exact amount to be exchanged is entered, then the UT trading kiosk terminal 90 collects the necessary amount, writes the purchased UT count to the memory 832 of the UT Money 80, pays the balance as change, and ejects the Money 80 from the UT Money loading slot 916.

If the user has decided to sell the virtual currency UT and pushed the OK key 913, the UT trading kiosk terminal 90 refunds through the change/refund port 919 the amount of cash displayed as the exchangeable amount on the display screen 906D. The terminal 90 subtracts the sold UT count from the remaining UT count in the UT Money 80, and ejects the UT Money 80 from the loading slot 916.

Figure 45:
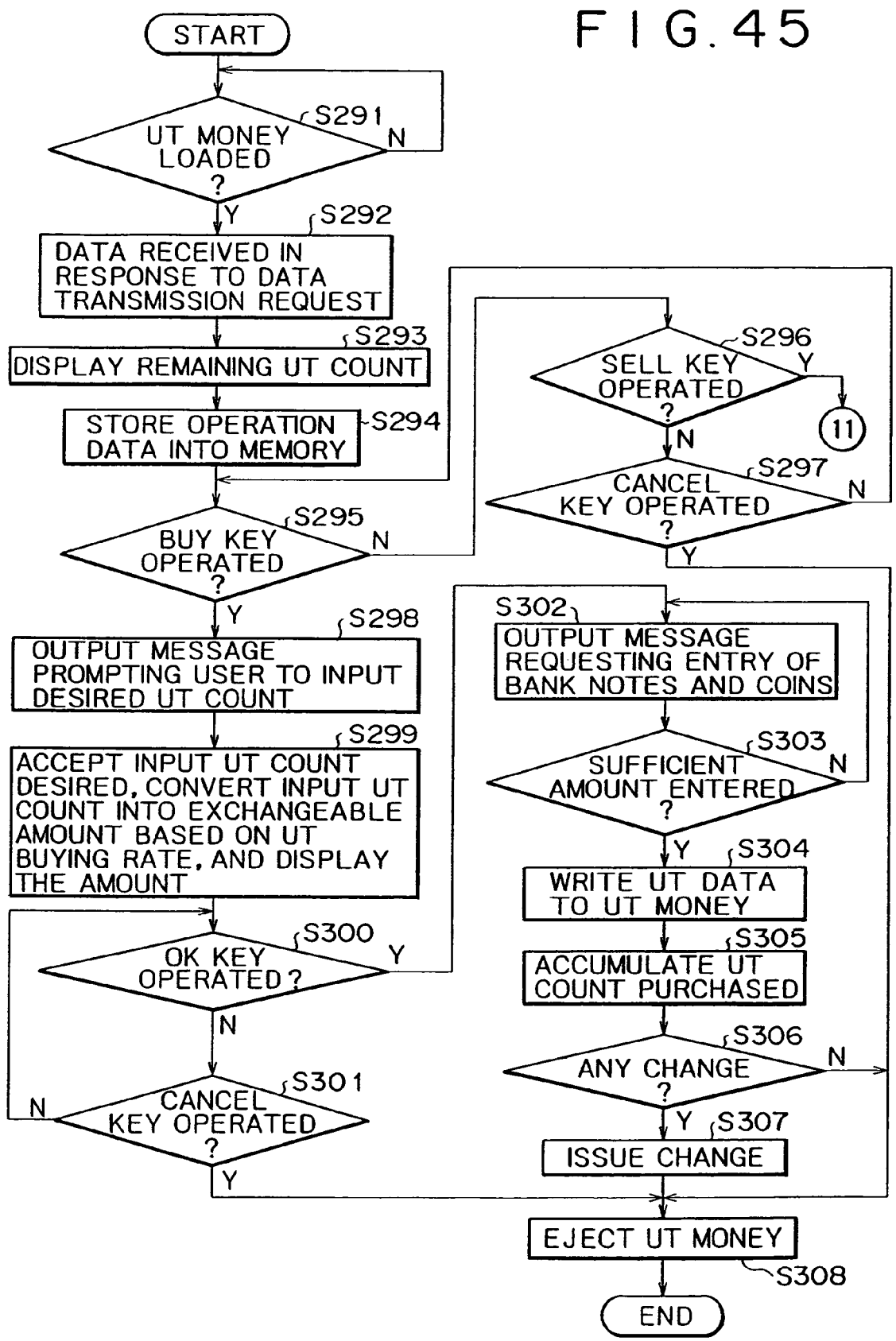
FIG. 45 is a flowchart of steps performed by the terminal equipment for use with the ninth embodiment.
Figure 46:
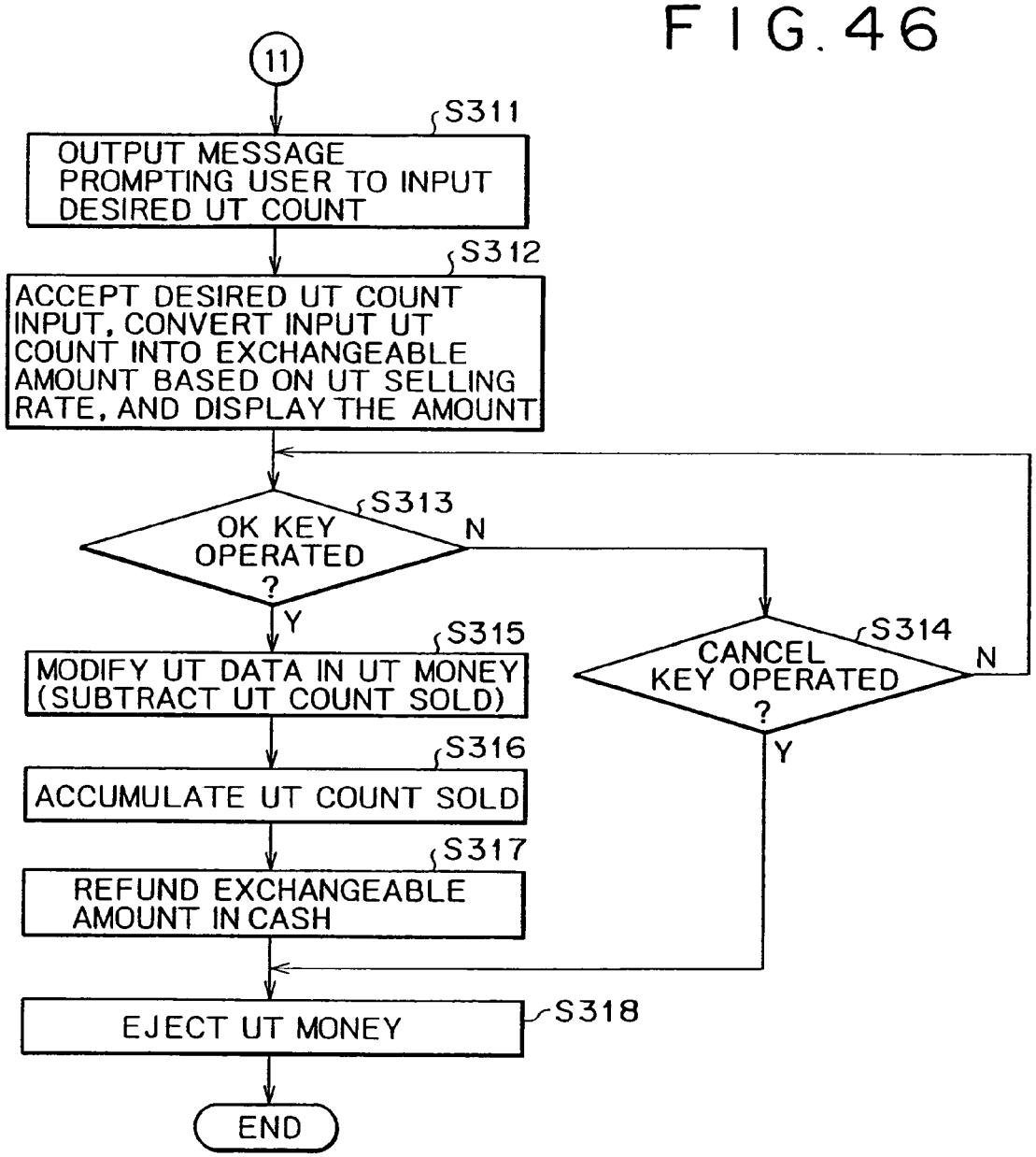
FIG. 46 is another flowchart of steps continued from the flowchart of FIG. 45.

Described below with reference to flowcharts of FIGS. 45 and 46 are steps performed primarily by the controlling part 900 of the UT trading kiosk terminal 90 when the virtual currency UT is bought and sold in the form of the UT Money 80.

A check is first made by optical or electronic means to see if the UT Money 80 is entered through the UT Money loading slot 916 (in step S291). If the UT Money 80 is judged entered, a data transfer request is transmitted to the Money 80. In response, the remaining UT count and operation data are received from the UT Money 80 (in step S292). The remaining UT count thus received is displayed on the display screen 906D (in step S293) while the operation data are written to the memory 910 (in step S294).

The controlling part 900 checks to see if the user has pushed the buy key 911 (in step 295). If the buy key 911 is not judged pushed, a check is then made to see if the user has pushed the sell key 912 (in step S296). If the sell key 912 is not judged pushed, then a check is made to see if the cancel key 914 is pushed (in step S297). If the cancel key 914 is judged operated on, the UT Money 80 is ejected from the UT trading kiosk terminal 90 (in step S308) and the processing is terminated. If the cancel key 914 is not judged activated, step S295 is reached again and operation of the buy key 911 or sell key 912 is awaited.

If the buy key 911 is judged pushed in step S295, a message prompting the user to input a desired UT count is displayed on the display screen 906D (in step S298). On viewing the message, the user enters a desired UT count. The input UT count is accepted and converted into an exchangeable amount in accordance with the UT buying rate for the month, and the amount is displayed on the display screen 906D (in step S299).

As described, the user pushes the OK key 913 when finalizing the desired UT count or operates on the cancel key 914 when canceling the purchase of the virtual currency UT. The UT trading kiosk terminal 90 checks to see if the OK key 913 is pushed (in step S300). If the OK key is not judged activated, a check is then made to see if the cancel key 914 is pushed (in step S301). If the cancel key 914 is judged operated on, step S308 is reached in which the UT Money 80 is ejected and the processing is terminated. If in step S301 the cancel key 914 is not judged activated, step S300 is reached again and operation of the OK key 913 is awaited.

If in step S300 the OK key 913 is judged pushed, a message requesting loading of the cash corresponding to the exchange amount is output (in step S302). With the loaded bank notes and/or coins counted, a check is made to see if the cash is sufficient to cover the exchangeable amount (in step S303). If a sufficient amount of cash is judged loaded, the exact amount displayed is collected, and the UT Money 80 receives total UT count data given by adding the remaining UT count and the newly purchased UT count, as well as a request for updating the remaining UT count accordingly (in step S304). In turn, the UT Money 80 replaces the remaining UT count with the received total UT count in the memory 832.

The UT trading kiosk terminal 90 adds the newly bought UT count to the hitherto-purchased UT count and stores the sum into the memory 910 (in step S305). A check is made to see if there is a balance between the exchangeable amount and what the user has entered in cash (in step S306). The balance if any is refunded as change through the change/refund port 919 (in step S307). If there is no balance, step S308 is reached immediately in which the UT Money 80 is ejected and the processing is terminated.

If in step S296 the sell key 912 is judged activated, a message prompting the user to input a desired UT count is displayed on the display screen 906D (in step S311 of FIG. 46). On viewing the display, the user inputs a desired UT count. The input UT count is accepted and converted into an exchangeable amount in accordance with the UT selling rate for the month, and the amount is displayed on the display screen 906D (in step S312).

As described, the user pushes the OK key 913 when finalizing the desired UT count or operates on the cancel key 914 when canceling the selling of the virtual currency UT. The UT trading kiosk terminal 90 checks to see if the OK key 913 is pushed (in step S313). If the OK key is not judged activated, a check is then made to see if the cancel key 914 is pushed (in step S314). If the cancel key 914 is judged operated on, step S318 is reached in which the UT Money 80 is ejected and the processing is terminated. If in step S314 the cancel key 914 is not judged activated, step S313 is reached again and operation of the OK key 913 is awaited.

If in step S313 the OK key 913 is judged pushed, the UT Money 80 receives total UT count data given by subtracting the sold UT count from the remaining UT count, as well as a request for updating the remaining UT count accordingly. In turn, the UT Money 80 replaces the remaining UT count with the received total UT count in the memory 832 (in step S315).

The UT trading kiosk terminal 90 adds the newly sold UT count to the hitherto-sold UT count and stores the sum into the memory 910 (in step S316). The exchangeable amount is refunded in cash through the change/refund port 919 (in step S317). In step S318, the UT Money 80 is ejected and the processing is terminated.

As described, the UT trading kiosk terminal 90 retrieves operation data from the memory 832 of the UT Money 80 at the time of buying or selling of the virtual currency UT. The retrieved data are stored into the memory 910. The UT trading kiosk terminal 90 also retains the number of traded UT units in the memory 910. The data thus held at the kiosk terminal 90 are transmitted to the time charge management company 21 when so requested by the company 21.

Figure 47:
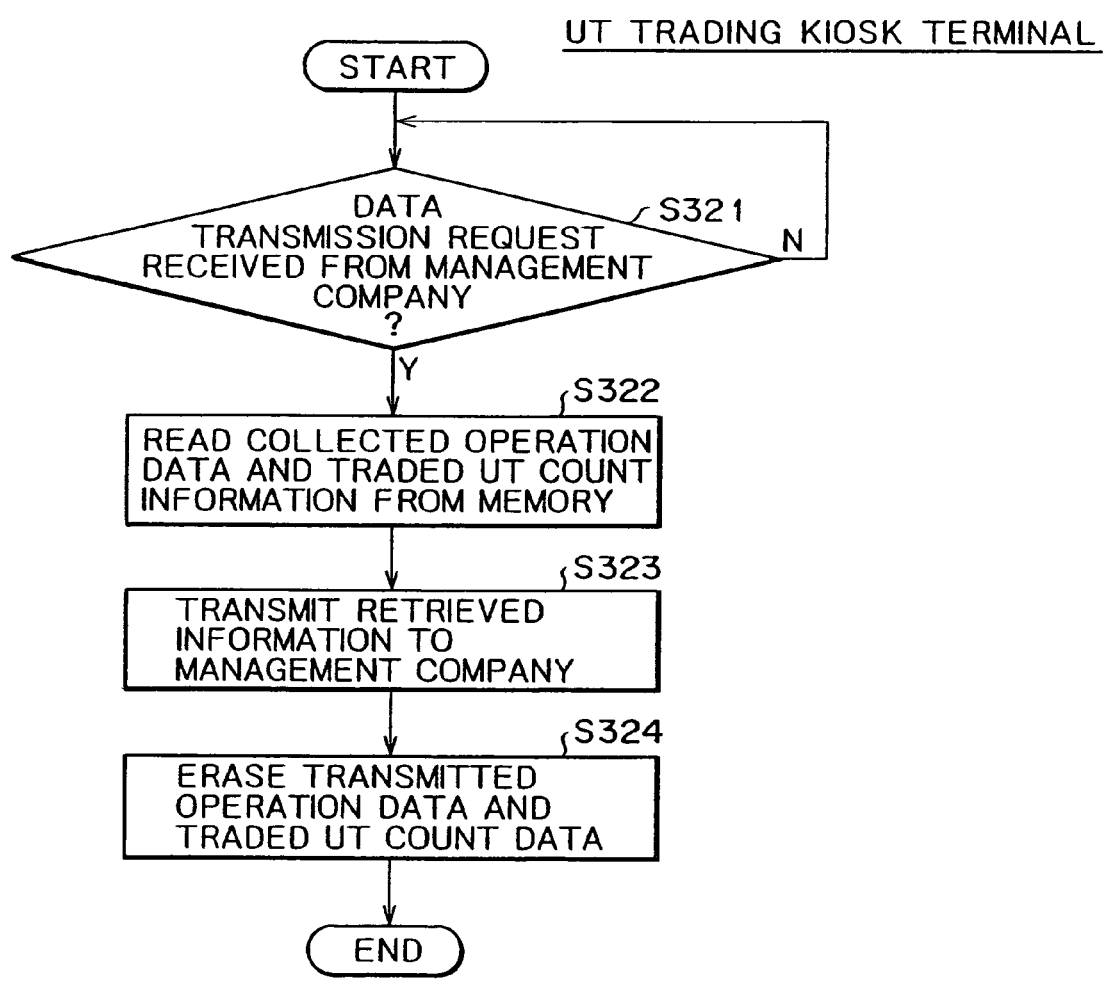
FIG. 47 is flowchart of further steps performed by the terminal equipment for use with the ninth embodiment.

Described below with reference to a flowchart of FIG. 47 are steps performed by the UT trading kiosk terminal 90 upon receipt of a transmission request from the time charge management company 21.

A check is made to see if a transmission request is received from the time charge management company 21 (in step S321). If the transmission request is judged received, the kiosk terminal 90 reads from the memory 910 the operation data collected from the UT Money 80 including used time information, as well as data indicative of the number of UT units bought and the number of UT units sold (in step S322). The data thus retrieved are output to the time charge management company 21 (in step S323). After transmission of the data, the kiosk terminal 90 erases the operation data and the data about the traded UT units from the memory 910 (in step S324).

With the ninth embodiment, the charge management system of the time charge management company 21 determines at the end of the month the exchange rate of the virtual currency UT for the next month in accordance with the used times accumulated by the electronic apparatus 30 this month and with the total UT units traded during the month. The exchange rate thus determined is disclosed at the company's website on the Internet and is sent to each UT trading kiosk terminal 90 for use during the next month.

Figure 48:
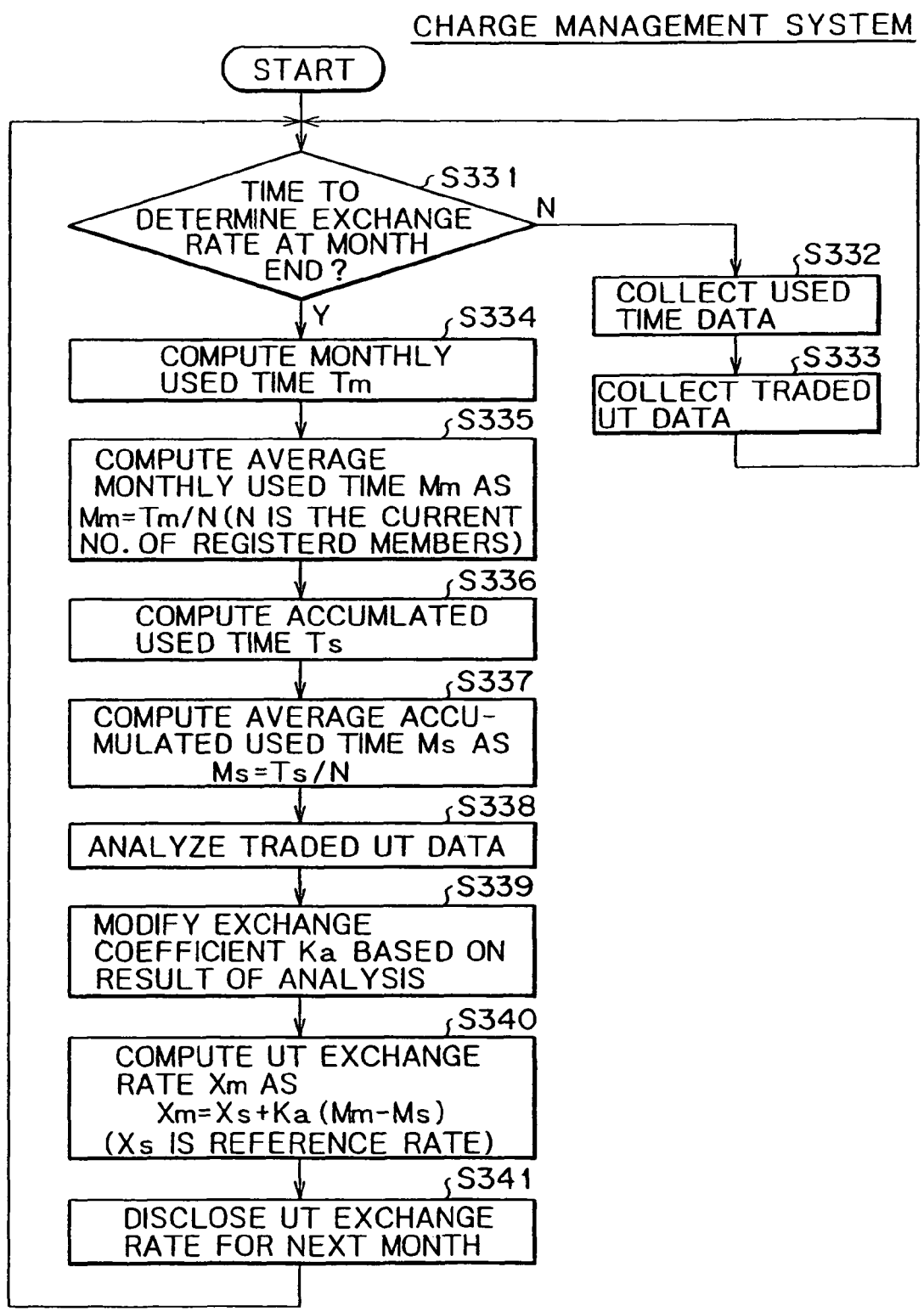
FIG. 48 is a flowchart of steps carried out by a charge management system used by the ninth embodiment.

Steps performed by the charge management system of the time charge management company 21 are described below with reference to a flowchart of FIG. 48. This flowchart shows how a controlling part within the charge management system typically operates.

A check is first made to see if it is time to determine the exchange rate of the virtual currency UT (in step S331). If it is not yet time to determine the exchange rate, the charge management system collects used time data about the electronic apparatus 30 (in step S332) and traded UT count data (in step S333) from the UT trading kiosk terminal 90 as described.

If in step S331 it is judged that now is the time to determine the exchange rate, the charge management system computes a total used time Tm for the current month based on the collected used time data (in step S334). An average monthly used time Mm is then obtained (in step S335) using the following expression:

$$Mm=Tm/N$$

where N denotes the number of currently registered members.

An accumulated used time Ts of the electronic apparatus 30 is then computed (in step S336). An average accumulated used time Ms is acquired (in step S337) by dividing the accumulated number of registered members per month by the total number of registered members (N), using the following expression:

$$Ms=Ts/N$$

The traded UT count data thus collected are analyzed (in step S338). Based on the result of the analysis, an exchange coefficient Ka for use in determining the exchange rate is modified (in step S339.). If the number of UT units bought is higher than the number of UT units sold, the exchange coefficient Ka is modified in a way raising the UT exchange rate; if the purchased UT count is lower than the sold UT count, the exchange coefficient Ka is modified so as to lower the UT exchange rate.

The UT exchange rate Xm for the next month is obtained (in step S340) using the expression:

$$Xm=Xs+Ka\,(Mm-Ms)$$

where Xs represents a reference UT exchange rate. The reference UT exchange rate is a rate that determines in advance a reference charge unit about the used time of the electronic apparatus 30 with respect to the virtual currency UT. Alternatively, the rate Xs may be defined not as the reference UT exchange rate but as the UT exchange rate of the preceding month.

The UT exchange rate thus determined is disclosed at the management company's website on the Internet and is sent to each UT trading kiosk terminal 90 for use during the next month (in step S341).

As described, the charge management system of the time charge management company 21 determines the UT exchange rate for the next month based on the past used time and on the traded UT units.

The shorter the average used time Mm for this month than the hitherto-accumulated average used time or the smaller the number of virtual currency units UT bought during the month, the lower the UT exchange rate set for the next month. It follows that the electronic apparatus 30 is charged less for its use. This should promote the use of the apparatus 30 and urge users to buy the virtual currency UT. Meanwhile, the number of sold UT units diminishes.

The longer the average used time Mm for this month than the hitherto-accumulated average used time or the larger the number of virtual currency units UT bought during the month, the higher the UT-exchange rate set for the next month. This means that the electronic apparatus 30 is charged more for its use. This will discourage the use of the apparatus 30 and dissuade users from buying the virtual currency UT. On the other hand, the number of UT units sold increases.

As described, the ninth embodiment employs the virtual currency UT as a fluctuating currency. Fluctuating values of the currency prompt registered members to use the electronic apparatus with averaged (and thereby minimized) seasonal variations in used time.

The number of traded UT units collected by the charge management system of the time charge management company includes not only the UT units traded at the UT trading kiosk terminal 90 but also those traded on the virtual UT trading market 100. How UT units are traded on the virtual UT trading market 100 will now be described.

FIG. 49 schematically shows how the virtual UT trading market 100 operates. A website 110 run by a virtual UT market management system 212 of the time charge management company 21 functions as a primary base for the virtual UT trading market. Only the members registered with the time charge management company 21 are authorized to trade the virtual currency UT at the website 110. The charge management system 211 subjects to authentication any user who has made a seller or buyer posting request. Anyone who is not authenticated as a duly registered member is rejected.

A registered member who wishes to sell his virtual currency UT holdings has his status posted as a seller at the website 110 together with a desired UT selling rate. The seller's posted status and desired UT selling rate cannot be altered until a predetermined time period passes. The charge management system 211 retains dates at which members' seller postings were made. A member is allowed to have his posted seller's status and desired UT selling rate altered upon elapse of the predetermined period of time after the date of the posting.

Any member who has had his status posted as a seller cannot become a buyer of the virtual currency UT as long as he remains a seller. If a registered seller attempts access to the virtual UT market management system 212 as a buyer, that attempt is rejected as illegal.

Registered members may have their status posted as buyers at any time. When having his status posted as a buyer of UT units, the member enters a desired UT buying rate and a desired UT count to buy. In response, the virtual UT market management system 212 presents to the buyer which of the sellers' desired UT selling rates is closest to the buyer's desired UT buying rate. If the buyer agrees to buy UT units at the presented seller's rate, then a deal is made between the two parties. The buyer may reject the presented rate and may have his status posted again along with the desired UT buying rate. In such a case, buying rates are posted on a first-come, first-served basis. This means that after having his status posted again as a buyer, the user may not be able to buy UT units at the old buying rate in effect before the posting.

Figure 50:
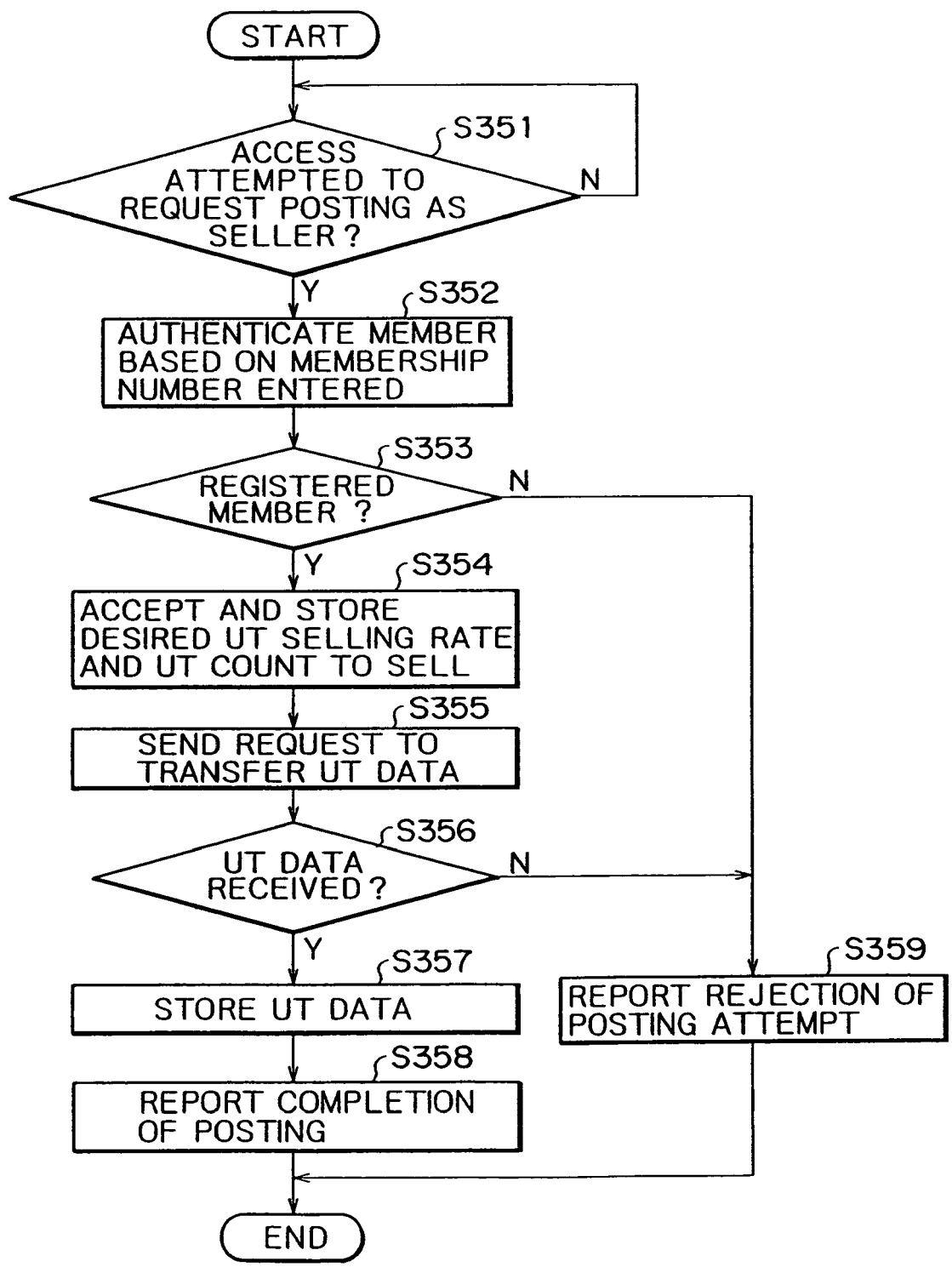
FIG. 50 is a flowchart of steps performed when a user has his status posted as a seller on the virtual trading market using the virtual currency UT in connection with the ninth embodiment.

Described below with reference to a flowchart of FIG. 50 are steps performed by the virtual UT market management system 212 when a member has his status posted as a seller. This flowchart shows how a controlling part within the virtual UT market management system 212 typically operates.

A check is first made to see if access is attempted requesting a user's posting as a seller (in step S351). If such access is judged to be made, the user who attempted access is put to authentication based on the membership number entered (in step S352). A check is made to see if access has been attempted by a registered number (in step S353). If the user is not judged to be a duly registered member, that user is notified of a rejection of his posting attempt through the website (in step S359) and the processing routine is terminated.

If the user attempting access is judged to be a registered member, the virtual UT market management system 212 awaits input of a desired UT selling rate and the number of UT units to sell, accepts the input and places it into an internal memory together with the membership number and the date of posting (in step S354).

The virtual UT market management system 212 sends to the member posted as a seller a request for having the posted UT count data transferred (in step S355).

All members who wish to trade UT units on the virtual UT trading market 100 rent beforehand a UT data transfer adapter (not shown). When trading UT units, the member connects the transfer adapter to his personal computer and loads the UT Money 80 into the adapter. As a seller, the member enters a desired UT count to sell and issues a transfer instruction through the personal computer. In turn, the personal computer using a transfer application program of the adapter retrieves the designated UT count from the UT Money 80 and transmits the retrieved data to the virtual UT market management system 212. The UT Money 80 has its remaining UT count updated in the memory 832 to reflect the subtracted UT count.

The virtual UT market management system 212 checks to see if the UT data have been received from the seller. If no UT data are judged to have arrived, the system 212 returns a rejection of the posting as a seller to the member and erases what has been written to the memory (in step S359).

On receiving the UT data, the virtual UT market management system 212 stores in the memory the received data in association with the member's posted information (in step S357). Thereafter, the system notifies the member of completion of the posting (in step S358) and terminates the routine of seller posting processing.

Figure 51:
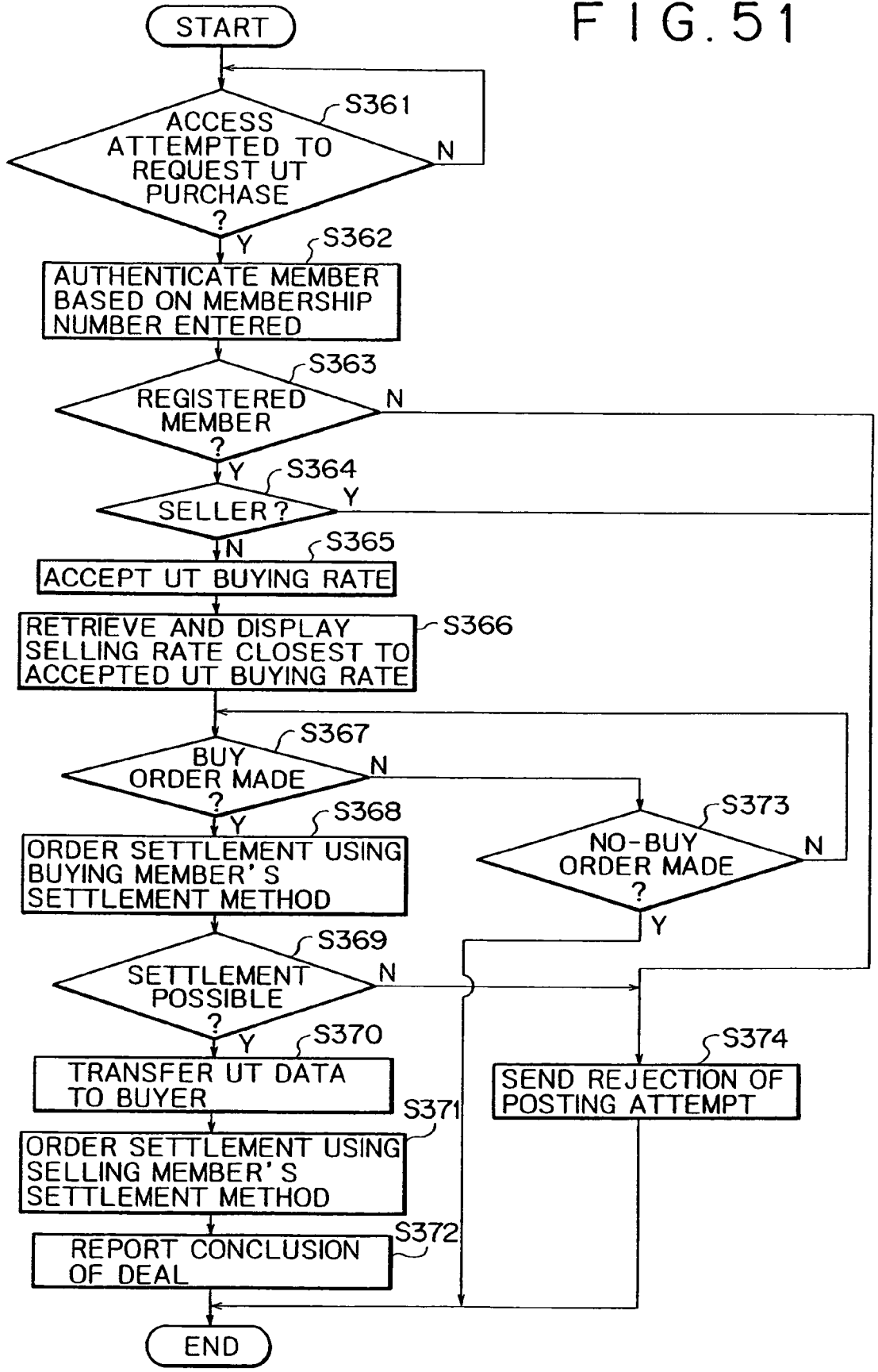
FIG. 51 is a flowchart of steps performed when a user has his status posted as a buyer on the virtual trading market using the virtual currency UT in connection with the ninth embodiment.

Described below with reference to a flowchart of FIG. 51 are steps performed by the virtual UT market management system 212 when a buyer posts a UT purchase request and trades UT units.

A check is first made to see if access is attempted requesting a UT purchase (in step S361). If such access is judged to be made, the user who attempted access is put to authentication based on the membership number entered (in step S362). A check is made to see if access has been attempted by a registered number (in step S363). If the user is not judged to be a duly registered member, that user is notified of a rejection of his posting attempt through the website (in step S374) and the processing routine is terminated.

If the user attempting access is judged to be a registered member, the UT market management system checks to see if the member has already been posted as a seller (in step S364). If the member is judged to have been posed as a seller, that member is notified of a rejection of his posting attempt through the website (in step S374) and the processing routine is terminated.

If the member is not judged to be posted as a seller, the system accepts the member's request to have his status posted as a buyer, as well as a desired UT buying rate and a UT count to buy (in step S365). From the desired UT selling rates posted by the sellers in the memory, the system retrieves the selling rate closest to the accepted UT buying rate desired and displays the retrieved rate at the website (in step S366).

Looking at the displayed UT selling rate, the member as a buyer enters a buy order when wishing to buy UT units at the presented rate or inputs a no-buy order when refusing to make a purchase at that rate. The system checks to see if a buy order is entered (in step S367). If a buy order is not judged to be made, a check is made to see if a no-buy order is input (in step S373). If a no-buy order is not judged to be made, the system goes back to step S367 and waits for a buy-order to be entered. If a no-buy order is judged to be made, the processing routine is terminated. The desired buying rate may be altered by the member who will have his status posted anew as a buyer.

If in step S367 a buy order is judged to be made, the system refers to the database for the buying member's data. The UT market management system notifies the charge management system of the member's settlement method retrieved from the database (in step S368).

In response, the charge management system reports whether the member in question is capable of settling the payment. A check is made based on the report to see if the settlement is possible (in step S369). If the settlement is not judged possible for some reason, step S374 is reached in which the member is notified of a rejection of his posting attempt through the website, and the processing routine is terminated.

If in step S369 the settlement is judged possible, the system transfers the purchased UT data to the buying member (in step S370). The buying member receives the transferred UT data through the personal computer and adapter. The remaining UT count in the memory 832 of the UT Money 80 is incremented by the purchased UT count.

The database is also referenced for the selling member's settlement method. The charge management system is notified of the member's settlement method retrieved from the database (in step S371). The buying member is then notified of completion of a deal through the website (in step S372), and the processing routine is brought to an end.

The virtual currency UT is traded as described. If the UT count posted by a seller is not equal to the UT count desired by a buyer, a deal may still be concluded provided the seller's posted UT count is greater than the buyer's desired UT count. A deal may also be made if a plurality of sellers with the same selling rate propose a combined UT count greater than a potential buyer's desired UT count. In that case, the sellers' posted UT holdings may be sold on a first-come, first-served basis.

The number of UT units traded this month as described above is used in determining the UT exchange rate for the next month. For that purpose, the UT market management system reports the traded monthly UT count to the charge management system every month.

One advantage of the ninth embodiment is that it employs the virtual currency UT allowing the unit value of product used time to be charged in a fluctuating manner. Another advantage is that virtual currency units may be traded at a desired exchange rate on a virtual UT market.

Although the ninth embodiment has been described as causing the electronic circuit of the UT Money 80 to perform charge-processing about product used time, this is not limitative of the invention. Alternatively, a charge processing part may be provided in the electronic apparatus 30, and results of charge processing by that charge processing part about product used time may be sent to the UT Money 80.

Although the foregoing embodiments have been shown adopting an electronic apparatus as a chargeable product, this is not limitative of the invention. Alternatively, this invention applies to any apparatuses that incorporate a suitable charge processing part.

As many other apparently different embodiments of this invention may be made without departing from the spirit and scope thereof, it is to be understood that the invention is not limited to the specific embodiments thereof except as defined in the appended claims.

What is claimed is:

1. A computer-readable storage medium storing computer-executable program instructions which, when executed by a processor, perform a method for computing a chargeable time, the method comprising:
   storing virtual currency units;
   exchanging data with an external entity;
   storing the data in a memory;
   updating the virtual currency units held in the memory in accordance with the received data;
   transmitting the data from the memory to the external entity; and
   computing a chargeable time by using a varying load factor that is determined by dividing a processing time, corresponding to an operation period excluding a sleep time, by a used time, which includes the sleep time, and multiplying the result by a coefficient of variation.

2. The computer-readable recording medium of claim 1,
   wherein each of the virtual currency units corresponds to a predetermined used time and represents a predetermined amount of money; and
   the controlling part computes a used time upon receipt of use start point information and use end point information converts the computed used time into corresponding virtual currency units, and subtracts the corresponding virtual currency units from the virtual currency units held in the memory.

3. A computer-implemented method for computing a chargeable time, the computer including a processor and memory, and the method comprising the steps performed by a computer of:
   storing, by the processor, virtual currency units;
   exchanging, by the processor, data with an external entity;
   storing, by the processor, the data in a memory;
   updating, by the processor, the virtual currency units held in the memory in accordance with the received data;
   transmitting, by the processor, the data from the memory to the external entity; and
   computing, by the processor, a chargeable time by using a varying load factor that is determined by dividing a processing time, corresponding to an operation period excluding a sleep time, by a used time, which includes the sleep time, and multiplying the result by a coefficient of variation.

4. The computer-implemented method of claim 3,
   wherein each of the virtual currency units corresponds to a predetermined used time and represents a predetermined amount of money; and
   the controlling part computes a used time upon receipt of use start point information and use end point information, converts the computed used time into corresponding virtual currency units, and subtracts the corresponding virtual currency units from the virtual currency units held in the memory.

* * * * *